United States Patent
Takai et al.

(10) Patent No.: US 10,952,459 B2
(45) Date of Patent: Mar. 23, 2021

(54) CONTINUOUS SHAPING MACHINE FOR BEAN CURDS

(71) Applicant: HOUSE FOODS CORPORATION, Osaka (JP)

(72) Inventors: Toichiro Takai, Nonoichi (JP); Toru Awazu, Nonoichi (JP); Taku Kitaura, Nonoichi (JP); Toshiaki Shinde, Nonoichi (JP); Motonari Amano, Nonoichi (JP); Yoshihiro Morita, Nonoichi (JP); Shimpei Nishimura, Higashiosaka (JP); Yoshihito Asami, Higashiosaka (JP); Yutaka Taneda, Higashiosaka (JP)

(73) Assignee: HOUSE FOODS CORPORATION, Osaka (JP)

( * ) Notice: Subject to any disclaimer, the term of this patent is extended or adjusted under 35 U.S.C. 154(b) by 259 days.

(21) Appl. No.: 15/763,691

(22) PCT Filed: Sep. 30, 2015

(86) PCT No.: PCT/JP2015/077883
§ 371 (c)(1),
(2) Date: Mar. 27, 2018

(87) PCT Pub. No.: WO2017/056280
PCT Pub. Date: Apr. 6, 2017

(65) Prior Publication Data
US 2018/0303150 A1 Oct. 25, 2018

(51) Int. Cl.
*A23P 30/00* (2016.01)
*A23P 10/20* (2016.01)
(Continued)

(52) U.S. Cl.
CPC ............ *A23P 30/00* (2016.08); *A23C 20/025* (2013.01); *A23L 11/00* (2016.08); *A23L 11/07* (2016.08); *A23P 10/20* (2016.08)

(58) Field of Classification Search
CPC .......... A23P 30/00; A23P 10/20; A23L 11/00; A23L 11/07; A23C 20/025
(Continued)

(56) References Cited

U.S. PATENT DOCUMENTS 8,443,720 B2 * 5/2013 Takai .................... B65G 15/08
99/443 C
2010/0275790 A1 11/2010 Takai et al.

FOREIGN PATENT DOCUMENTS

| CN | 102438465 | 5/2012 |
| JP | 09-047249 | 2/1997 |

(Continued)

OTHER PUBLICATIONS

International Search Report, dated Dec. 22, 2015 in corresponding International application No. PCT/JP2015/077883, with English language translation.
(Continued)

Primary Examiner — Bayan Salone
(74) Attorney, Agent, or Firm — Wenderoth, Lind & Ponack, L.L.P.

(57) ABSTRACT

In a continuous shaping machine for bean curds which is equipped with a pair of endless filter cloth belts that are an upper filter cloth belt and a lower filter cloth belt to circulate outside and a pair of endless conveyors that are an upper conveyor and a lower conveyor to circulate inside, and which compression-shapes curdled soymilk by conveying the curdled soymilk while sandwiching the curdled soymilk between the upper filter cloth belt and conveyor and the lower filter cloth belt and conveyor, the continuous shaping
(Continued)

machine includes: heating units which perform heating sterilization in prescribed ranges of a return process that corresponds to regions, from a termination portion of a conveyance passage where the curdled soymilk is sandwiched to a start position of the conveyance passage, of circulation routes of the filter cloth belts.

20 Claims, 34 Drawing Sheets

(51) Int. Cl.
*A23C 20/02* (2006.01)
*A23L 11/00* (2016.01)

(58) Field of Classification Search
USPC ..... 99/453, 455, 462, 466, 283, 289 R, 299, 99/300, 304, 305, 307; 210/396, 400
See application file for complete search history.

(56) References Cited

FOREIGN PATENT DOCUMENTS

| JP | 2001-321112 | | 11/2001 | |
|---|---|---|---|---|
| JP | 2001321112 A | * | 11/2001 | |
| JP | 3652740 | | 3/2005 | |
| JP | 2005-261369 | | 9/2005 | |
| JP | 2005261369 A | * | 9/2005 | ............. A23P 30/00 |
| JP | 5215941 | | 3/2013 | |
| JP | 2013-138624 | | 7/2013 | |
| JP | 2013138624 A | * | 7/2013 | |

OTHER PUBLICATIONS

Extended European Search Report dated Apr. 23, 2019 in corresponding European Patent Application No. 15905434.5.
Chinese Office Action dated Oct. 10, 2020 in corresponding Chinese Patent Application No. 201580083495.1, with English Translation.
Office Action dated Jan. 5, 2021 in corresponding Japanese Patent Application No. 2020-035580.

* cited by examiner

H (F)

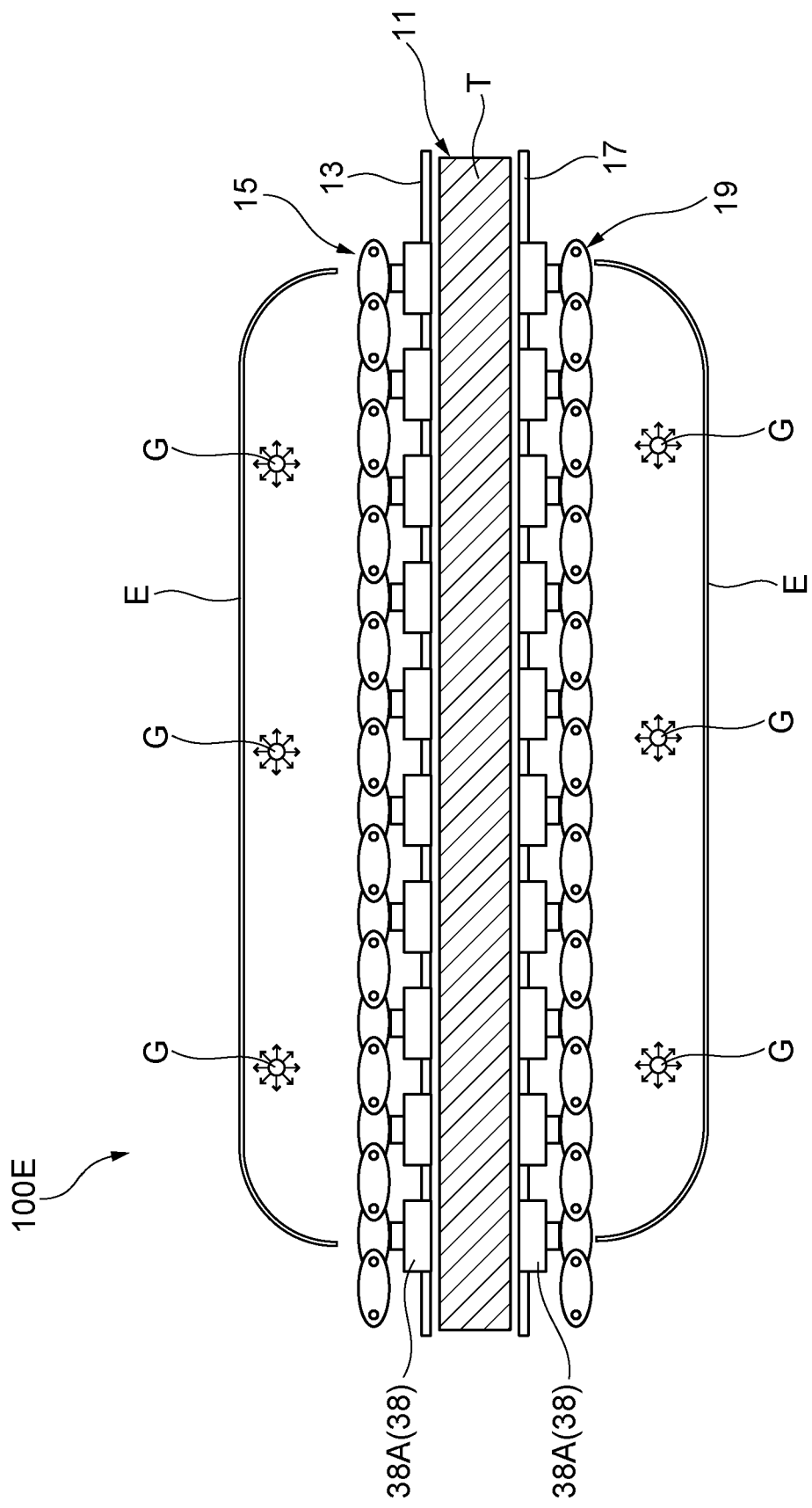

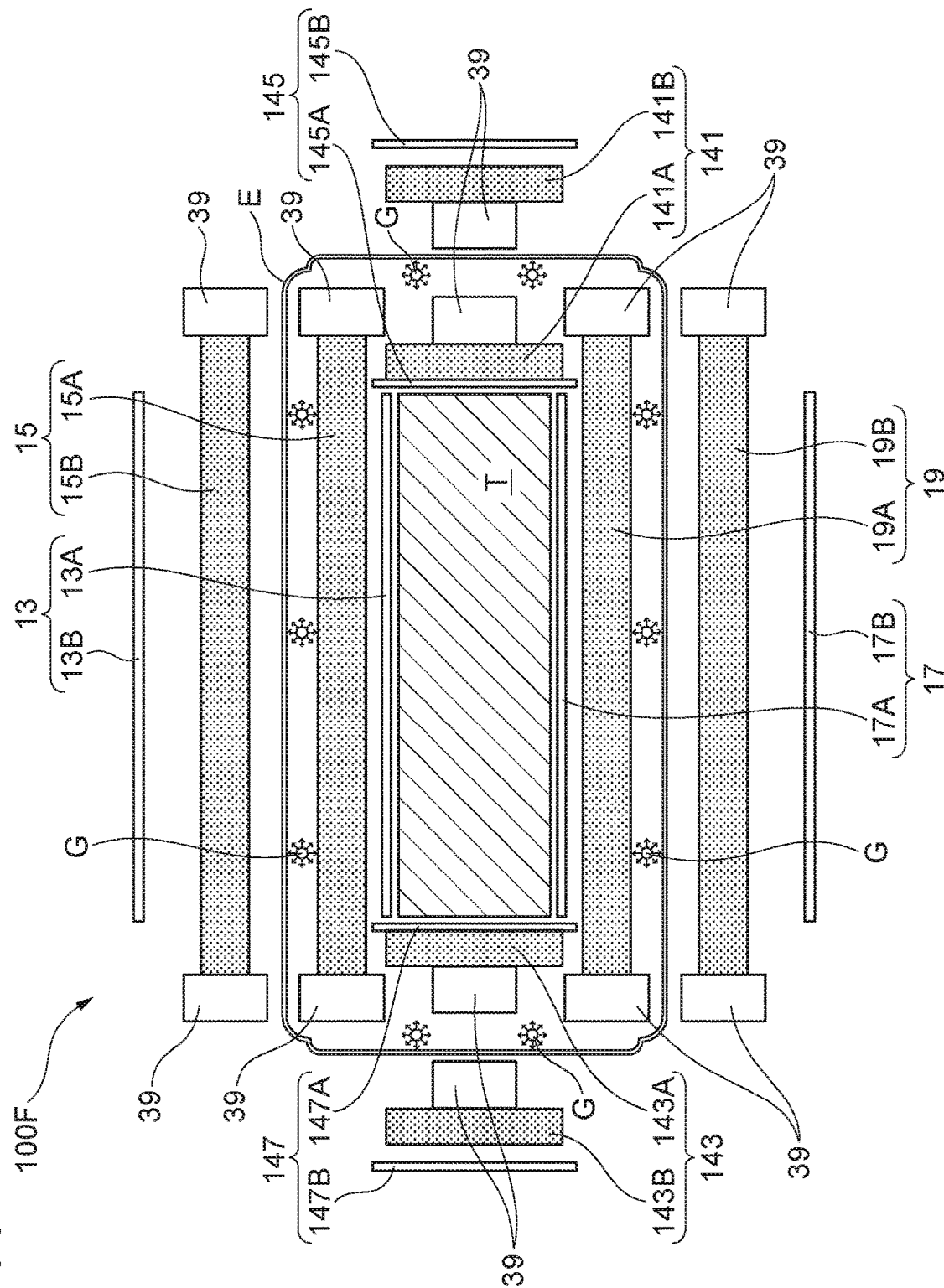

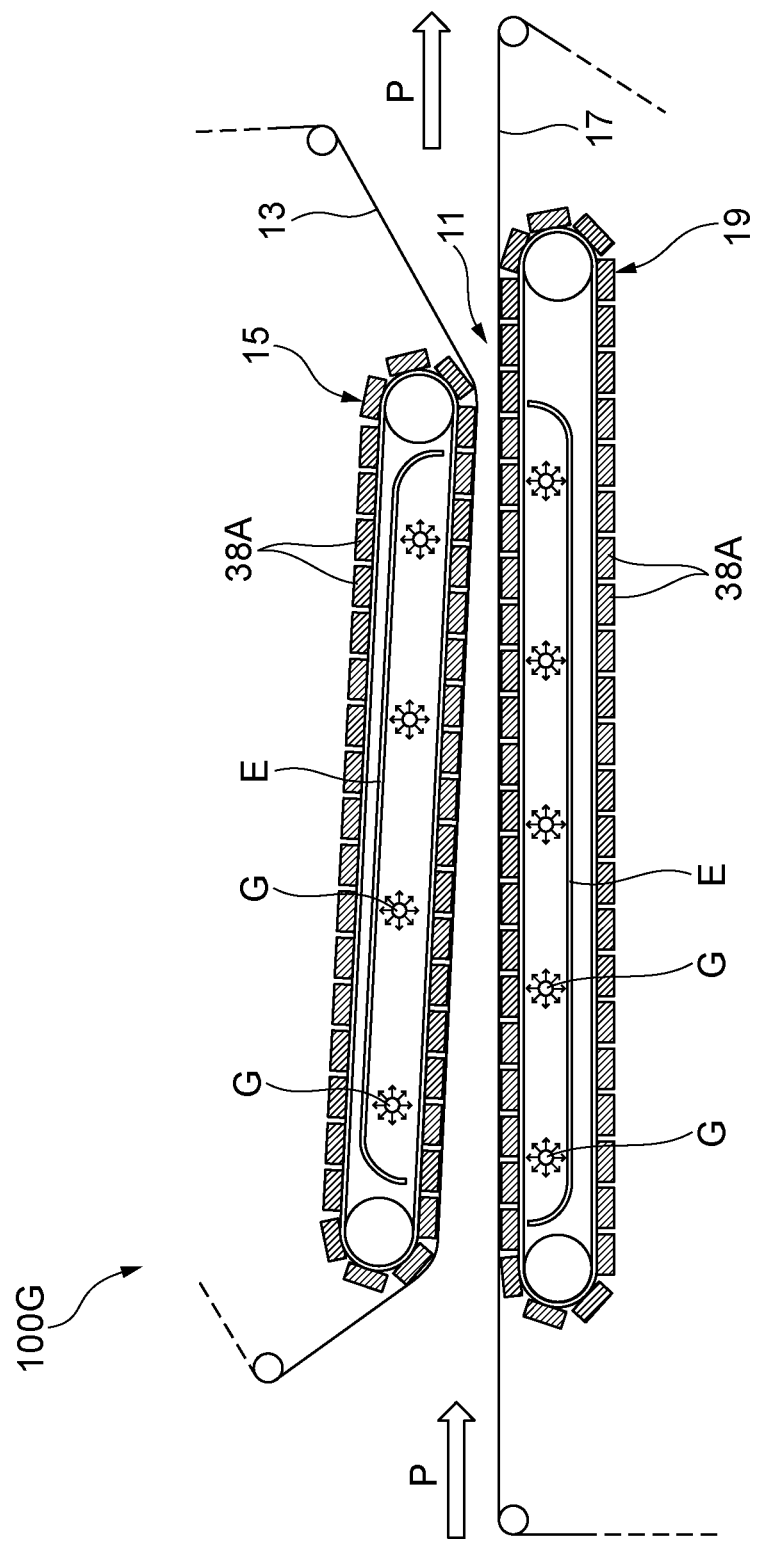

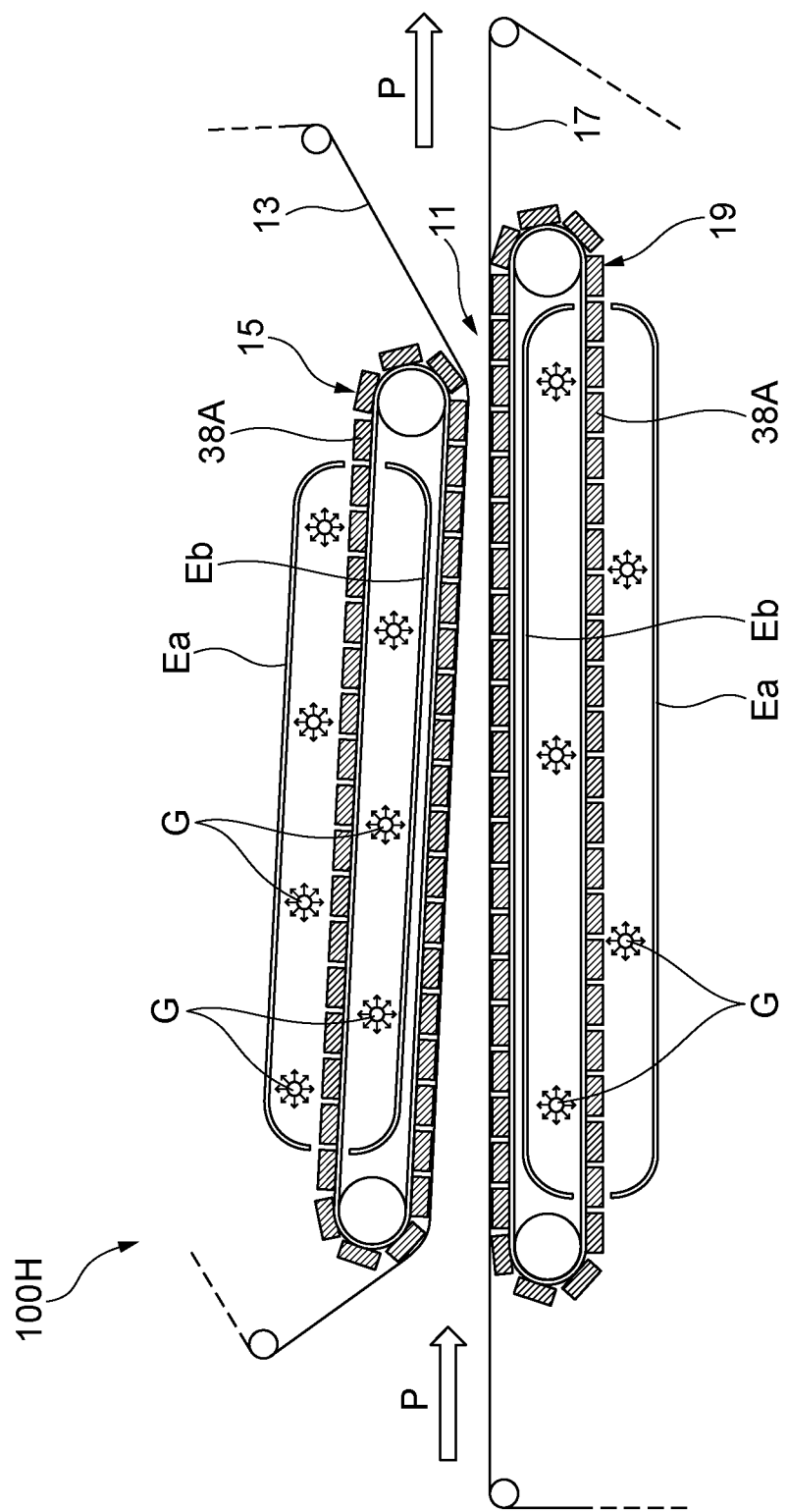

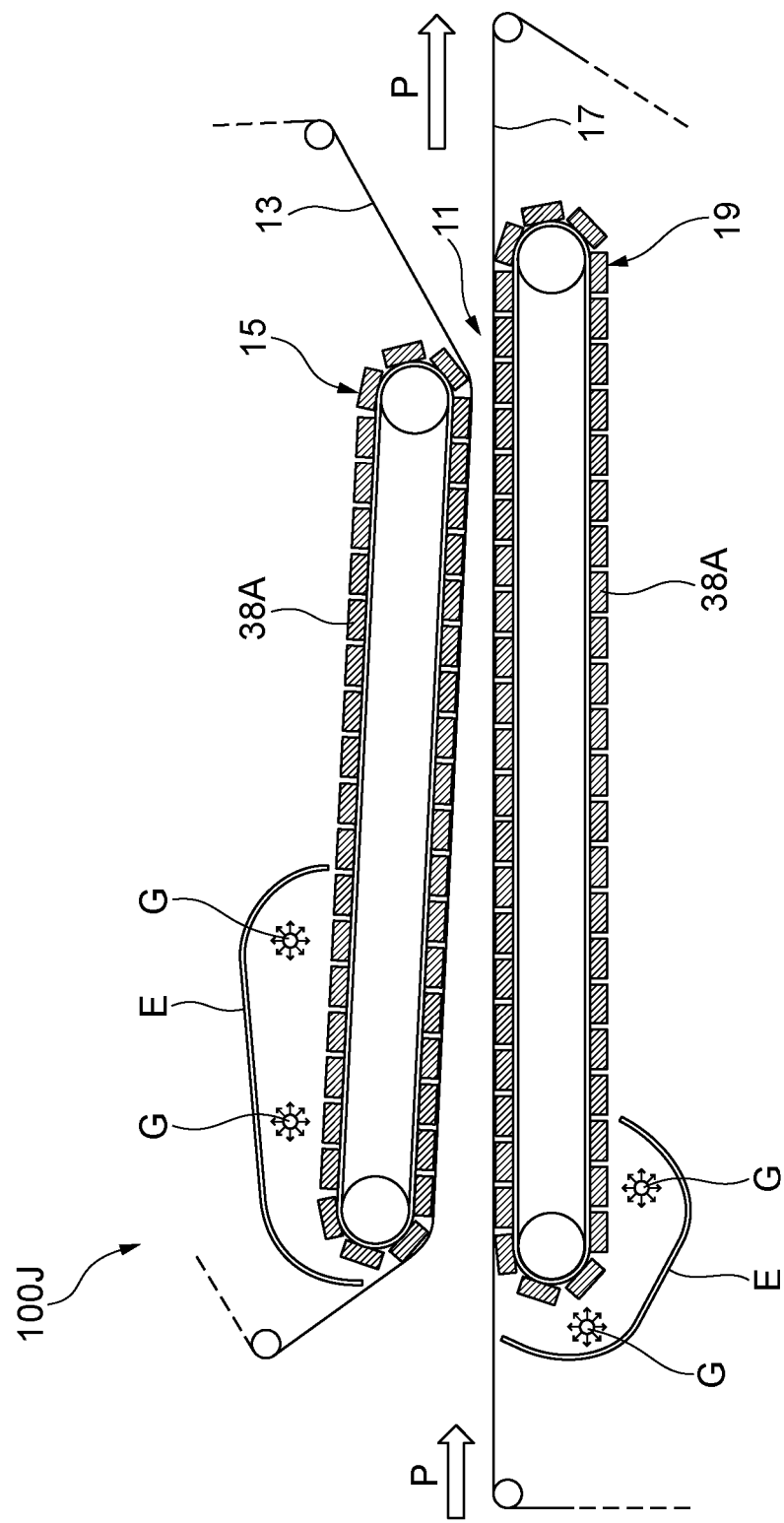

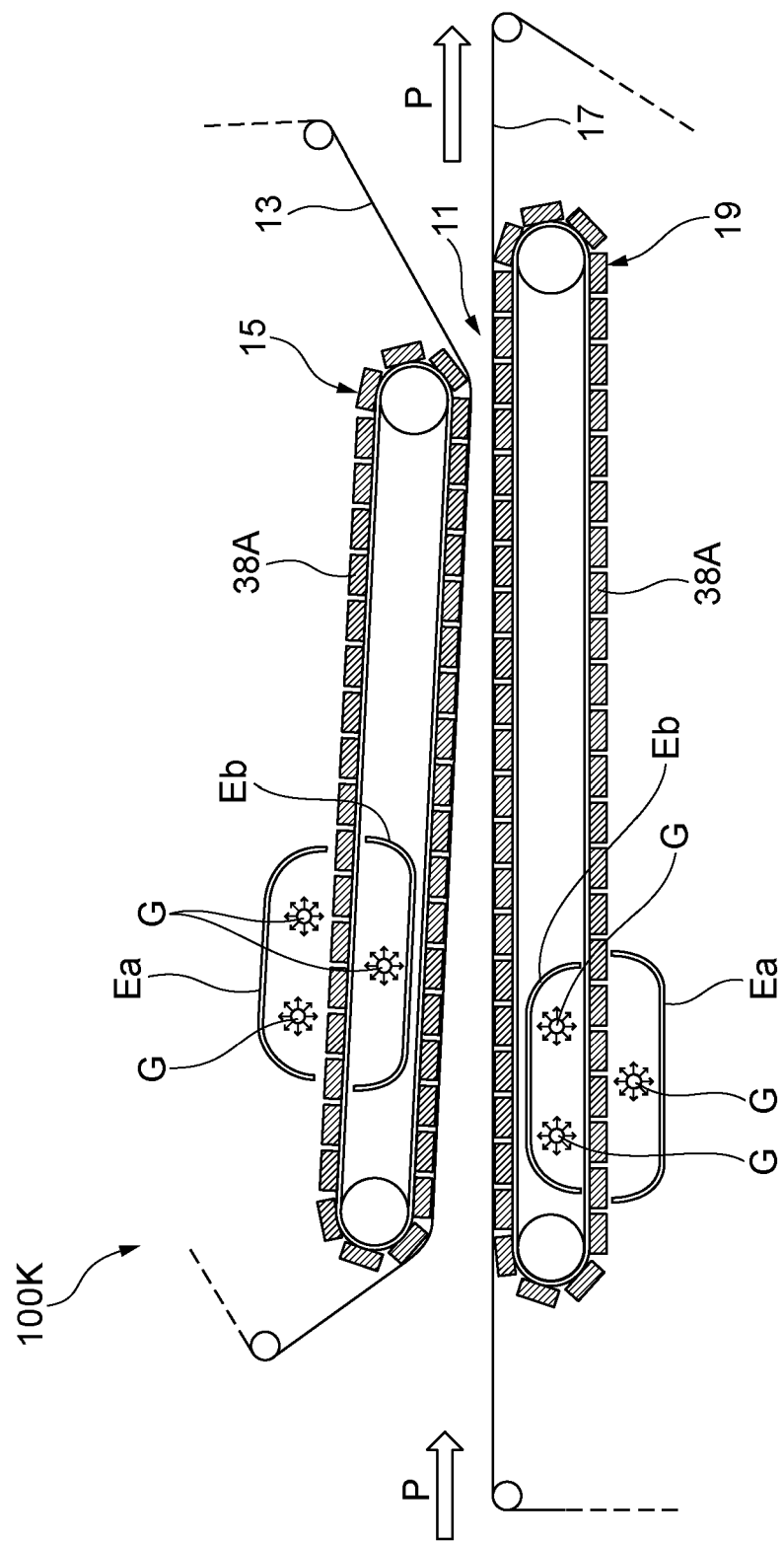

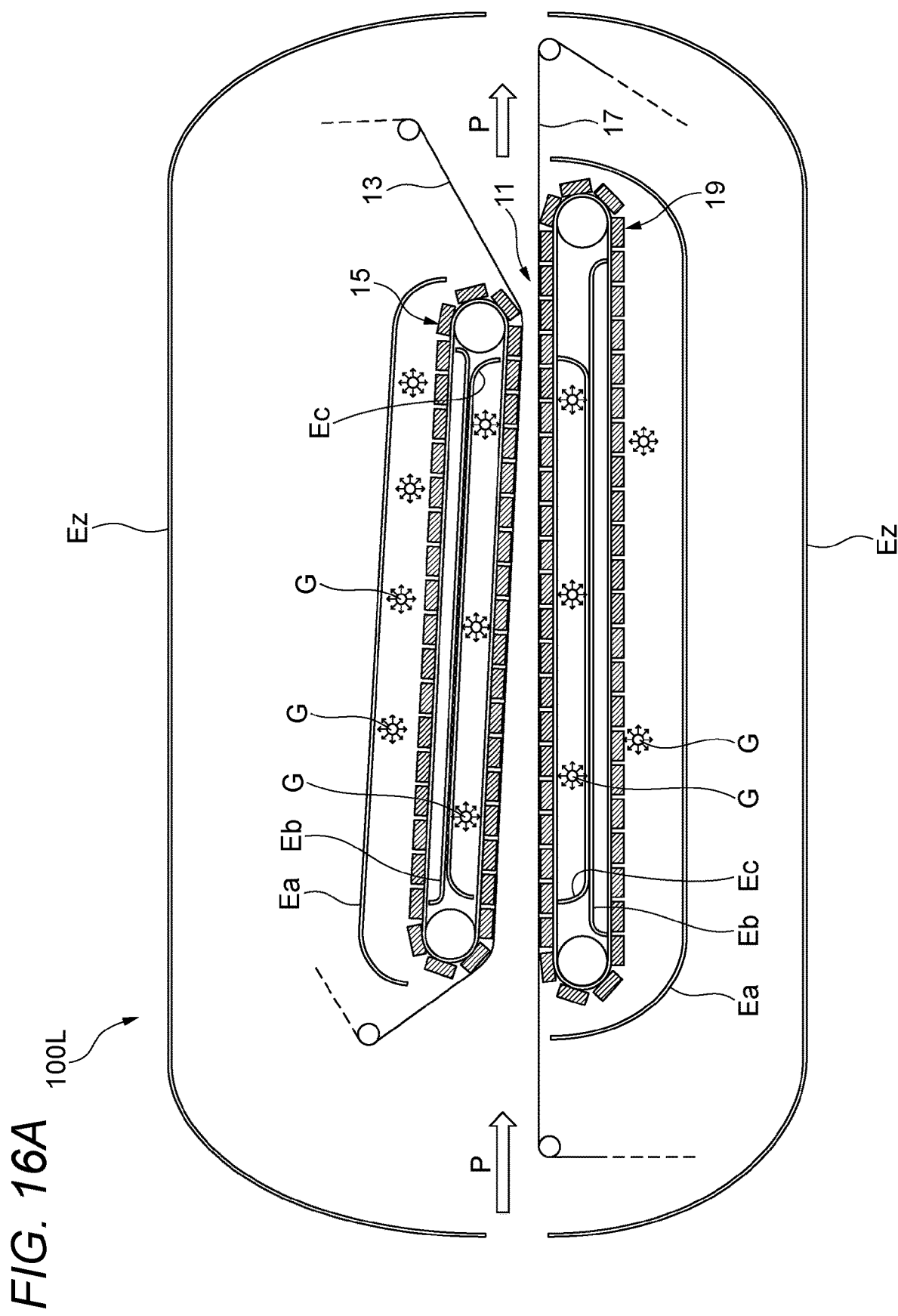

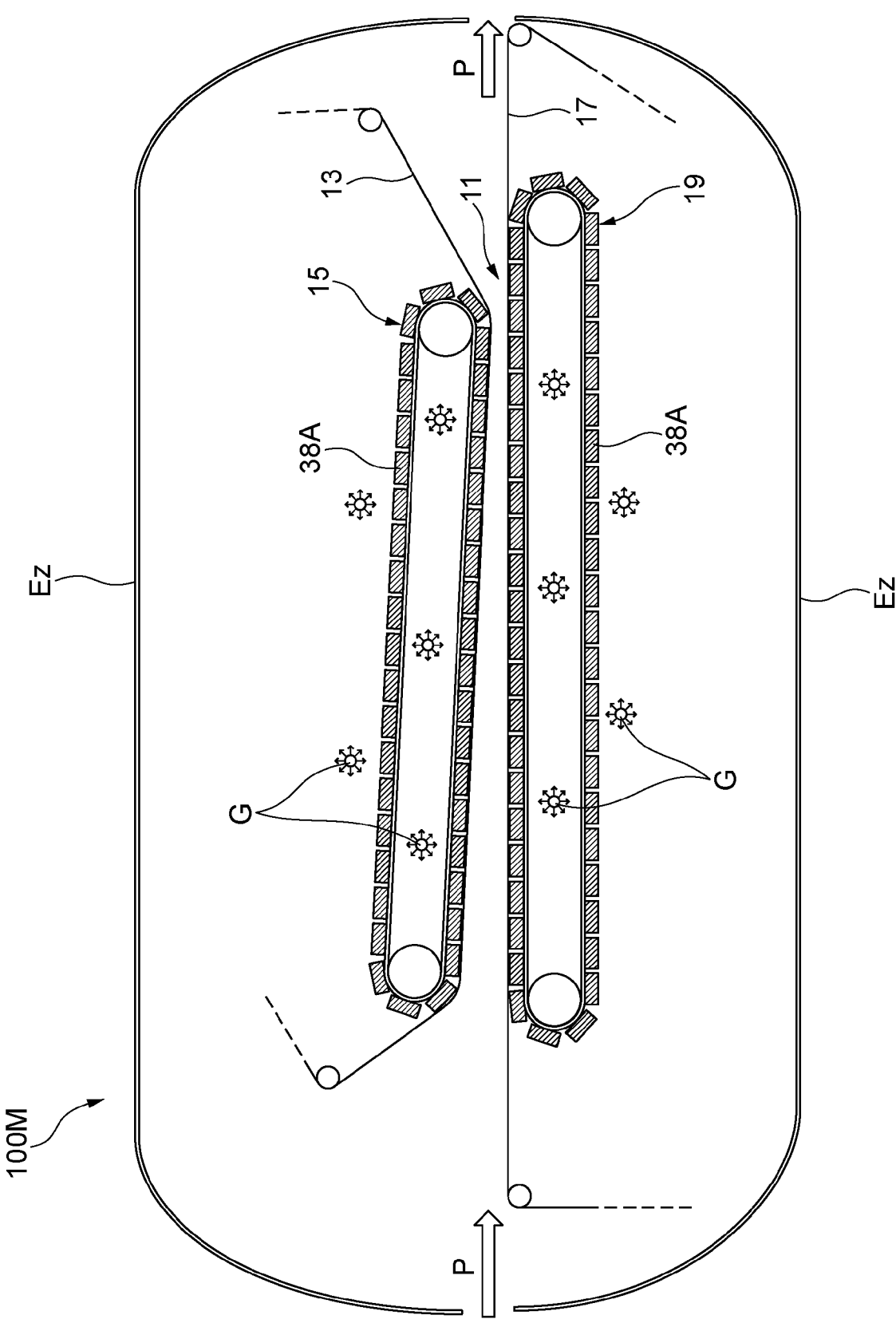

CONTINUOUS SHAPING MACHINE FOR BEAN CURDS

TECHNICAL FIELD

The present invention relates to a continuous shaping machine for bean curds.

BACKGROUND ART

In traditional manufacture of tofu, tofu was shaped by filling a box-shaped die made of wood with half-curdled soymilk and compressing the half-curdled soymilk via a cotton cloth. Although the use of the wooden box-shaped die is less hygienic, it enabled manufacture of tofu (firm tofu) that is flexible and delicious because it is high in the ability to maintain temperature, that is, is low in the rate of heat release during shaping. However, in modern tofu manufacturing equipment, from sanitary requirements, box-shaped dies that are formed with a thin plate made of stainless steel, aluminum, or the like are used mainly. In recent years, continuous shaping machines of a plate conveyor type or the like have come to be used (refer to Patent documents 1 and 2, for example) in which filter cloth belts made of resin monofilament yarn and serving as cotton cloths are disposed so as to run side-by-side with respective conveyors. In this machine, curdled soymilk is compressed receiving pressure from the metal plates of the conveyors via the filter cloth belts.

Whereas soymilk being processed to manufacture tofu is small in the number of germs because it is heated to 60° C. or more, tofu that has been cooled to normal temperature after completion of the curdling of the soymilk is prone to become a hotbed of germs. Thus, it is necessary to prevent germs from sticking to the surfaces of tofu by sterilizing such devices as the conveyors of the tofu manufacturing equipment. Techniques for sterilizing such devices as the conveyors have been proposed so far (refer to Patent document 3, for example).

PRIOR ART DOCUMENTS

Patent Documents

Patent document 1: JP-A-2005-261369
Patent document 2: Japanese Patent No. 5,215,941
Patent document 3: Japanese Patent No. 3,652,740

SUMMARY OF THE INVENTION

Problems to be Solved by the Invention

The sterilization technique of Patent document 3 is to sterilize what are involved in the entire process for conveying to a cooling water tank and, in particular, is intended to sterilize the surfaces of tofu. Conventionally, bean curds are handled in such a manner that it is usually distributed being kept at as low a temperature as 10° C. or low and is consumed within at most four to five days after its manufacture. Thus, it is not necessary to perform absolute sterilization processing on such devices as the conveyors. However, in recent years, it has been desired to elongate the best-before period to make it possible to provide bean curds to regions the distribution to which requires a long time and to store the bean curds for a long time so as to meet the life style etc. of consumers. For example, there is a demand that a guarantee be given that, for example, bean curds can be stored for 60 days or more in a state that it is kept at as low a temperature as 5° C. To elongate the best-before period, it is important to greatly decrease the number of viable germs stuck to such devices as the conveyors by performing higher-level sterilization processing. In particular, if germs remain on the filter cloth belts that tend to become hotbeds of germs, germs may stick to tofu products and proliferate during storage of the products to impair their product values. To enable long-term storage as mentioned above, the sterilization processing of Patent document 3 is insufficient and more complete cleaning and sterilization processing is indispensable.

On the other hand, continuous shaping machines such as recent plate conveyor type ones are high in production efficiency with priority given to labor saving, economy, and weight reduction. This results in a tendency of thinking less of the quality of bean curds than before. For example, a thin metal plate is easy to heat and cool and hence is lower in the ability to maintain the temperature of bean curds. If the temperature of bean curds lowers due to heat release, it becomes softer and is decreased in binding capacity, as a result of which it becomes prone to suffer a "sticking to cloth" phenomenon that bean curds sticks to a cotton cloth. Ordinary procedures for preventing the "sticking to cloth" phenomenon are to set the curdling temperature of bean curds too high and to add a coagulant a little excessively. These measures cause reduction of the flexibility and flavor of bean curds, that is, degradation of its product quality.

The present invention has been made in view of the above problems, and a first object of the invention is therefore to provide a continuous shaping machine for bean curds that makes it possible to store bean curds for a long time without degradation of its product quality by performing cleaning and sterilization to reliably remove germs stuck to the filter cloth belts and the conveyors of the continuous shaping machine. A second object of the invention is to provide a continuous shaping machine for bean curds capable of manufacturing high-quality tofu by preventing the "sticking to cloth" phenomenon that bean curds stick to the filter cloth belts.

The invention provides the following configurations:

(1) A continuous shaping machine for bean curds which is equipped with a pair of endless filter cloth belts that are an upper filter cloth belt and a lower filter cloth belt to circulate outside and a pair of endless conveyors that are an upper conveyor and a lower conveyor to circulate inside, and which compression-shapes curdled soymilk by conveying the curdled soymilk while sandwiching the curdled soymilk between the upper filter cloth belt and conveyor and the lower filter cloth belt and conveyor, wherein the continuous shaping machine comprises: heating units which perform heating sterilization in prescribed ranges of a return process that corresponds to regions, from a termination portion of a conveyance passage where the curdled soymilk is sandwiched to a start position of the conveyance passage, of circulation routes of the filter cloth belts.

(2) A continuous shaping machine for bean curds which is equipped with a pair of endless filter cloth belts that are an upper filter cloth belt and a lower filter cloth belt to circulate outside and a pair of endless conveyors that are an upper conveyor and a lower conveyor to circulate inside, and which compression-shapes curdled soymilk by conveying the curdled soymilk while sandwiching the curdled soymilk between the upper filter cloth belt and conveyor and the lower filter cloth belt and conveyor, wherein the continuous shaping machine comprises: heating units which perform heating sterilization in prescribed ranges of at least one of a return process that corresponds to, of circulation routes of the filter cloth belts and the conveyors, regions from a termination portion of a conveyance passage where the curdled soymilk is sandwiched to a start position of the conveyance passage and a feed process that corresponds to regions from the start position of the conveyance passage to the termination portion of the conveyance passage.

(3) The continuous shaping machine for bean curds according to (1) or (2), wherein each of the heating units comprises vapor nozzles which jet out heated vapor.

(4) The continuous shaping machine for bean curds according to any one of (1) to (3), wherein the heating units have a partition member or members which surround the prescribed ranges, and heat internal spaces surrounded by the partition member or members.

(5) The continuous shaping machine for bean curds according to any one of (1) to (4), wherein an atmosphere temperature of the prescribed ranges being heated by the heating units is higher than or equal to 60° C. and lower than or equal to 105° C.

(6) The continuous shaping machine for bean curds according to (5), wherein the filter cloth belts and the conveyors are driven at such a circulation speed so as to pass the prescribed ranges once in a time that is longer than or equal to 1 sec and shorter than or equal to 3,600 sec.

(7) The continuous shaping machine for bean curds according to any one of (1) to (6), wherein an alkali cleaning unit which cleans a corresponding one of the filter cloth belts by an alkaline liquid, an acid cleaning unit which cleans the corresponding filter cloth belt by an acidic liquid, and the heating unit are arranged in this order downstream in a circulation direction of the corresponding filter cloth belt in the return process which involves the corresponding filter cloth belt.

(8) The continuous shaping machine for bean curds according to any one of (1) to (6), wherein an alkali cleaning unit which cleans a corresponding one of the conveyors by an alkaline liquid, an acid cleaning unit which cleans the corresponding conveyor by an acidic liquid, and the heating unit are arranged in this order downstream in a circulation direction of the corresponding conveyor in the return process which involves the corresponding conveyor.

(9) The continuous shaping machine for bean curds according to (7) or (8), wherein a water cleaning unit which sprays cleaning water to a corresponding one of the filter cloth belts is disposed at at least one of a position upstream of the alkali cleaning unit in the circulation direction, a position between the alkali cleaning unit and the acid cleaning unit, and a position between the acid cleaning unit and the heating unit.

(10) The continuous shaping machine for bean curds according to (9), wherein the water cleaning unit is disposed so as to be able to spray cleaning water to a corresponding one of the conveyors using a high-pressure pump.

(11) The continuous shaping machine for bean curds according to any one of (7) to (10), wherein:

the concentration of the alkaline liquid is higher than or equal to 0.5% and lower than or equal to 10%; and the concentration of the acidic liquid is higher than or equal to 0.1% and lower than or equal to 10%.

(12) The continuous shaping machine for bean curds according to any one of (1) to (11), wherein each of the conveyors is an endless plate conveyor that is a connection of a number of plate members which are formed with at least one of a flat steel, a shaped steel, and a steel pipe.

(13) The continuous shaping machine for bean curds according to (12), wherein each of the plate members has a hollow structure having a hollow space and at least one of a heat insulation/heat-retaining member or a heat storage member is provided in the hollow space.

(14) The continuous shaping machine for bean curds according to (12), wherein each of the plate members has a hollow structure having a hollow space and the follow space includes a heat insulation region that is sealed so as to be in a low-pressure state.

Advantages of the Invention

The invention makes it possible to store bean curds for a long time without degradation of its product quality by performing cleaning and sterilization to reliably remove germs stuck to the filter cloth belts and the conveyors of a continuous shaping machine. The invention also makes it possible to manufacture high-quality tofu by preventing the "sticking to cloth" phenomenon that bean curds stick to the filter cloth belts and enhancing heat retainability during shaping.

BRIEF DESCRIPTION OF THE DRAWINGS

FIG. 13 is a partially sectional view, taken by a plane that is parallel with the conveying direction, of a shaping machine having a sixth example configuration.

FIG. 14 is a schematic partially sectional view, taken by a plane that is perpendicular to the conveying direction, of a shaping machine having a seventh example configuration.

FIG. 15A is a schematic side view of part of a shaping machine having an eighth example configuration.

FIG. 15B is a schematic sectional view of part of a shaping machine according to a first modification.

FIG. 15D is a schematic sectional view of part of a shaping machine according to a third modification.

FIG. 15E is a schematic sectional view of part of a shaping machine according to a fourth modification.

FIG. 16A is a schematic side view of part of a shaping machine having a ninth example configuration.

FIG. 16B is a schematic sectional view of part of a shaping machine according to a modification.

DETAILED DESCRIPTION OF PREFERRED EMBODIMENTS

Specific embodiments of the present invention will be hereinafter described in detail with reference to the drawings.

Example Configuration 1

Figure 1:
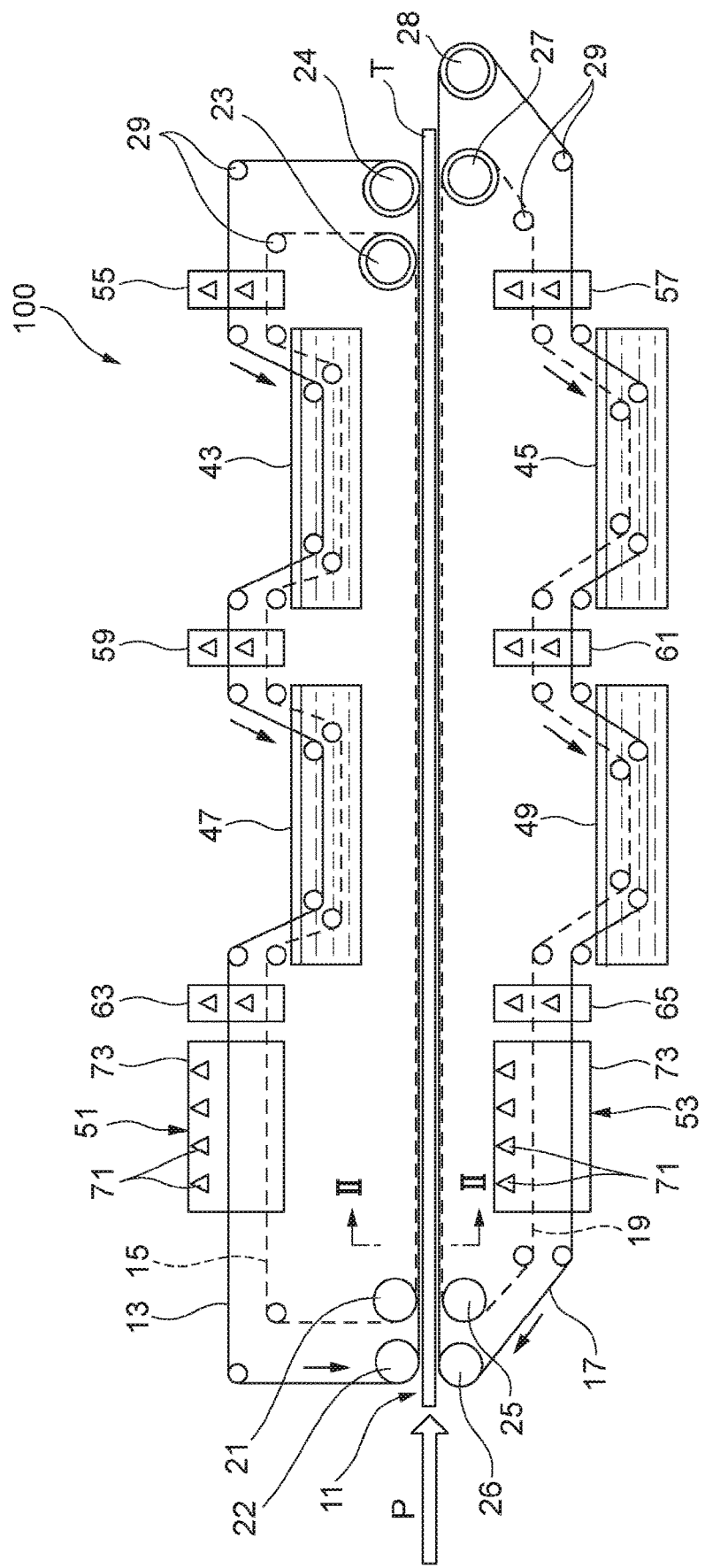
FIG. 1 is a diagram for description of an embodiment of the present invention, that is, a diagram illustrating a rough overall configuration of a continuous shaping machine for bean curds.
Figure 2:
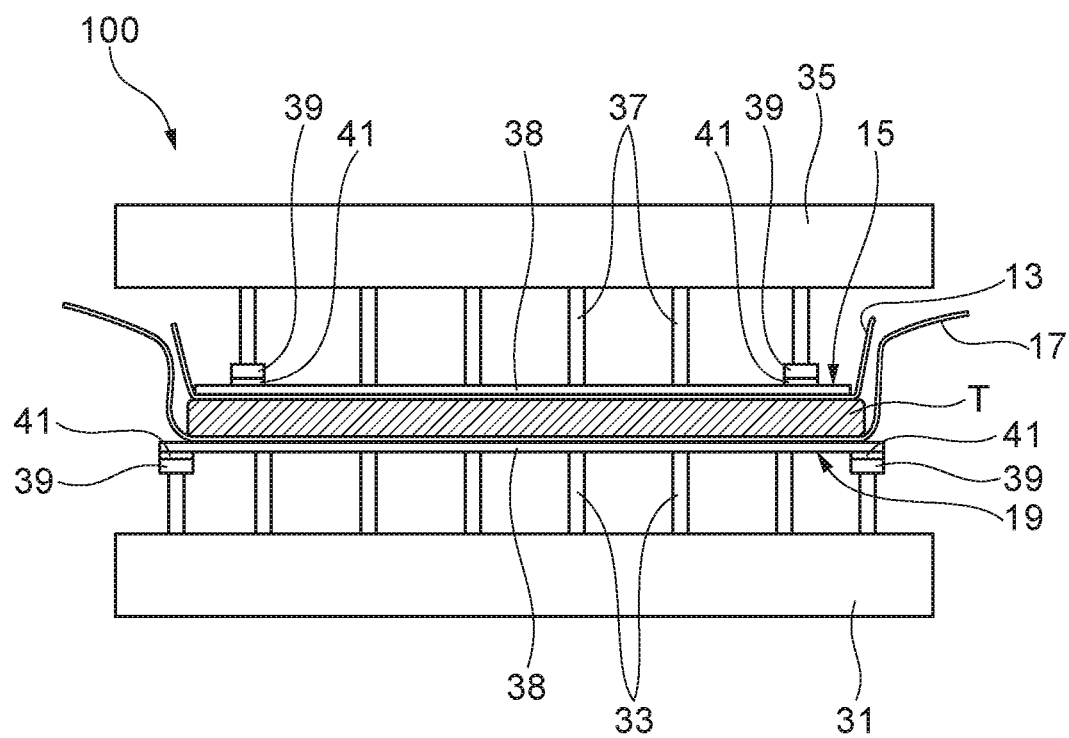
FIG. 2 is a sectional view taken along line II-II in FIG. 1.

FIG. 1 is a diagram for description of an embodiment of the invention, that is, a diagram illustrating a rough overall configuration of a continuous shaping machine for bean curds. FIG. 2 is a sectional view taken along line II-II in FIG. 1. In the continuous shaping machine 100 for bean curds having this configuration (hereinafter referred to as a "shaping machine 100"), an endless filter cloth belt 13 which goes around outside and an endless conveyor 15 which goes around inside (a filter cloth/conveyor pair) are disposed over a conveyance passage 11 for curdled soymilk T which is tofu dough and an endless filter cloth belt 17 which goes around outside and an endless conveyor 19 which goes around inside (a filter cloth/conveyor pair) are disposed under the conveyance passage 11.

The pair of (i.e., upper and lower) endless filter cloth belts 13 and 17 (represented by solid lines in FIG. 1) and the pair of (i.e., upper and lower) endless conveyors 15 and 19 (represented by broken lines in FIG. 1) which go around inside the respective endless filter cloth belts 13 and 17 in synchronism with them convey, in a conveying direction P, the curdled soymilk T which is a conveyance target while holding it in the top-bottom direction. The vertical interval of the conveyance passage 11 is smaller than or equal to the thickness of the curdled soymilk T, and the curdled soymilk T is conveyed in the conveying direction P being compressed by the conveyors 15 and 19. As the curdled soymilk T travels along the conveyance passage 11, it is compressed and an aqueous component (called whey, shimizu (clear water), or yu (warm water)) is discharged, whereby it is consolidated and turns to shaped bean curds.

In this specification, the term "bean curds" means silken tofu, firm tofu (including kinds from soft firm tofu to very hard firm tofu, kata-dofu (hard tofu), dougan, etc.), soft firm tofu, (thick) deep-fried tofu dough, deep-fried silken tofu dough, thin deep-fried tofu or thick deep-fried tofu, fried tofu dough such as seasoned sushi fried tofu, dough of deep-fried tofu mixed with thinly sliced vegetables, or a product obtained by subjecting any of the above kinds of tofu or dough to secondary processing (including refrigeration or freeze drying). To manufacture silken tofu, in a shaping machine of a curdling and shaping line for both of silken tofu and firm tofu, the conveyor over the conveyance passage 11 is elevated to allow passage of pudding-like curdled soymilk without being brought into contact with or strongly compressed by it and to then be subjected to maturation (refer to Patent document 2).

The upper conveyor 15 goes around over the conveyance passage 11 being driven by a conveying roller 23. The upper filter cloth belt 13 goes around over the conveyance passage 11 being driven by a filter cloth belt drive roller 24 which is a cloth-wound rubber roller. The lower conveyor 19 goes around under the conveyance passage 11 being driven by a conveying roller 27. The lower filter cloth belt 17 goes around under the conveyance passage 11 being driven by a filter cloth belt drive roller 28. Plural driven rollers 29 are disposed along a circulation route of each of the filter cloth belts 13 and 17 and the conveyors 15 and 19. Only the conveying rollers (e.g., conveying rollers 23 and 27), located on one side in the conveying direction, for the filter cloth belts 13 and 17 and the conveyors 15 and 19 are driven by a motor (not shown) in synchronism with each other, and conveying rollers (e.g., conveying rollers 23 and 27) for them located on the other side are thus driven, whereby curdled soymilk T is conveyed.

For example, each of the filter cloth belts 13 and 17 is an endless belt that is made of filter cloth woven by plain weaving, twill weaving, or the like of yarn (monofilament or multifilament; 0.1 to 1.0 mm in diameter) made of a fluorine resin, a polyester resin (polyethylene terephthalate resin), a polypropylene resin, an aramid fiber resin, or the like for food processing. Filter cloth has properties that it has such tensile strength as to endure mechanical tension, is relatively flexible, and is easy to bend into a concave shape. There are no particular limitations on the material etc. of each filter belt; for details, refer to Japanese Patent No. 4,004,413, for example.

As shown in FIG. 2, the conveyor 19 is supported by plural support rails 33 erected from a base stage 31 so as to be movable in the circulation (conveying) direction (i.e., in the direction perpendicular to the sheet surface in FIG. 2). An elevation unit 35 which is supported by an elevation mechanism (not shown) so as to be movable in the top-bottom direction is disposed over the base stage 31. Plural support rails 37 hang down from the elevation unit 35 and press the conveyor 15 uniformly toward curdled soymilk T located under it.

Figure 3:
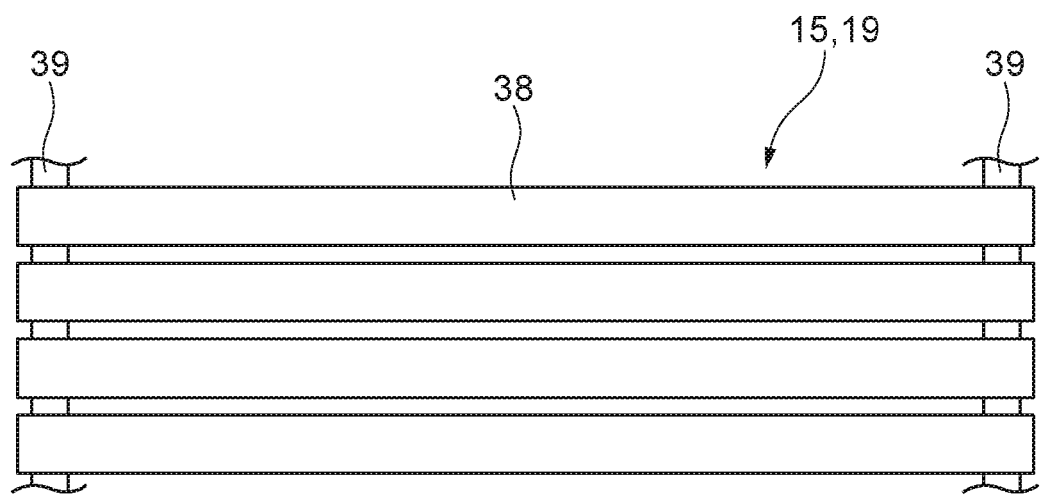
FIG. 3 is a plan view of part of each of conveyors.
Figure 4:
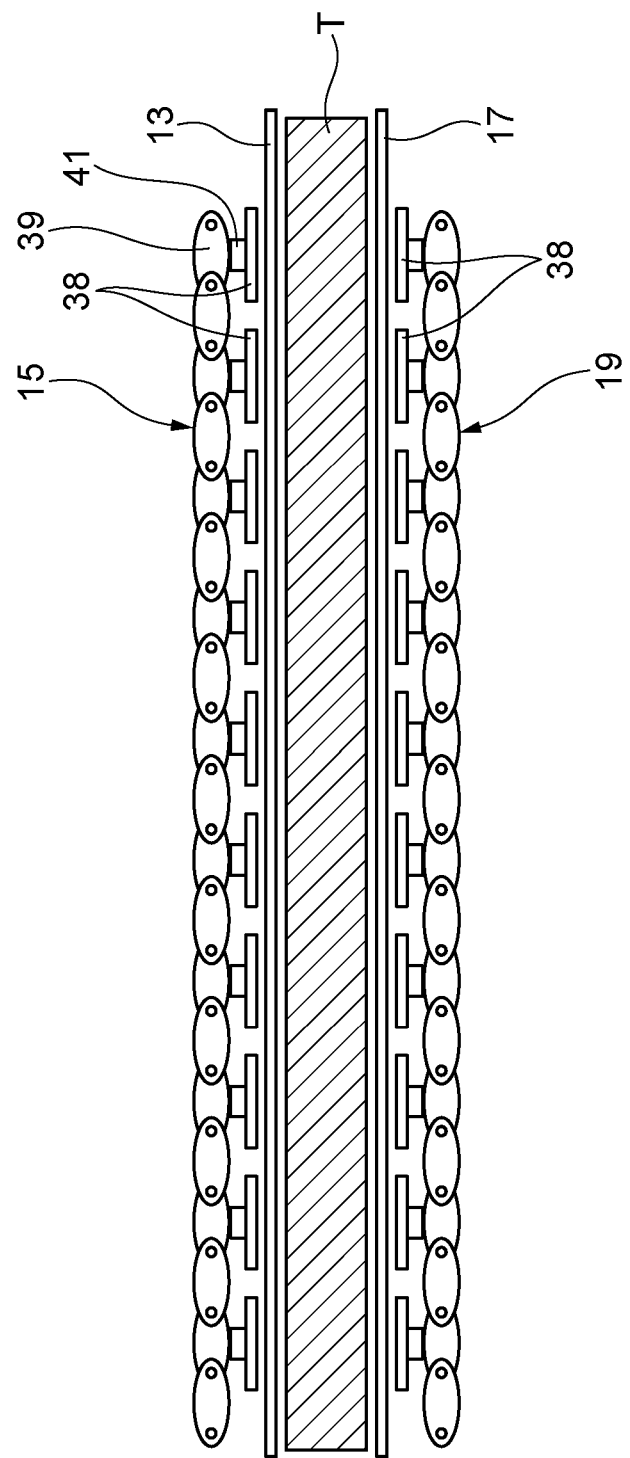
FIG. 4 is a sectional view of parts of cross sections, taken along the traveling direction, of the conveyors.

FIG. 3 is a plan view of part of each of the conveyors 15 and 19, and FIG. 4 is a partially sectional view of parts of cross sections, taken along the traveling direction, of the conveyors 15 and 19. As shown in FIGS. 3 and 4, each of the conveyors 15 and 19 is a Caterpillar (registered trademark)-type conveyor and has many Caterpillar plates 38 which are flat plate members and chains 39 which are disposed at the two respective ends in the direction perpendicular to the traveling direction of the Caterpillar plates 38.

The Caterpillar plates 38 may be either arranged consecutively with almost no gaps in the traveling direction or arranged with certain gaps in the traveling direction. The Caterpillar plates 38 may be provided with a draining mechanism and thus have a structure that allows easy drainage of aqueous components.

As shown in FIG. 4, each chain 39 is attached to the Caterpillar plates 38 via connection members 41. The Caterpillar plates 38 are moved along the circulation route by driving (i.e., circulating) the chains 39 by the motor (not shown) via the conveying rollers 23 and 27 (see FIG. 1) and the driven rollers 21 and 25 (see FIG. 1). The conveyors 15 and 19 are driven at the same circulation speed. The filter cloth belts 13 and 17 are driven (i.e., circulated) at the same circulation speed as the Caterpillar plates 38 as the filter cloth belt drive rollers 24 and 28 are driven by the motor (not shown).

Of the circulation routes of the filter cloth belt 13 and the conveyor 15 and the circulation routes of the filter cloth belt 17 and the conveyor 19 (see FIG. 1), regions constituting the conveyance passage 11, that is, the region between the conveying rollers 22 and 24 and the region between the conveying rollers 26 and 28 are regions, corresponding to a feed process (feed path), of the filter cloth belts 13 and 17, respectively. The region between the conveying rollers 21 and 23 and the region between the conveying rollers 25 and 27 are regions, corresponding to the feed process (feed path), of the conveyors 15 and 19, respectively. In these regions corresponding to the feed process, the filter cloth belts 13 and 17 and the conveyors 15 and 19 extend straightly along the conveyance passage 11. In the conveyance passage 11, curdled soymilk T is conveyed being sandwiched in the top-bottom direction between the filter cloth belts 13 and 17 and is thereby compression-shaped.

Of each of the above-mentioned circulation routes, the region from the termination position of the conveyance passage 11 where curdled soymilk T is sandwiched to its start position corresponds to a return process (return path) in a broad sense. That is, the return process in a broad sense includes direction change processes located at the two respective ends of the feed process. The direction change processes correspond to regions of the circulation routes where the filter cloth belts 13 and 17 and the conveyor 15 and 19 leave curdled soymilk T at the downstream termination position of the conveyance passage 11 and change their traveling directions greatly and regions of the circulation routes immediately before the filter cloth belts 13 and 17 and the conveyors 15 and 19 come close to the curdled soymilk T after changing their traveling directions greatly in the vicinity of the upstream start position of the conveyance passage 11. However, in this specification, where a return process and a direction change process(es) are described together, the return process means a process corresponding to a remaining region that corresponds to a return process in a broad sense excluding the direction change processes.

In the feed process of the shaping machine 100, as described above, curdled soymilk T is compressed being sandwiched between the conveyors 15 and 19 via the filter cloth belts 13 and 17. During that course, the curdled soymilk T receives pressing force from the conveyors 15 and 19 via the filter cloth belts 13 and 17 and discharges aqueous components such as whey. Cleaning and sterilization are performed in the return process after the filter cloth belts 13 and 17 and the conveyors 15 and 19 pass the conveying rollers 23 and 27 and the conveying rollers 24 and 28 and leave the curdled soymilk T. Then the curdled soymilk T is returned to the positions of the conveying rollers 21 and 25 and the conveying rollers 22 and 26.

Next, the details of the configuration of the return process of the shaping machine 100 will be described.

In the shaping machine 100, an alkali cleaning tank 43 as an alkali cleaning unit, an acid cleaning tank 47 as an acid cleaning unit, and a vapor sterilization tank 51 as a heating unit are arranged in this order from the upstream side toward the downstream side in the circulation direction of the filter cloth belt 13 and the conveyor 15 in the return regions of the circulation routes of the filter cloth belt 13 and the conveyor 15. Likewise, an alkali cleaning tank 45, an acid cleaning tank 49, and a vapor sterilization tank 53 are arranged in this order from the upstream side toward the downstream side in the above circulation direction in the return regions of the circulation routes of the filter cloth belt 17 and the conveyor 19.

Furthermore, a water cleaning unit 55 is disposed upstream of the alkali cleaning tank 43 in the circulation direction on the circulation routes of the filter cloth belt 13 and the conveyor 15. A water cleaning unit 59 is disposed between the alkali cleaning tank 43 and the acid cleaning tank 47, and a water cleaning unit 63 is disposed between the acid cleaning tank 47 and the vapor sterilization tank 51.

Likewise, a water cleaning unit 57 is disposed upstream of the alkali cleaning tank 45 in the circulation direction on the circulation routes of the filter cloth belt 17 and the conveyor 19. A water cleaning unit 61 is disposed is disposed between the alkali cleaning tank 45 and the acid cleaning tank 49, and a water cleaning unit 65 is disposed between the acid cleaning tank 49 and the vapor sterilization tank 53.

In the alkali cleaning tanks 43 and 45, the filter cloth belt 13 and the conveyor 15 are immersed in an alkaline liquid. In the acid cleaning tanks 47 and 49, the filter cloth belt 13 and the conveyor 15 are immersed in an acidic liquid. Although in the illustrated example the filter cloth belt 13 and the conveyor 15 are immersed in the same alkali cleaning tank 43 and acid cleaning tank 47 and the filter cloth belt 17 and the conveyor 19 are immersed in the same alkali cleaning tank 45 and acid cleaning tank 49, the filter cloth belt 13 and the conveyor 15 may be immersed in separate alkali cleaning tanks and separate acid cleaning tanks and the filter cloth belt 17 and the conveyor 19 may be immersed in separate alkali cleaning tanks and separate acid cleaning tanks. During manufacture, instead of a liquid chemical, hot water of 60° C. to 100° C. may be put in each alkali cleaning tank and each acid cleaning tank to perform hot water cleaning and sterilization. Alternatively, it possible to refrain from putting even hot water in each tank and use it as a vapor sterilization tank where to perform vapor heating at 60° C. to 105° C. using a vapor supplying means that is provided for each tank.

A sodium hydroxide solution of 0.5% or higher (preferably 1% or higher, most preferably 2% or higher) and 10% or lower in concentration, pH9 or higher (preferably pH11 or higher, most preferably pH13 or higher), and 60° C. to 100° C. in temperature can be used as the alkaline liquid to be put in the alkali cleaning tanks 43 and 45. Instead of a sodium hydroxide solution, a solution of potassium hydroxide, sodium carbonate, sodium silicate, sodium phosphate, or the like may be used (under the conditions of 0.5% to 10%, pH9 to pH14, and 40° C. to 100° C.). That is, alkaline liquids having a concentration that is higher than or equal to 0.5% (preferably higher than or equal to 1%, even preferably higher than or equal to 2%) and lower than or equal to 10% (preferably lower than or equal to 5%) are usable. The reasons why the concentration of the alkaline liquid is set in the above range are that the cleaning effect is low when the concentration is lower than 0.5% and that even if the concentration is set higher than 10%, a concentration increase causes no particular increase in the cleaning effect whereas packings etc. made of resin, rubber, or the like are prone to deteriorate so much as to complicate work of dealing with them.

A citric acid solution of 0.1% or higher (preferably 0.5% or higher, most preferably 1% or higher) and 10% or lower in concentration and pH5 or lower (preferably pH3 or lower) can be used as the acidic liquid to be put in the acidic cleaning tanks 47 and 49. Instead of a citric acid solution, a solution of hydrochloric acid, oxalic acid, malic acid, tartaric acid, gluconic acid, formic acid, phosphoric acid, nitric acid, sulfamic acid, or the like may be used (under the conditions of 0.1% to 10%, pH1 to pH5, and 40° C. to 100° C.). That is, acidic liquids having a concentration that is higher than or equal to 0.1% and lower than or equal to 10% (preferably lower than or equal to 5%) are usable. The reasons why the concentration of the acidic liquid is set in the above range are that the cleaning effect is low when the concentration is lower than 0.1% and that even if the concentration is set higher than 10%, a concentration increase causes no particular increase in the cleaning effect whereas members made of stainless steel etc. are prone to corrode so much as to complicate work of dealing with them.

Instead of clear water (e.g., tap water or sterile water produced by passage through a sterile filtration filter), a neutral liquid chemical capable of sterilization such as ozonized water, sodium hypochlorite liquid, hypochlorous acid water, or the like can be used as the clear water to be used in the water cleaning units 55, 57, 59, 61, 63, and 65. In the water cleaning units 55 and 57, it is indispensable to remove tofu pulp reliably; it is therefore preferable that the water cleaning units 55 and 57 be of such a type as to remove tofu pulp using a strong water stream produced by a high-pressure pump. In the water cleaning units 59, 61, 63, and 65, sprinkling using water having an appropriate low pressure may be performed; in a certain situation, they may be omitted as appropriate. The alkaline liquid can be neutralized in the downstream acid cleaning tank. The acidic liquid may be removed in the downstream vapor sterilization tank by vapor jetting and a rinsing effect of resulting vapor condensation water (splashes) or hot water produced by a hot water supplying means provided in the vapor sterilization tank; a synergy effect that a heat sterilization effect is further enhanced under an acidic condition is also expected.

Each of the vapor sterilization tanks 51 and 53 has vapor nozzles 71 and a partition member 73. Each vapor nozzle 71 jets out, via an adjustment valve, uniform water vapor of 0.05 to 0.4 MPa produced by reducing the pressure of water vapor of 0.5 to 2.0 MPa that is supplied from a boiler into the vapor sterilization tank 51 or 53. The jetted-out water vapor is vapor that is higher than or equal to 90° C. and lower than or equal to 105° C. and is exposed to atmospheric air almost fully. The vapor pressure of the jetted-out water vapor is equal to or a little higher than atmospheric pressure, and is 0.10 to 0.12 MPa in terms of absolute pressure and 0.00 to 0.02 MPa in terms of gauge pressure. One or plural vapor nozzles 71 of the vapor sterilization tank 51 are arranged along the circulation routes of the filter cloth belt 13 and the conveyor 15. One or plural vapor nozzles 71 of the vapor sterilization tank 53 are arranged along the circulation routes of the filter cloth belt 17 and the conveyor 19.

The partition member 73 is configured so as to include curtains disposed at the entrance and exit of each of the vapor sterilization tanks 51 and 53 and a cover that surrounds the tank. The partition member 73 of the vapor sterilization tank 51 is disposed so as to surround prescribed ranges of the circulation routes of the filter cloth belt 13 and the conveyor 15, and the partition member 73 of the vapor sterilization tank 53 is disposed so as to surround prescribed ranges of the circulation routes of the filter cloth belt 17 and the conveyor 19. In the internal space surrounded by the partition member 73, since the vapor nozzles 71 arranged in the internal space jet out heated vapor, the atmosphere temperature is made uniform and set to be at least higher than or equal to 60° C. (preferably higher than or equal to 80° C., even preferably higher than or equal to 90° C.) and lower than or equal to 105° C. (preferably lower than or equal to 100° C.). In particular, to assure a long-term best-before period, it is preferable that the atmosphere temperature be set in a range of 90° C. to 105° C. or the temperature of curdled soymilk be kept in a range of 90° C. to 100° C. Although not shown in any drawing, instead of the above-mentioned curtains, a vapor leak-preventing means of, for example, a water sealing type may be disposed at the entrance and exit of each of the vapor sterilization tanks 51 and 53 to increase the airtightness and keep the atmosphere temperature higher than or equal to 100° C. and lower than or equal to 105° C. by establishing a positive pressure state (a little higher than atmospheric pressure) inside each of the vapor sterilization tanks 51 and 53 surrounded by the partition member 73.

As described above, in each of the vapor sterilization tanks 51 and 53, vapor is blown over the filter cloth belt 13 and the conveyor 15 or the filter cloth belt 17 and the conveyor 19 from the vapor nozzles 71. The internal space that is defined by the partition member 73 is filled with vapor that is jetted out from the nozzles 71. As a result, the temperature in the entire internal space is increased to the above-mentioned atmosphere temperature, whereby the filter cloth belt 13 and the conveyor 15 or the filter cloth belt 17 and the conveyor 19 are heat-sterilized with high efficiency.

<Compression Shaping, Cleaning, and Sterilization of Bean Curds>

The shaping machine 100 having the above configuration compression-shapes curdled soymilk T according to the following procedure. Curdled soymilk T is supplied to between the pair of filter cloth belts 13 and 17 (between the pair of conveyors 15 and 19) disposed over and under the conveyance passage 11, respectively. The curdled soymilk T is sheet-like curdled soymilk produced by a certain machine (not shown) by adding a coagulant such as bittern to soymilk and subjecting resulting soymilk to curdling, shaping, and maturation continuously.

The curdled soymilk T passes between the filter cloth belts 13 and 17 (between the conveyors 15 and 19) located over and under the conveyance passage 11, respectively. During that course, the curdled soymilk T is pressed by the upper conveyor 15 and the lower conveyor 19 via the filter cloth belts 13 and 17 and thereby made compression-shaped bean curds. By performing the above processing continuously, sheet-like bean curds such as fried tofu dough, firm tofu, soft firm tofu, or silken deep-fried tofu dough having, for example, a height (thickness) of 1 to 150 mm and a width of 300 to 3,000 mm (dimensions after the shaping) can be mass-produced efficiently.

After compression-shaping the curdled soymilk T, the filter cloth belts 13 and 17 and the conveyors 15 and 19 are conveyed to the water cleaning units 55 and 57 in the return process which corresponds to parts of the circulation routes. How the upper filter cloth belt 13 and the upper conveyor 15 operate which are located over the conveyance passage 11 will be described below.

In the water cleaning unit 55, high-pressure cleaning water is sprayed onto the filter cloth belt 13 and the conveyor 15, whereby residues of the curdled soymilk T, discharged whey, etc. sticking to the surfaces of the filter cloth belt 13 and the conveyor 15 are washed away. It is preferable that the water cleaning unit 55 be configured so as to spray high-pressure cleaning water onto the filter cloth belt 13 from the back side (i.e., onto its surface that was not in contact with the tofu) to drop tofu pulp to the front side of the filter cloth belt 13. Alternatively, tofu pulp may be dropped to the back side by breaking it into pieces by spraying from the front side (i.e., onto its surface that was in contact with the tofu). As a further alternative, spraying may be performed first from the back side and then from the front side.

After being subjected to the high-pressure cleaning, the filter cloth belt 13 and the conveyor 15 are moved to the alkali cleaning tank 43. In the alkali cleaning tank 43, the filter cloth belt 13 and the conveyor 15 being moved are immersed in the alkaline liquid put therein and cleaned by decomposing organic substances such as oil and protein. As a result, small residues of the curdled soymilk T sticking to the filter cloth belt 13 and the conveyor 15 are removed by the alkaline liquid. It is preferable that the time of immersion in the alkaline liquid be longer than or equal to 1 sec (even preferably longer than or equal to 60 sec) and shorter than or equal to 3,600 sec (even preferably shorter than or equal to 600 sec).

The filter cloth belt 13 and the conveyor 15 that have been immersed in the alkali cleaning tank 43 are pulled up from the alkaline liquid and moved to the water cleaning unit 59. In the water cleaning unit 59, cleaning water is sprayed onto the filter cloth belt 13 and the conveyor 15 in the same manner as described above, whereby alkaline liquid is washed away from the filter cloth belt 13 and the conveyor 15.

The filter cloth belt 13 and the conveyor 15 that have passed through the water cleaning unit 59 are moved to the acid cleaning tank 47. In the acid cleaning tank 47, the filter cloth belt 13 and the conveyor 15 being moved are immersed in the acidic liquid put therein and cleaned by neutralizing very small amounts of alkalis that may remain and dissolving inorganic salts (scales) such as calcium carbonate. It is preferable that the time of immersion in the acidic liquid be longer than or equal to 1 sec (even preferably longer than or equal to 60 sec) and shorter than or equal to 3,600 sec (even preferably shorter than or equal to 600 sec).

The filter cloth belt 13 and the conveyor 15 that have been immersed in the acid cleaning tank 47 are pulled up from the acidic liquid and moved to the water cleaning unit 63. In the water cleaning unit 63, cleaning water is sprayed onto the filter cloth belt 13 and the conveyor 15 in the same manner as described above, whereby acidic liquid is washed away from the filter cloth belt 13 and the conveyor 15.

The filter cloth belt 13 and the conveyor 15 that have passed through the water cleaning unit 63 are moved to the vapor sterilization tank 51. In the vapor sterilization tank 51, high-temperature, ordinary-pressure vapor jetted out from the vapor nozzles 71 is blown over the filter cloth belt 13 and the conveyor 15 being moved. It is appropriate that the time it takes for the filter cloth belt 13 and the conveyor 15 to pass through the vapor sterilization tank 51 once (i.e., the time they stay there) be longer than or equal to 1 sec (preferably longer than or equal to 5 sec, even preferably longer than or equal to 10 sec) and shorter than or equal to 3,600 sec (preferably shorter than or equal to 600 sec).

In the vapor sterilization tank 51, heating is performed at an atmosphere temperature that is higher than or equal to 60° C. and lower than or equal to 105° C. for a staying time of 1 sec or longer, whereby a necessary sterilization effect is obtained. A more remarkable sterilization effect can be obtained by setting the staying time longer than or equal to 10 sec. On the other hand, where the staying time is longer than 3,600 sec, the quality of tofu such as flavor is degraded while an additional sterilization effect is hardly obtained. The process is thus inefficient because of restrictions relating to the length and installation space of the continuous shaping machine.

The above-mentioned immersion times and passage times can be adjusted by controlling the circulation speed of the filter cloth belt 13 and the conveyor 15. Alternatively, the machine may be designed in advance so as to elongate the above-mentioned immersion times and passage times by, for example, folding or pushing out the circulation route of each return portion plural times using plural driven rollers 29. An appropriate driving method and adjustment/control method can be employed for adjustment of the above-mentioned immersion times and passage times.

How the filter cloth belt 13 over the conveyance passage 11 and the conveyor 15 over the conveyance passage 11 operate has been described above. The filter cloth belt 17 under the conveyance passage 11 and the conveyor 19 under the conveyance passage 11 are configured in the same manners as the former and the same cleaning and sterilization processes as for the former are executed. That is, in their return processes, the filter cloth belt 17 and the conveyor 19 pass through the water cleaning unit 57, the alkali cleaning tank 45, the water cleaning unit 61, the acid cleaning tank 49, the water cleaning unit 65, and the vapor sterilization tank 53 in this order and are thereby subjected to cleaning and sterilization. Then, the filter cloth belt 17 and the conveyor 19 are returned to the feed process.

In the shaping machine 100 having the above configuration, in the return process which is executed after detachment of curdled soymilk T from the filter cloth belts 13 and 17 and the conveyors 15 and 19, the steps of (1) water cleaning, (2) alkali cleaning, (3) water cleaning, (4) acid cleaning, (5) water cleaning, and (6) vapor sterilization are executed in this order. As a result, protein dirt of curdled soymilk T sticking to the filter cloth belts 13 and 17 and the conveyors 15 and 19 can be removed completely. In particular, although the filter cloth belts 13 and 17 have such cloth shapes that residues of curdled soymilk T, germs, etc. are prone to stick to them, unnecessary substances can be removed reliably from them by the above-described cleaning and sterilization.

With the above-described configuration, since alkali cleaning and acid cleaning are performed upstream of vapor sterilization, the activity of viable germs can be weakened sufficiently even if they remain even after the acid cleaning. As a result, the sterilization effect of the vapor sterilization is enhanced to enable more complete sterilization. The order of the alkali cleaning and the acid cleaning may be reversed. The acid cleaning may be omitted for certain conditions.

Since in the above-described manner hyphae such as vegetative hyphae and heat-resistant spore-forming bacteria sticking to the filter cloth belts 13 and 17 and the conveyors 15 and 19 can be removed or killed more reliably than in conventional cases, the initial number of germs on shaped bean curds can be reduced to a large extent. Thus, proliferation of microbes (germs) during storage of bean curds can be suppressed for a long time. This enables long-term storage of bean curds and elongation of its best-before period.

Heated to high-temperatures in the vapor sterilization tanks 51 and 53, the conveyors 15 and 19 and the filter cloth belts 13 and 17 provide effects of heating curdled soymilk T and keeping it warm when they are in contact with the curdled soymilk T in the feed process. These heating effect and warmth maintaining effect prevent curdled soymilk T from becoming softer due to its temperature reduction and increase the binding capacity of tofu (dough). As a result, the probability of occurrence of a "sticking to cloth" phenomenon that bean curds stick to the upper and lower filter cloth belts can be lowered to a large extent.

In conventional shaping machines, the escape of heat from bean curds being compressed and conveyed is remarkable and hence a coagulant is added a little excessively to suppress the sticking-to-cloth phenomenon. As a result, bean curds manufactured tend to lose water and hence delicious taste and to cause such mouthfeels as fragility and roughness. In contrast, in the shaping machine 100 having the above configuration, it is not necessary to add a coagulant a little excessively and, instead, the amount of coagulant added can be reduced to a proper amount, whereby the quality of bean curds can be improved to such an extent as to cause or have a mouthfeel and flavor that are close to an old-time mouthfeel and flavor and increase is attained in economy. Furthermore, the curdling/maturation time and the compression/shaping time are shortened and the length of the continuous manufacturing line for bean curds is shortened to enable space saving.

<Structure of Caterpillar Plates>

Next, the structure of the above-described conveyors 15 and 19 will be described in more detail.

As shown in FIGS. 3 and 4, the Caterpillar plates 38 constituting each of the conveyors 15 and 19 are long and narrow and extend long in the direction perpendicular to their traveling direction and support the soft filter cloth belt 13 or 17. To this end, the surface to be opposed to curdled soymilk T of each Caterpillar plate 38 is made a flat surface. In other words, each Caterpillar plate 38 is a member at least part of one side of the outer circumference of whose cross section is straight. That is, it suffices that each Caterpillar plate 38 be a member at least whose surface to be opposed to curdled soymilk T is a flat surface and a member at least one of whose outer circumferential surfaces is a flat surface. With this measure, the area of heat transfer to curdled soymilk T is made wider and the efficiency of heating bean curds and keeping bean curds warm is increased.

A shaped steel such as a thick flat steel bar can be used suitably as each Caterpillar plate 38 having the above shape. As a result, the Caterpillar plates 38 are higher in heat insulation/heat retainability and heat-storing ability and can hold a larger quantity of heat when heated than conventional thin Caterpillar plates. Thus, heat can be transferred to curdled soymilk T indirectly, that is, via the filter cloth belts 13 and 17, whereby temperature reduction of bean curds due to at least heat release can be suppressed.

Each Caterpillar plate 38 may be a metal plate that is made of aluminum, iron, steel, titanium, or the like, has a flat, smooth surface, and is high in flexural rigidity. In particular, stainless steel that is low in thermal conductivity (<20 W/mK) (e.g., SUS304 (thermal conductivity: about 15 W/mK)) is suitably used as its material. Where the Caterpillar plates 38 are made of a material that is low in thermal conductivity, the rate of heat transfer from heated curdled soymilk T to the Caterpillar plates 38 is low, which makes it easier to keep the temperature of the curdled soymilk T in a prescribed range for tofu shaping.

Instead of a metal, a material having desired levels of heat resistance and stiffness such as ceramic, a resin (e.g., polypropylene or an engineering plastic such as fluorine resin or PEEK), FRP (a resin having a reinforcement core such as a resin containing glass fiber or PEEK containing carbon fiber), natural or synthetic stone, or natural or synthetic wood can be used as a material of the Caterpillar plates 38. In either case, in the U.S., materials certified by the FDA (Food and Drug Administration), for example, can be used. In Japan, materials that satisfy the standardized tests of the Food Sanitation Law, for example, can be used.

In general, the thermal conductivity of resins is sufficiently lower than that of carbon steel (about 47 W/mK) and is approximately equal to 0.2 W/mK at normal temperature. Thus, even relatively soft resins can be used as materials of the Caterpillar plates 38 if they are combined with a strong material (metal) to form a composite material.

The thickness range of each Caterpillar plate 38 is 4 to 200 mm. In particular, where importance is attached to weight and strength, it is preferable to use a thick flat steel or a square steel of 10 to 25 mm in thickness. Where importance is attached to a retainable quantity of heat that is required for a heat storage material, a preferable thickness range of each Caterpillar plate 38 is 5 to 50 mm. The range of width in the traveling direction of each Caterpillar plate 38 is 10 to 100 mm, and the range of length in the direction perpendicular to the traveling direction is 300 to 3,000 mm. Particularly preferable dimensional ranges are 20 to 80 mm (width), 1,000 to 2,000 mm (length), and 10 to 100 mm (height (thickness)).

The retainable quantity of heat and the heat-storing ability of each Caterpillar plate 38 increase as its thickness or weight increases. Since the temperature of each Caterpillar plate 38 increases when it receives heat from heated curdled soymilk T, the effect of heating the curdled soymilk T held between the Caterpillar plates 38 and the effect of keeping its temperature are enhanced as their heat-storing ability increases.

The surface(s) (only the back surface or all surfaces) of each Caterpillar plate 38 may be subjected to treatment for increasing the slidability, smoothness, or wear resistance such as polishing (buff polishing, electrolytic polishing, or the like), surface hardening/smoothing treatment (e.g., ceramic thermal spraying) using hard chromium, chromium nitride, titanium nitride, ceramic, or the like, surface treatment (e.g., resin coating) using a fluorine resin or any of various other resins, or treatment as a combination of some of the above kinds of treatment.

The conveyors 15 and 19 may be in any form as long as they can support the respective filter cloth belts 13 and 17 being in contact with curdled soymilk T by their flat surfaces from the back sides of the filter cloth belts 13 and 17. It is preferable that each of the conveyors 15 and 19 be a Caterpillar-type conveyor that is configured in such a manner that a number of rigid, approximately flat plate members are connected to each other by a link means such as a chain. Other examples are endless conveyors consisting of a number of flat plates such as an apron conveyor, a slat conveyor, a top plate conveyor, a top chain conveyor, or a flat top chain conveyor.

The Caterpillar-type conveyor and the top chain conveyor are bendable conveyors in which flat plates and one or plural chains are combined together in such a manner that the flat plates are connected to each other by the chain(s). Sprockets are disposed upstream of and downstream of a conveyance passage, and the chain(s) is in mesh with the sprockets. The conveyor is moved by driving the chain(s). On the other hand, in the plate conveyor, the apron conveyor, and the slat conveyor, a number of flat plates are connected to each other in such a manner that two end portions of each flat plate are fixed to circulating chains. The chains are in mesh with respective sprockets disposed upstream of and downstream of a conveyance passage, and the conveyor is moved by driving the chains.

In either case, a motor for driving the conveyor is attached, via a rotation speed adjusting device such as an inverter or a speed reducer, to a rotary shaft that is disposed at the front end (located on the upstream side) in the conveyor feed process. A drive unit is formed by attaching the above-mentioned sprockets to the drive motor. A driven unit is formed by also attaching sprockets to a rotary shaft that is disposed at the rear end in the conveyor feed process.

<Other Example Configurations of Filter Cloth Belts and Conveyors>

Next, other example configurations of the filter cloth belts and the conveyors will be described. In the following description, members corresponding to each other or the same members will be given the same symbol and descriptions therefor will thereby be simplified or omitted.

Example Configuration 2

Figure 5:
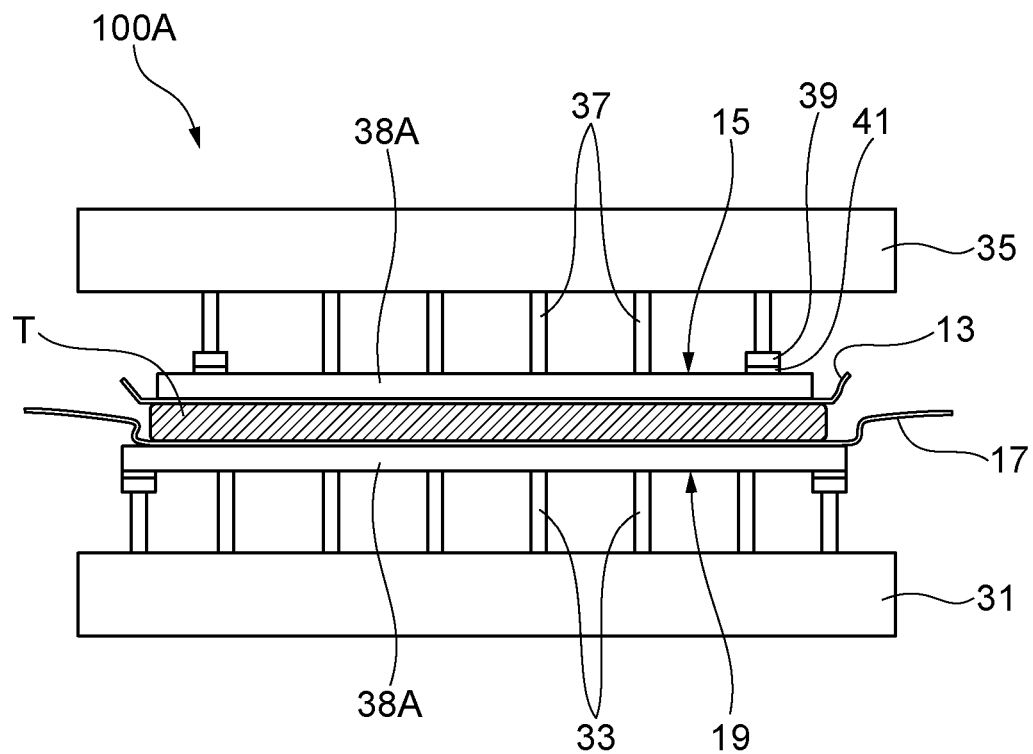
FIG. 5 is a partially sectional view, taken by a plane that is perpendicular to the conveying direction, of a shaping machine having a second example configuration.

FIG. 5 is a partially sectional view, taken by a plane that is perpendicular to the conveying direction, of a shaping machine having a second example configuration. The shaping machine 100A of this configuration employs hollow Caterpillar plates 38A having a hollow space such as (square) steel pipes instead of the Caterpillar plates 38 of the conveyors 15 and 19 of the above-described first example configuration. The other part of the configuration is the same as in the shaping machine 100 having the first example configuration.

Hollow steel pipes such as square pipes are common steel pipes and hence can be acquired at a relatively low cost. In particular, square pipes are superior to other shaped steels in that the former can be cleaned easily because the surface shape is small in the number of projections and recesses and can be reduced in weight though being high in stiffness. Steel pipes are usable as long as their height is greater than or equal to 5 mm (preferably greater than or equal to 10 mm) and smaller than or equal to 100 mm. It is preferable that the length of the shorter side (parallel with the traveling direction) of each Caterpillar plate 38A when it is viewed from above be 20 to 150 mm and the length of the longer side (perpendicular to the traveling direction) be 500 to 2,500 mm. For example, each Caterpillar plate 38A may be a rectangular steel pipe having a rectangular or square cross section the length and the thickness of each side of which can be selected from a range 10 to 100 mm and a range 1 to 10 mm, respectively. It is preferable that each Caterpillar plate 38A be a square pipe the thickness of each side of which is in a range of 2 to 8 mm because of relationships between the weight and the strength and between the weight and the thermal conductivity.

Where the heating interval of the return process is short or located at a position that is immediately upstream of the entrance of the conveyance passage 11 and close to curdled soymilk T, it is preferable that each Caterpillar plate 38A be a metal member that is small in specific heat and each side of which is thin. Where the heating interval is long, it is preferable to use a metal member that is large in specific heat and each side of which is thick or a high-stiffness resin member that is higher than or equal to metals in stiffness. Plate members each side of which is thin are high in heat dissipation (i.e., cools easily) and hence are fast to reach a steady state of heat transfer after coming close to curdled soymilk T. Having a large heat capacity, members each side of which is thick are slow to reach a steady state of heat transfer after coming close to curdled soymilk T and hence can suppress the release of heat from curdled soymilk T.

Figure 6A:
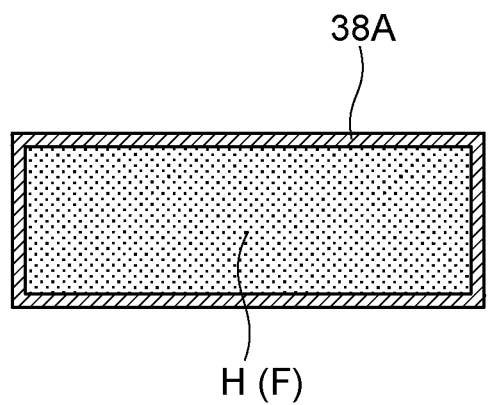
FIG. 6A is a sectional view of a Caterpillar plate.

As shown in FIG. 6A, each Caterpillar plate 38A may incorporate a heat insulation/heat-retaining member H or a heat storage member F in its hollow space. Either of a structure that only one of a heat insulation/heat-retaining member H and a heat storage member F is provided in the hollow space or a structure that both of a heat insulation/heat-retaining member H and a heat storage member F are provided in mixture in the hollow space may be employed. Even a structure is possible in which only air which is low in thermal conductivity is sealed in the hollow space as the heat insulation/heat-retaining member H.

Figure 6B:
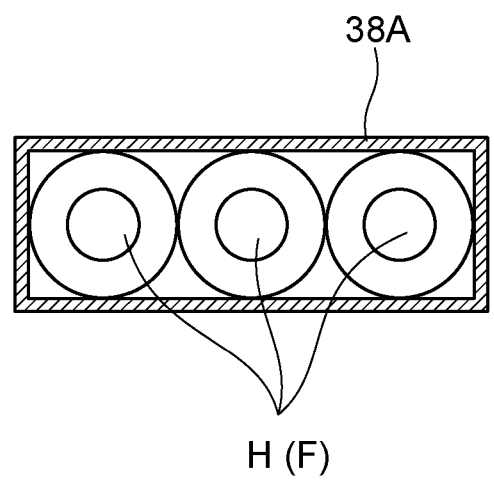
FIG. 6B is a sectional view of a Caterpillar plate.

Instead of disposing an approximately box-shaped heat insulation/heat-retaining member H and/or heat storage member F in the hollow space of a hollow structural body or charging the hollow space with a certain material, as shown in FIG. 6B another structure is possible in which units that are shaped like a cylinder, a square pipe, a strip, or the like in advance are disposed in the hollow space. This structure facilitates replacement of the heat insulation/heat-retaining members H or the heat storage members F.

Instead of using air as the heat insulation/heat-retaining member H, the heat insulation/heat-retaining member H may be made of a vacuum heat insulation material on the market (thermal conductivity: 0.0012 to 0.005 W/mK), a heat insulation/heat-retaining material such as a foamed resin mold, a heat insulation material such as a foamed resin (granular foamed urethane resin, granular foamed styrol resin, or foamed silicone resin), a foamed rubber, or an organic dried material such as wood chips or dried okara. The heat insulation/heat-retaining member H may be in any of a form that a heat insulation/heat-retaining material is disposed in the hollow space, a form that a foamed resin is formed in the hollow space and shaped there, a form that the hollow space is filled with a heat insulation material that is a fluid, a powder, or a liquid, a form that a heat insulation region is included such as a sealed vacuum heat insulation region formed by removing air from the hollow space or reducing the pressure or establishing a vacuum in the hollow space, and other forms.

In a structure in which the hollow space is sealed so as to be in a pressure-reduced state (thin air state) or a vacuum state that almost no air exists, air convection hardly occurs in the hollow space. With an additional effect that the degree of heat release is low, the heat insulation/heat-retainability is increased further. As such, this structure is highly efficient and makes it possible to suppress heat release from curdled soymilk T at a relatively low cost and to increase the quality of bean curds.

An appropriate pressure range in a pressure-reduced state or a vacuum state is 0 to 0.1 MPa in terms of absolute pressure (−0.1 to 0 MPa in terms of relative pressure); it suffices that the pressure be lower than or equal to atmospheric pressure. Another example structure is possible in which a pressure-reduced member or a vacuum member made of, for example, a vacuum heat insulation material developed for household electrical appliances (refrigerators) on the market is set in the hollow space. There are no particular limitations on the method for reducing the pressure or establishing a vacuum in the hollow space and the method for sealing the hollow space.

Gases other than air that can be used as the heat insulation/heat-retaining member H to be set in the hollow space are inert gases such as a carbon dioxide gas, an ethane gas, an ethylene gas, a nitrogen gas, an argon gas, a krypton gas, and a xenon gas, gases that are low in thermal conductivity, etc. Whereas air and an argon gas are 0.0241 W/mK and 0.0168 W/mK in thermal conductivity, respectively, a krypton gas and a xenon gas are 0.0087 W/mK and 0.0052 W/mK in thermal conductivity, respectively. Thus, the heat insulation/heat-retaining effect can be enhanced further by using a krypton gas or a xenon gas as the heat insulation/heat-retaining member H.

A latent heat type heat storage material that utilizes phase transition is used suitably as the heat storage member F. For example, "Patthermo" which is produced by Tamai Kasei Corporation and is on the market is usable up to 50° C. Sugar alcohol, an inorganic salt hydrate, organic acid salt hydrate, and the like whose melting temperatures are in a range of 50° C. to 120° C. (whose freezing temperatures or melting temperatures are preferably in a range of 60° C. to 105° C.) are also usable.

A phase transition type heat storage material, a sensible heat type storage material, and the like can be used as the heat storage member F. For example, water, oil (in particular, solid fat, hydrogenated oil, and the like), inorganic substances (sand, alumina, magnesium oxide, ceramic beads (powder), and the like), organic substances (organic, latent heat type heat storage materials such as resin beads and diatomite) and the like can be used. In particular, substances whose melting temperatures or freezing temperatures are in a range of 60° C. to 105° C. are usable. It is noted that water under atmospheric pressure also serves as a sensible heat type storage material in a temperature range of 60° C. to 105° C. A material of the heat storage member F is selected as appropriate within the confines that it does not make the Caterpillar plates 38A so heavy as to render the machine too heavy (though it is increased in mechanical strength) or to render the machine too expensive.

The heat release and the thermal conductivity of each Caterpillar plates 38A can further be suppressed or lowered by forming copper foil, aluminum foil, a resin lining, or the like for preventing heat release on the inner surfaces that define the hollow space. The heat insulation/heat-retaining function or the heat-storing function can be enhanced by a composite manner by combining, as appropriate, various measures such as sticking or impregnating the material of the heat insulation/heat-retaining member H or the heat storage member F to or into a circumferential surface(s) (e.g., front surface, back surface, side surface(s), or inner surface(s)) of the caterpillar plates 38A. The heat release suppressing effect can further be enhanced by performing treatment such as resin coating for making the heat conductivity low on the surfaces of each Caterpillar plate 38A. The heat insulation/heat-retaining member H or the heat storage member F may be set detachable, that is, replaceable, and there are no particular limitations on the manner of combination of them.

Usable examples of the latent heat type heat storage material are phase transition type heat storage materials whose melting temperatures or freezing temperatures are in a range of 50° C. to 120° C. (preferably 60° C. to 105° C.) that include polyols such as threitol (melting temperature: 90° C.), erythritol (melting temperature: 90° C.), xylitol (melting temperature: 94° C.), and sorbitol (melting temperature: 106° C.), sugar alcohol, inorganic salt hydrates such as sodium acetate trihydrate (melting temperature: 58° C.), trisodium phosphate dodecahydrate (melting temperature: 75° C.), sodium tetraborate decahydrate (melting temperature: 75° C.), barium hydroxide octahydrate (melting temperature: 78° C.), chromium(III) chloride hexahydrate (melting temperature: 83° C.), cobalt(II) chloride hexahydrate (melting temperature: 86° C.), magnesium nitrate hexahydrate (melting temperature: 89° C.), aluminum potassium sulfate dodecahydrate (melting temperature: 93° C.), and magnesium chloride hexahydrate (melting temperature: 117° C.). Usable examples of the sensible heat type heat storage material are liquids such as water, oils and fats, fatty acids (stearic acid), organic acids, and paraffin, viscous liquids, jelly or gel-like substances (agar/carrageenan and curdlan gel), glucomannan, organic materials such as pectin/cellulose, polyvinyl alcohol, and dried okara, metal powders such as an iron powder, mineral powders such as sand, powders of alumina, ceramic, concrete, etc., powders of inorganic salts etc. such as table salt and calcium sulfate, and the like. Other materials that are expected to provide a heat-storing effect and can be charged into the hollow space are also usable with no particular additional limitations.

Figure 7A:
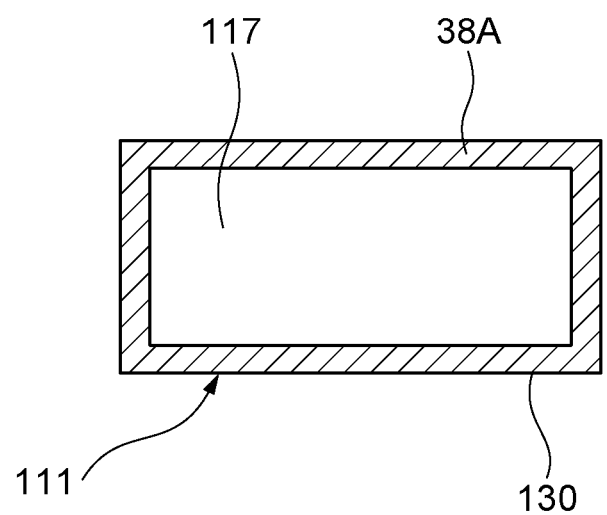
FIG. 7A is a sectional view of a hollow Caterpillar plate.
Figure 7B:
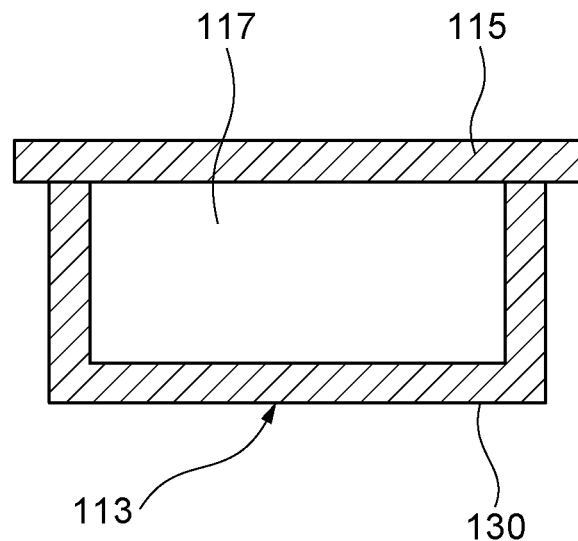
FIG. 7B is a sectional view of a hollow Caterpillar plate.
Figure 7C:
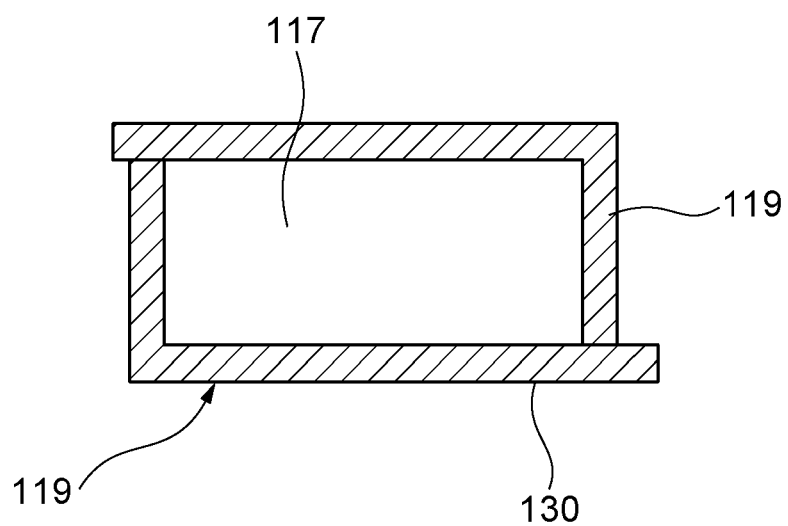
FIG. 7C is a sectional view of a hollow Caterpillar plate.
Figure 7D:
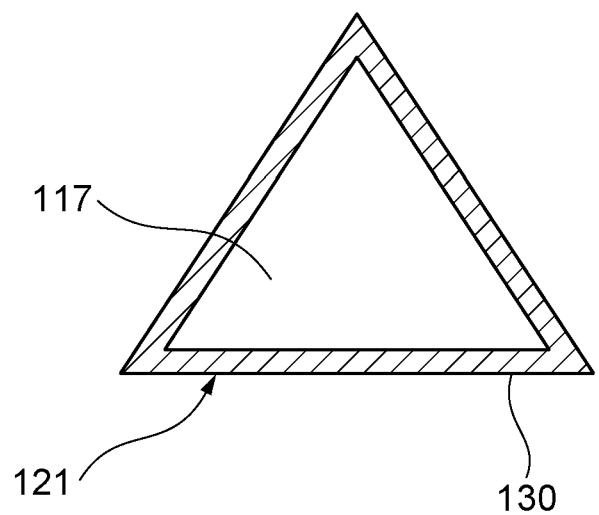
FIG. 7D is a sectional view of a hollow Caterpillar plate.
Figure 7E:
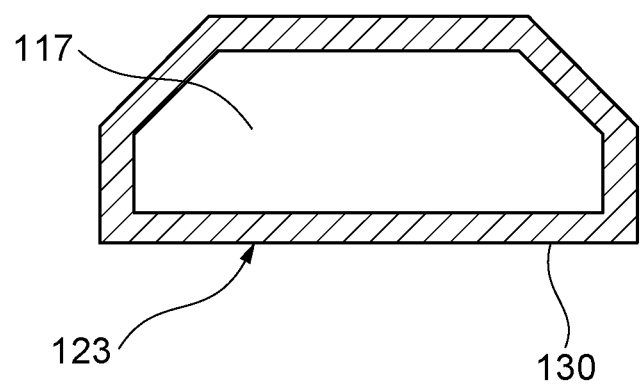
FIG. 7E is a sectional view of a hollow Caterpillar plate.
Figure 7F:
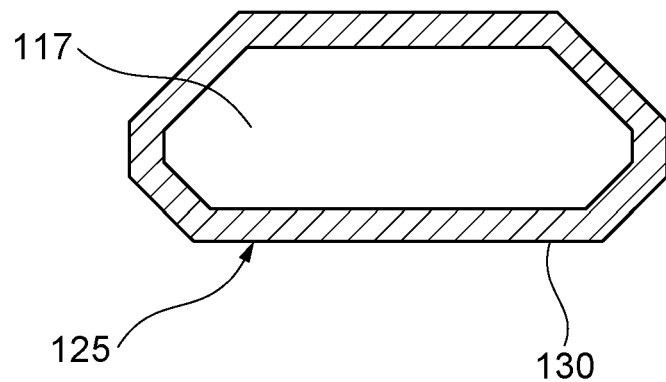
FIG. 7F is a sectional view of a hollow Caterpillar plate.
Figure 7G:
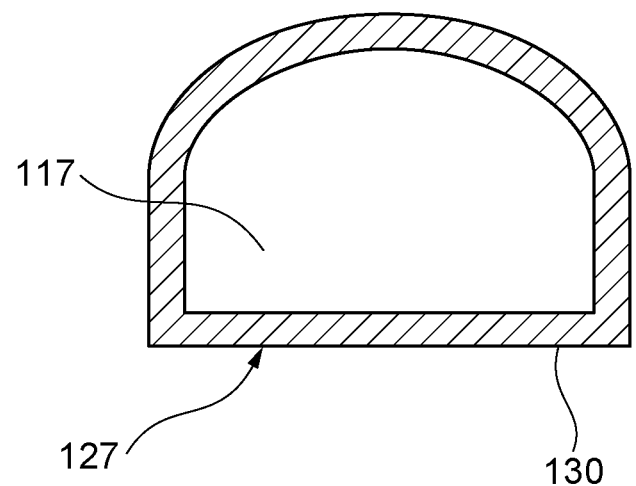
FIG. 7G is a sectional view of a hollow Caterpillar plate.
Figure 7H:
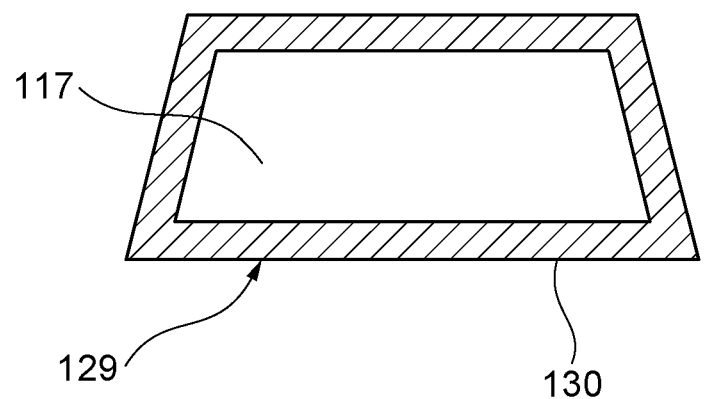
FIG. 7H is a sectional view of a hollow Caterpillar plate.

FIGS. 7A-7H are sectional views of hollow Caterpillar plates 38A having a hollow space. The Caterpillar plate 38A is not limited to the above-described one having the steel pipe (rectangular or square steel pipe) 111 the sectional view of which is shown in FIG. 7A. The Caterpillar plate 38A may be in a form shown in FIG. 7B that a hollow space 117 is defined by a combination of a channel steel (C-shaped steel) 113 and a flat steel 115 or a form shown in FIG. 7C that a hollow space 117 is defined by a combination of two angle steels (L-shaped steels) 119. Furthermore, the Caterpillar plate 38A may be a triangular steel pipe 121 shown in FIG. 7D, a hexagonal steel pipe 123 shown in FIG. 7E, an octagonal steel pipe 125 shown in FIG. 7F, a deformed steel pipe (semi-cylindrical steel pipe) 127 shown in FIG. 7G in which one side of the rectangle is semicircular, or a trapezoidal steel pipe 129 shown in FIG. 7H.

Each of the bottom surfaces shown in FIGS. 7A-7H is flat and is the surface of a flat surface 130 to come close to curdled soymilk T via the filter cloth belt 13 or 17. There are no particular limitations on the shapes of the surfaces other than the flat surface 130 shown at the bottom side in each of FIGS. 7A-7H; they may be a curved surface, a straight surface, or the like. Example steel pipes usable as the Caterpillar plate 38A other than the ones described above are steel pipes that are shaped like a quadrilateral, a rectangle, or a square having round corners, a trapezoid that is close to a rectangle, a rhombus, or the like. Shaped steels having an H-shaped, I-shaped, T-shaped, Z-shaped, or like cross section and polygonal steel pipes having a pentagonal or like cross section are also usable.

Instead of being a rectangular pipe, the Caterpillar plate 38A may be shaped like an approximately rectangular pipe provided with a hollow space inside and having a quadrilateral cross section or a pipe having an approximately L-shaped cross section by combining, as appropriate, some of shaped steels such as an angle steel, a scalene angle steel, channel steel (C-shaped steel), a steel joist, an H-shaped steel, a lip channel steel, a flat bar (flat steel), etc.

Figure 8A:
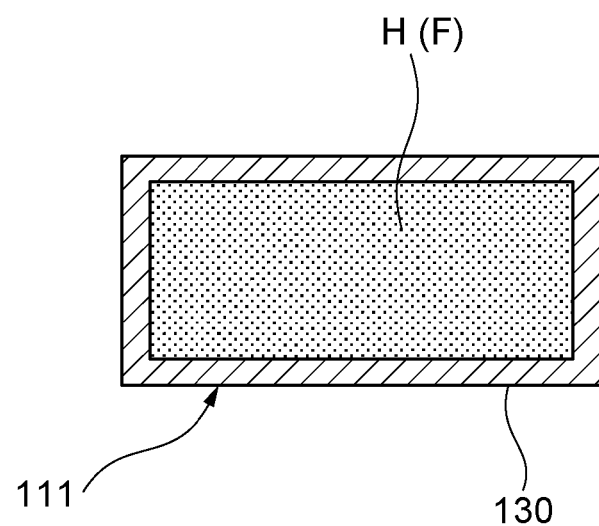
FIG. 8A is a sectional view of a Caterpillar plate that is provided with a heat insulation/heat-retaining member or a heat storage member.
Figure 8B:
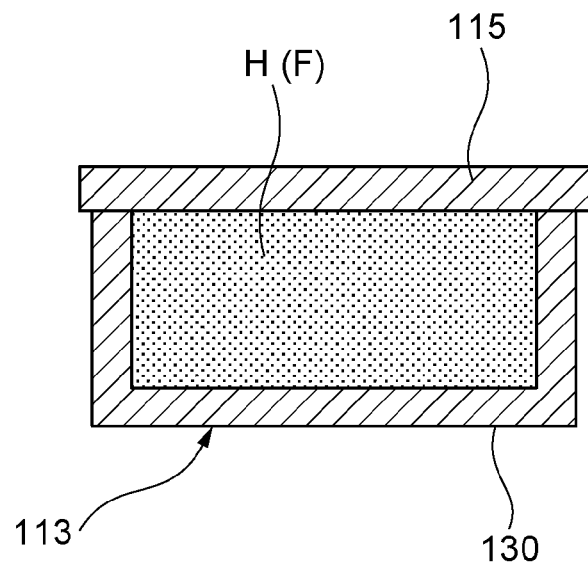
FIG. 8B is a sectional view of a Caterpillar plate that is provided with a heat insulation/heat-retaining member or a heat storage member.
Figure 8C:
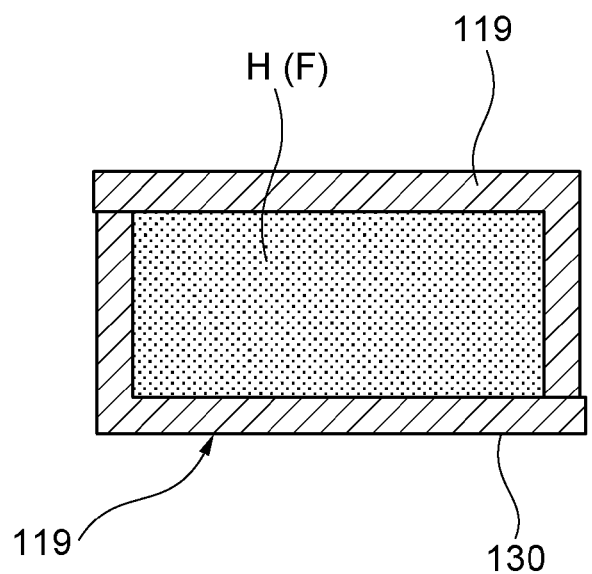
FIG. 8C is a sectional view of a Caterpillar plate that is provided with a heat insulation/heat-retaining member or a heat storage member.
Figure 8D:
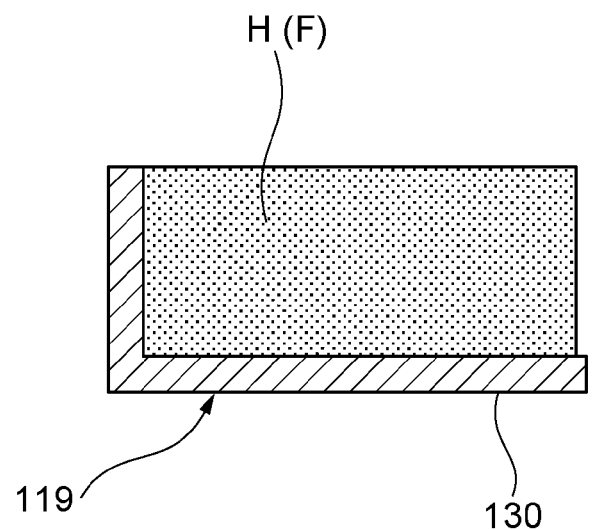
FIG. 8D is a sectional view of a Caterpillar plate that is provided with a heat insulation/heat-retaining member or a heat storage member.
Figure 8E:
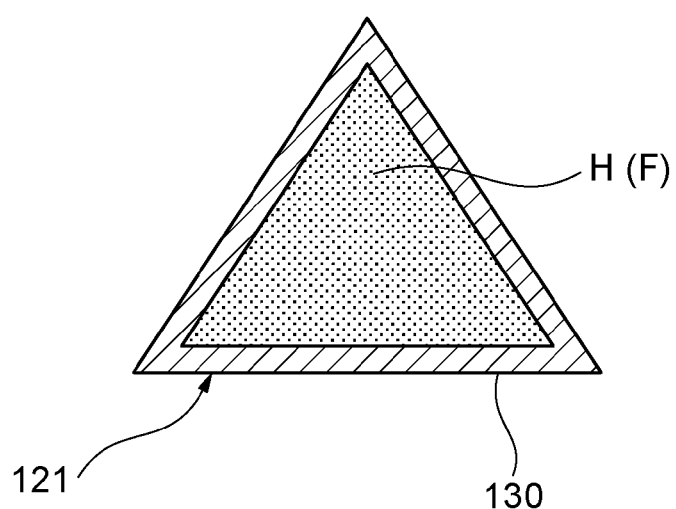
FIG. 8E is a sectional view of a Caterpillar plate that is provided with a heat insulation/heat-retaining member or a heat storage member.
Figure 8F:
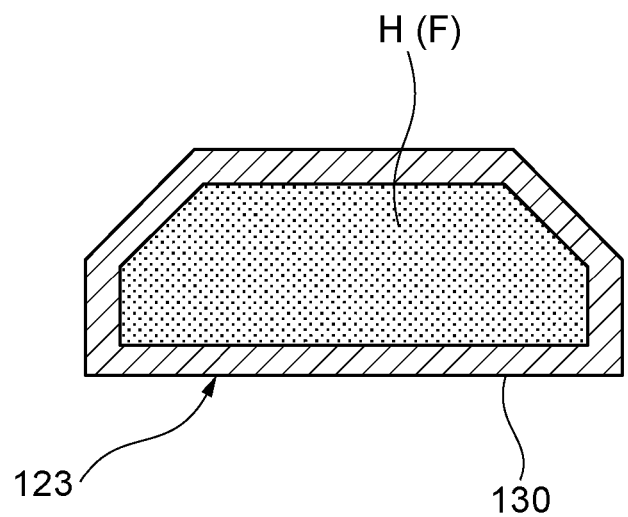
FIG. 8F is a sectional view of a Caterpillar plate that is provided with a heat insulation/heat-retaining member or a heat storage member.
Figure 8G:
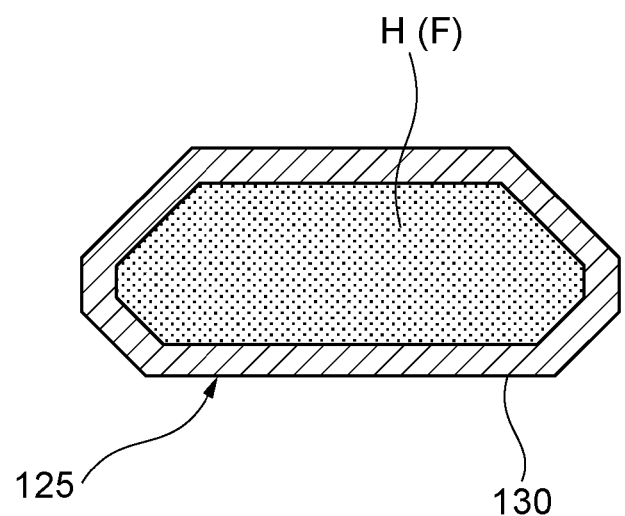
FIG. 8G is a sectional view of a Caterpillar plate that is provided with a heat insulation/heat-retaining member or a heat storage member.
Figure 8H:
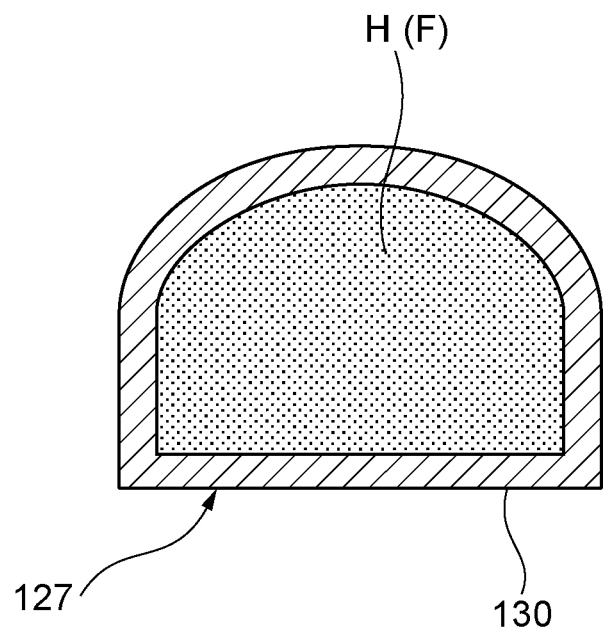
FIG. 8H is a sectional view of a Caterpillar plate that is provided with a heat insulation/heat-retaining member or a heat storage member.
Figure 8I:
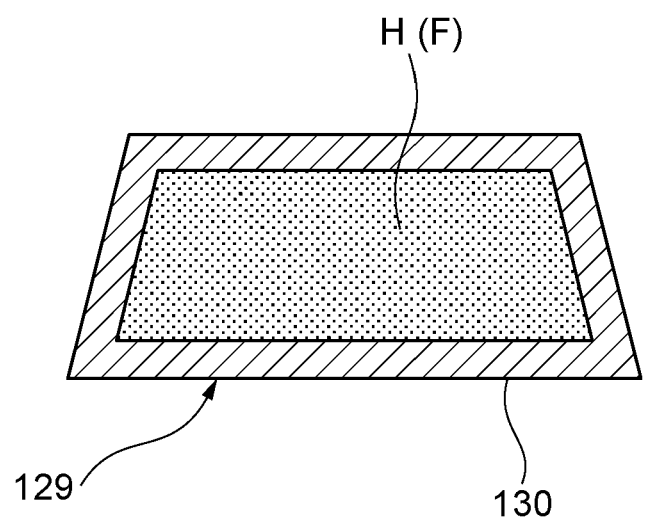
FIG. 8I is a sectional view of a Caterpillar plate that is provided with a heat insulation/heat-retaining member or a heat storage member.
Figure 8J:
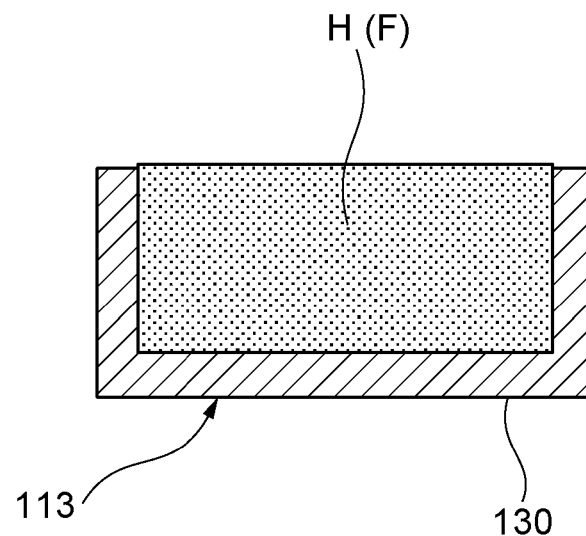
FIG. 8J is a sectional view of a Caterpillar plate that is provided with a heat insulation/heat-retaining member or a heat storage member.
Figure 8K:
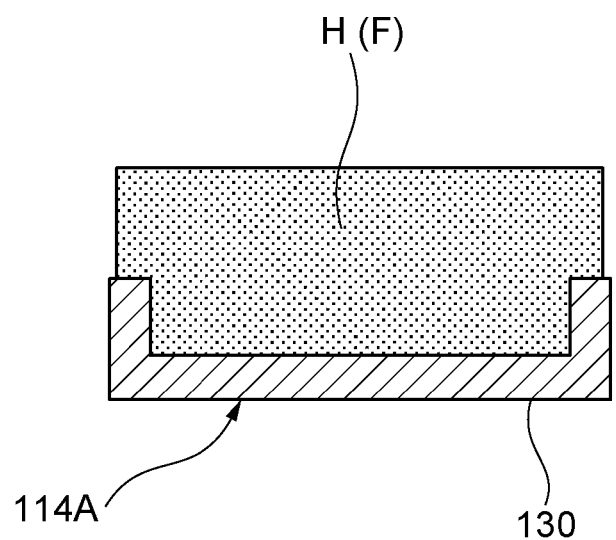
FIG. 8K is a sectional view of a Caterpillar plate that is provided with a heat insulation/heat-retaining member or a heat storage member.
Figure 8L:
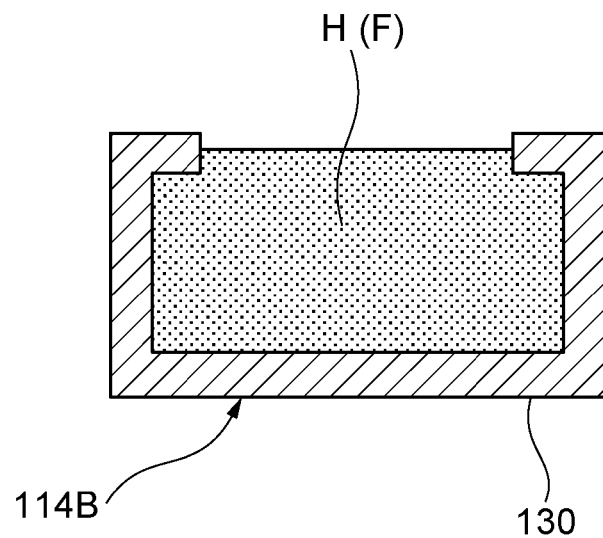
FIG. 8L is a sectional view of a Caterpillar plate that is provided with a heat insulation/heat-retaining member or a heat storage member.
Figure 8M:
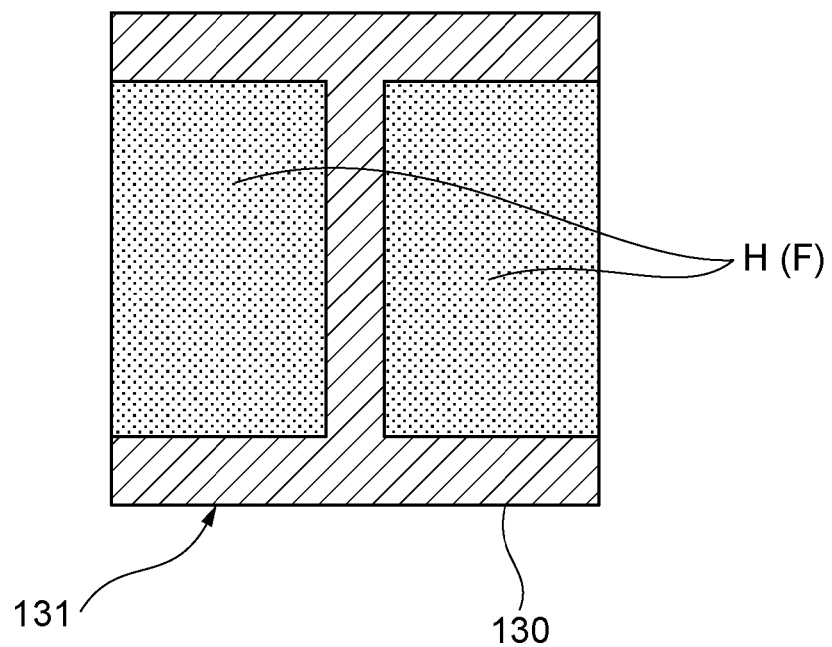
FIG. 8M is a sectional view of a Caterpillar plate that is provided with a heat insulation/heat-retaining member or a heat storage member.
Figure 8N:
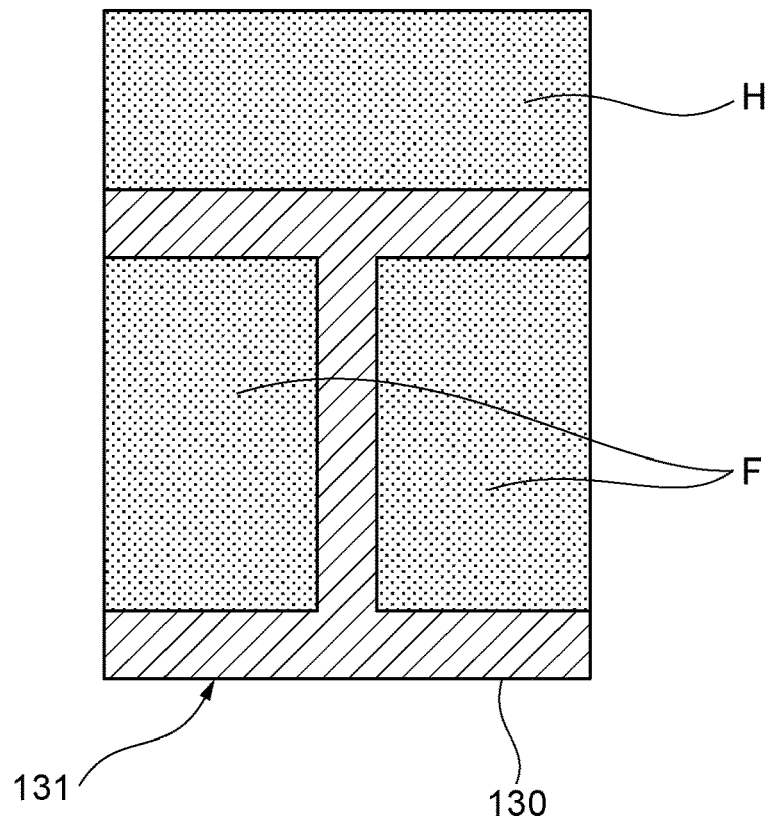
FIG. 8N is a sectional view of a Caterpillar plate that is provided with a heat insulation/heat-retaining member or a heat storage member.
Figure 8O:
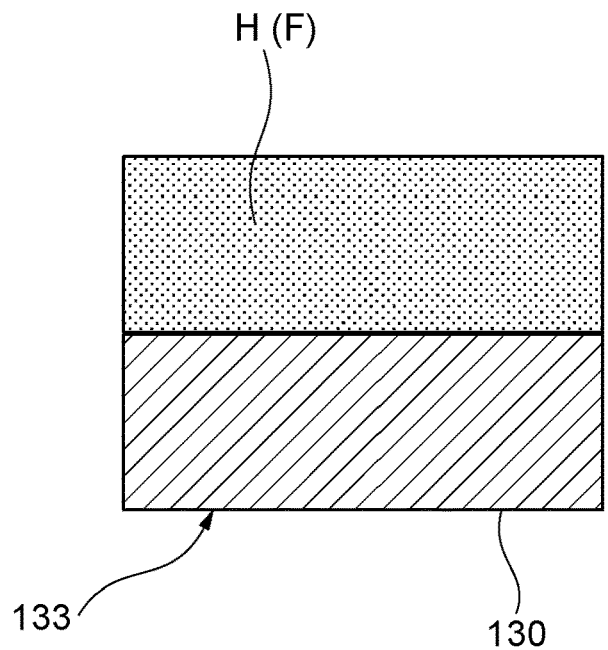
FIG. 8O is a sectional view of a Caterpillar plate that is provided with a heat insulation/heat-retaining member or a heat storage member.

FIGS. 8A-8O are sectional views of Caterpillar plates 38A that are provided with a heat insulation/heat-retaining member H or a heat storage member F. FIGS. 8A-8C and FIGS. 8E-8I show structures in which a heat insulation/heat-retaining member H or a heat storage member F is set in the hollow space of the Caterpillar plates 38A shown in FIGS. 7A-7H, respectively.

FIG. 8D shows a structure that is different from the structure shown in FIG. 8C in that only one angle steel 119 is used. FIG. 8J shows a structure in which a heat insulation/heat-retaining member H or a heat storage member F is set inside the groove of a channel steel (C-shaped steel) 113. FIG. 8K shows a structure in which a heat insulation/heat-retaining member H or a heat storage member F is laid on a channel steel 114A having a shallower groove than the channel steel 113 shown in FIG. 8J does. FIG. 8L shows a structure that employs a channel steel 114B having a deeper groove than the channel steel 113 shown in FIG. 8J does.

FIG. 8M shows a structure in which heat insulation/heat-retaining members H or heat storage members F are set in the pair of inside spaces of an H-shaped steel 131. FIG. 8N shows a structure in which heat storage members F are set in the pair of inside spaces of the H-shaped steel 131 and a heat insulation/heat-retaining member H or a heat storage member F is laid on the surface (the top surface in the figure) of one side leg of the H-shaped steel. FIG. 8O shows a structure in which a heat insulation/heat-retaining member H or a heat storage member F is laid on one surface of a flat steel 133.

Figure 9A:
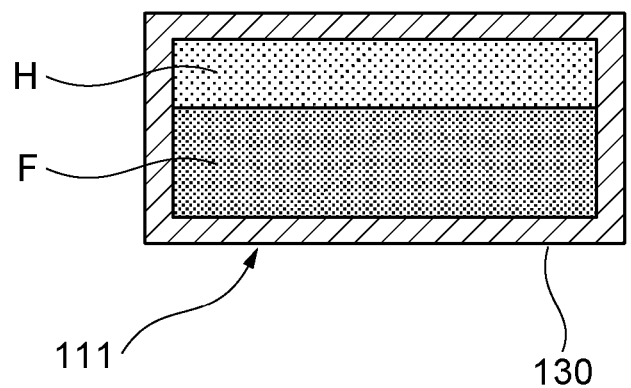
FIG. 9A is a sectional view of a Caterpillar plate that is provided with both of a heat insulation/heat-retaining member and a heat storage member.
Figure 9B:
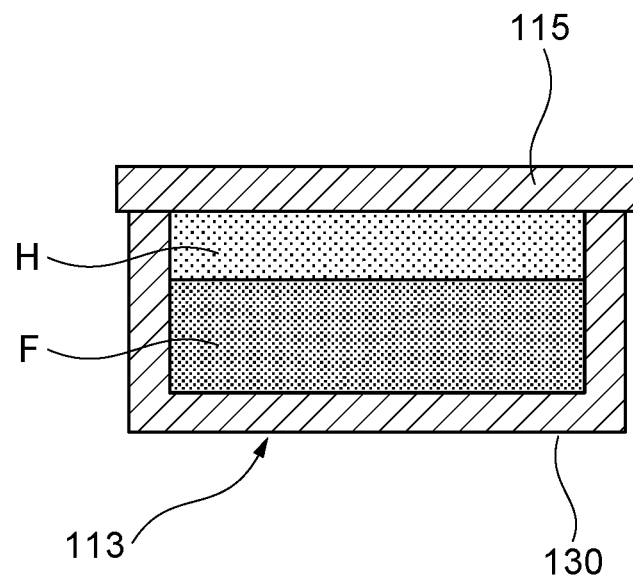
FIG. 9B is a sectional view of a Caterpillar plate that is provided with both of a heat insulation/heat-retaining member and a heat storage member.
Figure 9C:
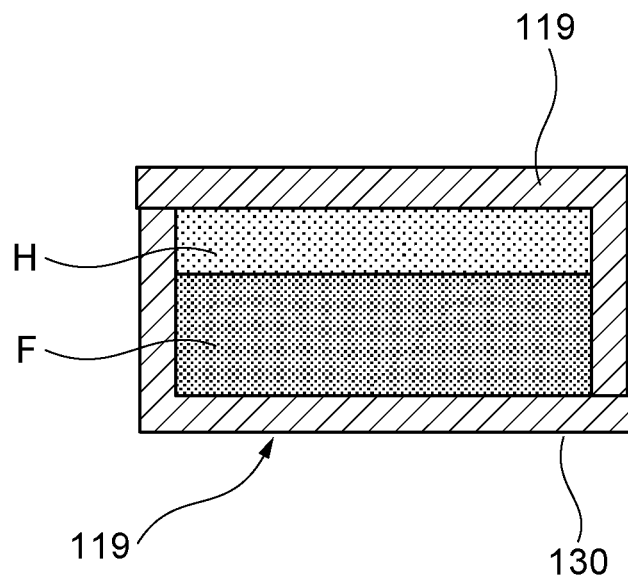
FIG. 9C is a sectional view of a Caterpillar plate that is provided with both of a heat insulation/heat-retaining member and a heat storage member.
Figure 9D:
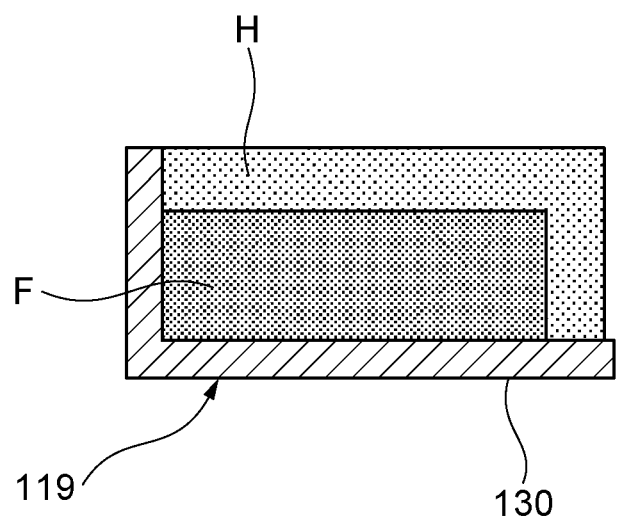
FIG. 9D is a sectional view of a Caterpillar plate that is provided with both of a heat insulation/heat-retaining member and a heat storage member.
Figure 9E:
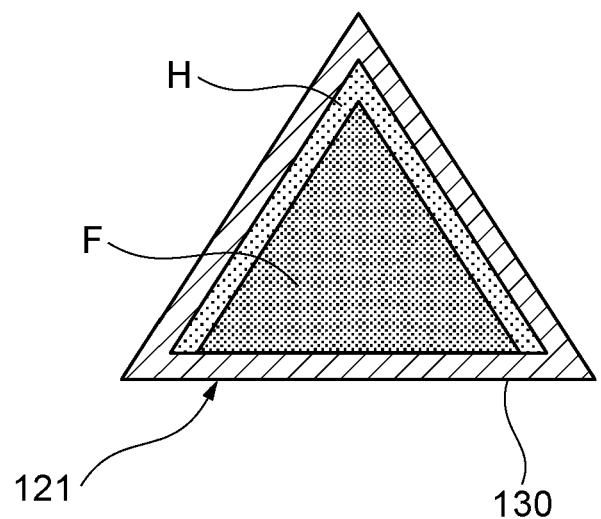
FIG. 9E is a sectional view of a Caterpillar plate that is provided with both of a heat insulation/heat-retaining member and a heat storage member.
Figure 9F:
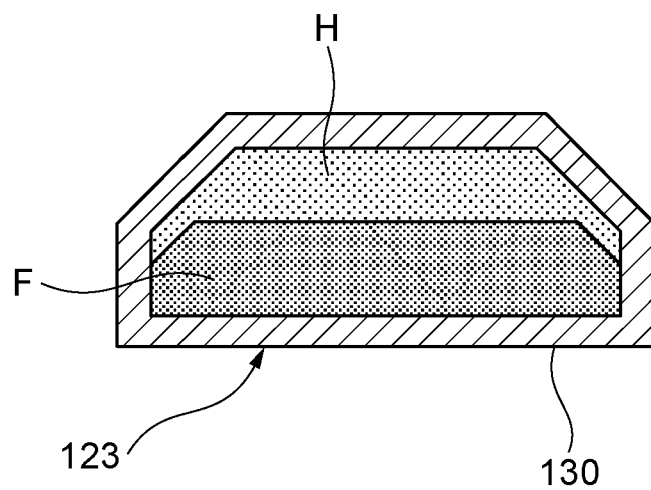
FIG. 9F is a sectional view of a Caterpillar plate that is provided with both of a heat insulation/heat-retaining member and a heat storage member.
Figure 9G:
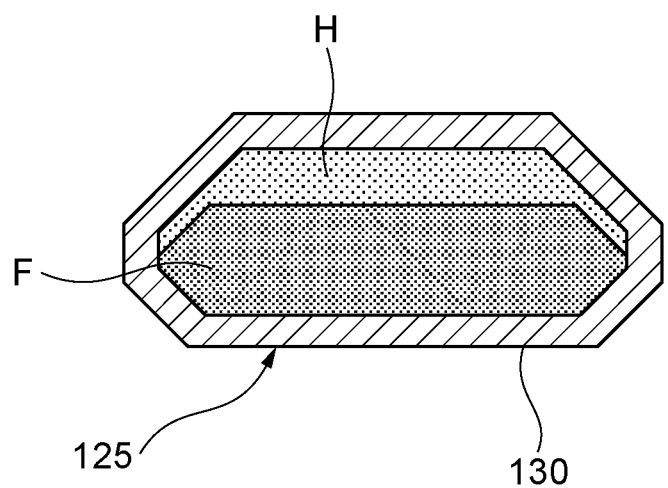
FIG. 9G is a sectional view of a Caterpillar plate that is provided with both of a heat insulation/heat-retaining member and a heat storage member.
Figure 9H:
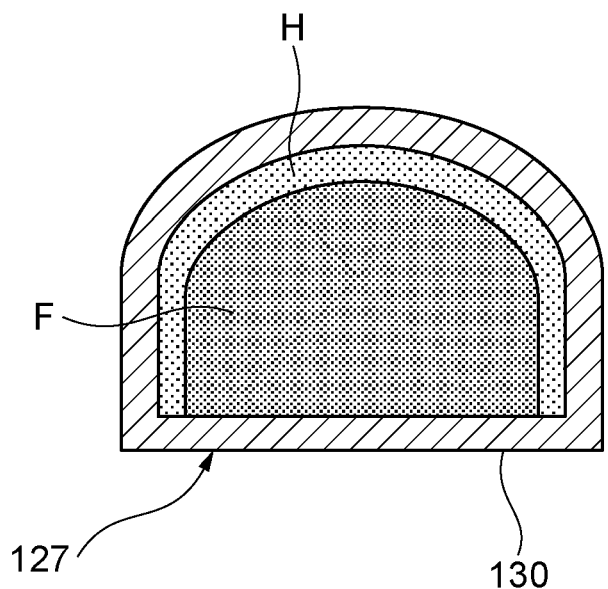
FIG. 9H is a sectional view of a Caterpillar plate that is provided with both of a heat insulation/heat-retaining member and a heat storage member.
Figure 9I:
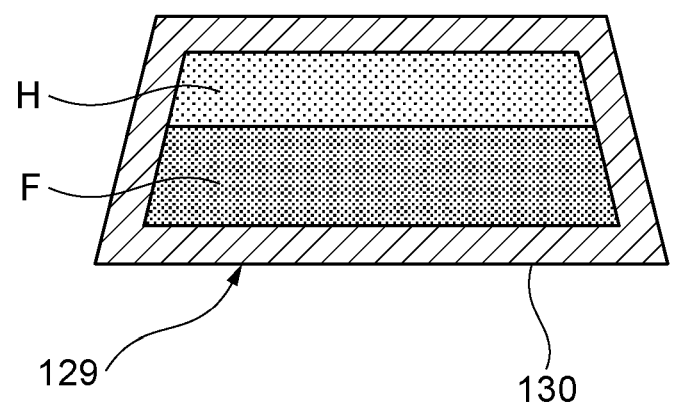
FIG. 9I is a sectional view of a Caterpillar plate that is provided with both of a heat insulation/heat-retaining member and a heat storage member.
Figure 9J:
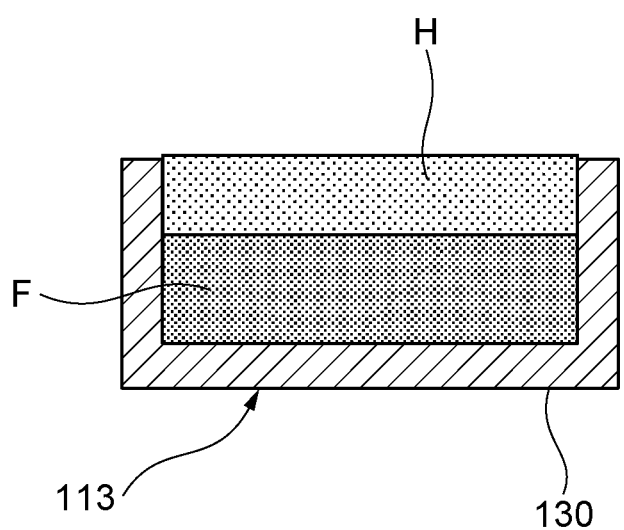
FIG. 9J is a sectional view of a Caterpillar plate that is provided with both of a heat insulation/heat-retaining member and a heat storage member.
Figure 9K:
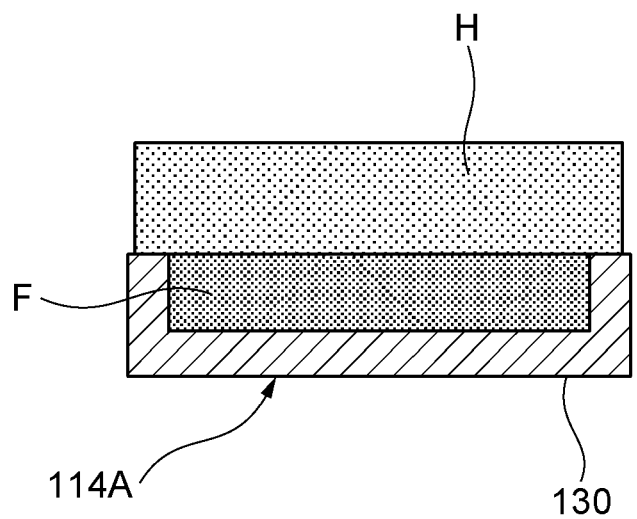
FIG. 9K is a sectional view of a Caterpillar plate that is provided with both of a heat insulation/heat-retaining member and a heat storage member.
Figure 9L:
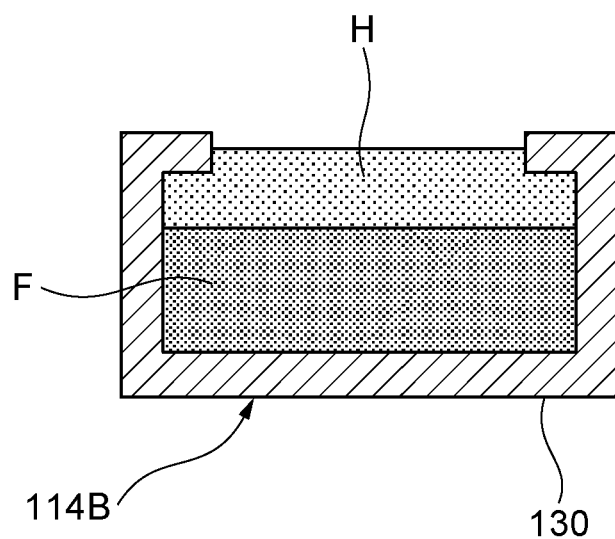
FIG. 9L is a sectional view of a Caterpillar plate that is provided with both of a heat insulation/heat-retaining member and a heat storage member.
Figure 9M:
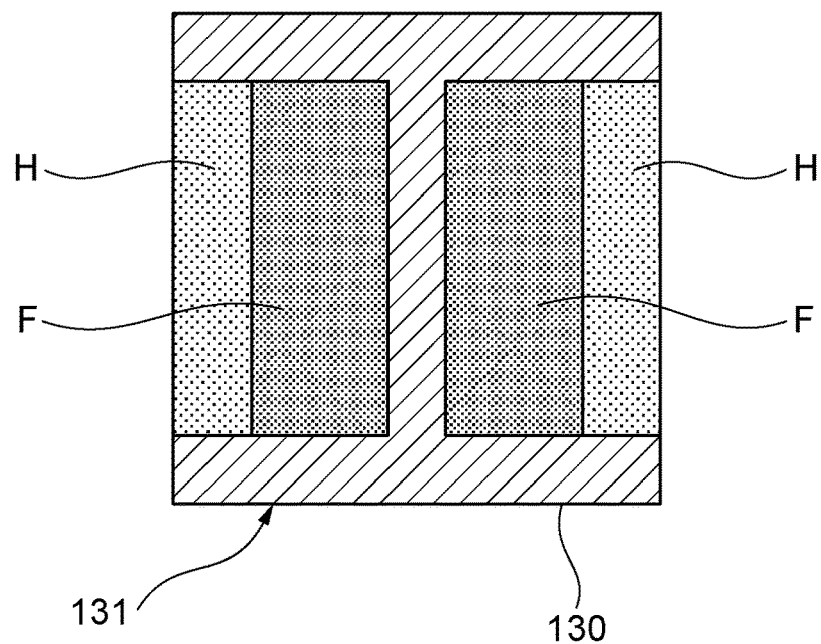
FIG. 9M is a sectional view of a Caterpillar plate that is provided with both of a heat insulation/heat-retaining member and a heat storage member.
Figure 9N:
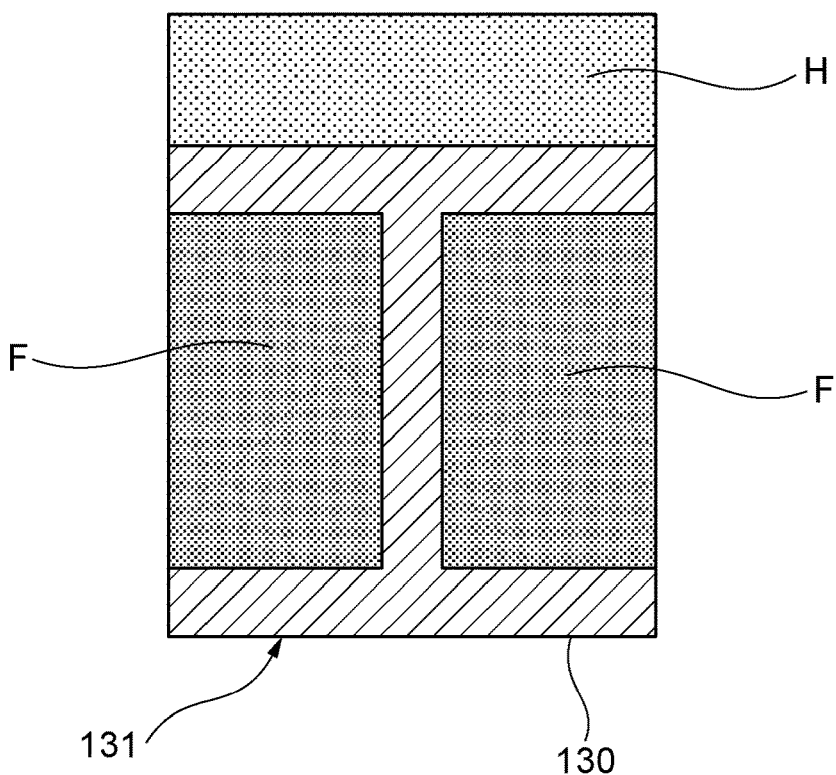
FIG. 9N is a sectional view of a Caterpillar plate that is provided with both of a heat insulation/heat-retaining member and a heat storage member. on/heat-retaining member and a heat storage member.
Figure 9O:
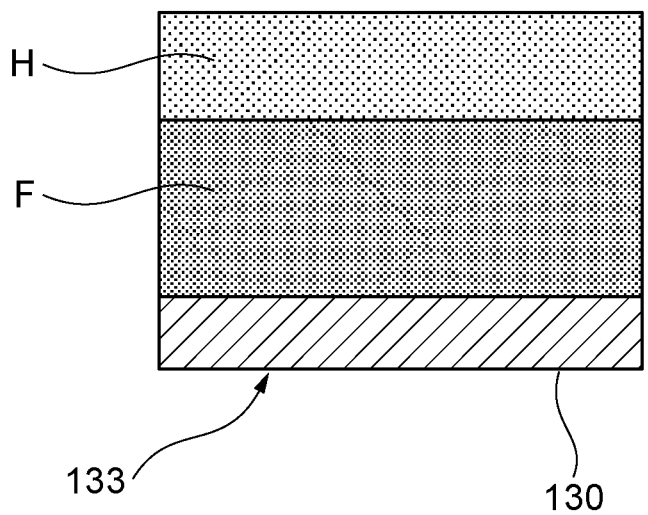
FIG. 9O is a sectional view of a Caterpillar plate that is provided with both of a heat insulation/heat-retaining member and a heat storage member.

FIGS. 9A-9O are sectional views of Caterpillar plates 38A that are provided with both of a heat insulation/heat-retaining member H and a heat storage member F. FIGS. 9A-9O correspond to FIGS. 8A-8O, respectively, and show structures in which both of a heat insulation/heat-retaining member H and a heat storage member F are laid. As shown FIG. 9A, the heat storage member F and the heat insulation/heat-retaining member H are laid in this order in the hollow space of a steel pipe 111 from the side of a flat portion 130. In each of the other structures shown in FIGS. 9B-9O, the heat storage member F and the heat insulation/heat-retaining member H are laid in this order from the side of a flat portion 130.

In the structures shown in FIGS. 9D, 9E, 9H, and 9M, the heat insulation/heat-retaining member H is connected to part of the flat portion 130. In these structures, the heat insulation/heat-retaining member H is formed so as to cover the heat storage member F.

In each of the structures shown in FIGS. 9A-9O, heat is transferred to the heat storage member F via the flat portion 130 which is shown at the bottom in the figure and heat release from the heat insulation/heat-retaining member H which is shown at the top is suppressed. Thus, heat stored in the heat storage member F is moved toward curdled soymilk T and hence is hardly released to things other than the curdled soymilk T.

In manufacture of ordinary tofu, fried tofu, or the like, coagulant liquid is mixed into soymilk (60° C. to 95° C.) and the resulting mixture is curdled and stirred and thereby matured. A resulting curdled mixture is let collapse and resulting curdled soymilk T is transferred (put into) a shaping machine 100. The curdled soymilk T is dehydrated naturally and by compression and reaches the exit of the conveyance passage 11 of the shaping machine 100A, where bean curds such as firm tofu (dough) that are shaped like a continuous sheet are obtained. Define an initial temperature as a soymilk temperature before curdling. Conventionally, when dough reaches the exit of a shaping machine 100 after being subjected to a curdling process and a shaping process, the temperature of the dough is much lower than the initial temperature. The temperature difference $\Delta T$ is usually equal to $-15°$ C. to $-20°$ C. or larger.

In contrast, according to the configuration described above, because of the use of the Caterpillar plates 38A having the heat insulation/heat-retaining member H and/or the heat storage member F, the temperature difference ΔT between a temperature at the entrance of the conveyance passage 11 of the shaping machine 100A (i.e., a temperature of curdled soymilk at the exit of a curdling machine) and a temperature at the exit of the conveyance passage 11 (i.e., a temperature of bean curds at the exit) can be made smaller than −10° C., preferably smaller than −5° C.

Keeping the temperature of bean curds at the exit of the conveyance passage 11 of the shaping machine 100A at least higher than or equal to 60° C., preferably higher than or equal to 70° C., is preferable for the purpose of improving the characteristics of the bean curds. For example, it is preferable to make the temperature difference (reduction) ΔT between a temperature of curdled soymilk when it is put into the shaping machine 100A (i.e., a temperature of curdled soymilk before or after it is processed by a collapsing/leveling machine after curdling and maturation) and a temperature of sheet-like tofu at the exit of the shaping machine 100A (i.e., a temperature of its top or bottom surface or a core temperature) within −15° C. It is much preferable to make ΔT within −10° C., and it is far preferable to make ΔT smaller than or equal to −5° C. As a result, the tofu temperature at the exit of the conveyance passage 11 of the shaping machine 100A can be kept in a range of 60° C. to 80° C.

According to the shaping machine 100A having the configuration described above, the temperature of tofu can be increased by using heating devices (described later in detail) positively. By heating bean curds in a temperature range of 60° C. to 100° C., preferably to a range of 70° C. to 95° C., for a prescribed time, it is expected to provide an effect of improving the properties and flavor of the bean curds and an effect of establishing a good sanitary environment for the bean curds by suppressing contamination by and proliferation of germs and even killing germs (low in heat resistance) that are vegetative cells other than spores. However, heating bean curds at too high a temperature may impair its quality such as occurrence of holes or syneresis which may cause rough skin. It is preferable to heat the atmosphere of the conveyors 15 and 19 and keep its temperature in a range of 60° C. to 105° C., preferably 70° C. to 95° C., instead of heating bean curds directly. The heating time is set approximately the same as or shorter than a shaping time that it takes for bean curds to pass the conveyance passage 11, that is, set at 1 to 3,600 sec, preferably 3 to 1,200 sec, so as to at least keep the temperature of the bean curds in a prescribed range and attain a sterilizing effect.

The above-mentioned heating devices can be disposed in the feed process which involves the conveyors 15 and 19, and the vapor sterilization tanks 51 and 53 (see FIG. 1) which are used in the return process can be used as the heating devices. That is, in the vapor sterilization tanks 51 and 53, the conveyors 15 and 19 are heated by sterilization processing using high-temperature vapor, whereby the temperatures of the conveyors 15 and 19 when they reach the conveyance passage 11 for curdled soymilk T are increased to or kept in the above-mentioned range. Since the vapor sterilization tanks 51 and 53 are disposed at positions close to the end of the return process, the conveyors 15 and 19 as heated in the vapor sterilization tanks 51 and 53 can reach the conveyance passage 11 of the feed process before their temperatures drop to a large extent.

With the above configuration, curdled soymilk T is heated or kept in temperature via the conveyors 15 and 19 being heated and storing heat. Each Caterpillar plate 38A can increase the temperature of the curdled soymilk T by transferring heat held by the heat insulation/heat-retaining member H and/or the heat storage member F to the curdled soymilk T being conveyed. Or each Caterpillar plate 38 can delay or prevent temperature reduction of the curdled soymilk T due to heat release by virtue of their heat insulation/heat-retaining ability. Furthermore, the filter cloth belts 13 and 17 and the conveyors 15 and 19 can be cleaned and heated in the regions of the return process in their circulation routes. With these effects, sterilization can be performed while the degrees of contamination by and proliferation of germs are made lower than in conventional cases. Binding and gelling of soybean protein are accelerated, whereby the flexibility of bean curds is increased and the curdling temperature and the amount of coagulant can be made proper. Bean curds are given a fine structure and suppressed in syneresis, and leakage of delicious taste from bean curds is prevented. These make it possible to mass-produce bean curds being flexible and higher in quality in good sanitary conditions, thereby enabling manufacture of bean curds such as firm tofu that is close to being hand-made of old-day and is tasty, and fried tofu that is fine-grained and has a soft skin.

If bean curds are brought into direct contact with a high-temperature heating medium, excessive thermal metamorphism of protein occurs only in the surface of the bean curds, which may cause quality reduction of the bean curds such as degradation of taste due to syneresis or becoming fragile. In contrast, with the configuration described above, since the conveyors 15 and 19 heat bean curds via the filter cloth belts 13 and 17, such quality reduction can be avoided. Furthermore, the "sticking-to-cloth" phenomenon can be suppressed and the shaping machine 100A can be designed so as to be decreased in overall length, the machine cost and the installation space can be reduced.

The shaping machine 100A may be configured in such a manner that the vapor sterilization tanks 51 and 53 are not used as the heating devices, that is, the heating devices may be disposed separately from the vapor sterilization tanks 51 and 53.

The heating devices may be disposed in one or some of the feed process, the return process, and the direction change processes on the circulation routes of the filter cloth belts 13 and 17 and the conveyors 15 and 19 or in part of each of those processes. Each heating device may be configured so as to heat either a prescribed, minimum necessary portion or the overall target.

The term "retaining of the temperature of bean curds" means keeping the temperature of a neighborhood surrounding bean curds being conveyed along the conveyance passage 11 in a range of 60° C. to 105° C. all the time (or even in a short time) preferably. Although it is preferable to maintain the same temperature in this range or increasing the temperature so that the temperature falls within this range, the above term means that the temperature retention or heating be done so that the temperature does not become lower than the lower limit of 60° C. even if it is lowered a little due to heat release. A temporary temperature reduction is sufficiently allowable commercially as long as the temperature of tofu is kept in a range of 60° C. to 100° C. with an atmosphere temperature range of 60° C. to 105° C. in approximately 50% or more (preferably 70% or more) of the overall processing time of bean curds of the shaping machine 100 A (i.e., a time it takes for bean curds to pass the conveyance passage 11).

Usable examples of each of the heating devices to be disposed separately from the vapor sterilization tanks 51 and 53 are a steam heating device which heats a target by blowing vapor of 60° C. to 105° C. directly over it under atmospheric pressure, a hot water spray type heating device which heats a target by spraying hot water of a hot water tank whose temperature is adjusted to 60° C. to 100° C., a hot wind blowing type heating device which blows a hot wind whose temperature is adjusted to 60° C. to 200° C. (for example, through heat exchange with water vapor) over a target, a device for generating a dry hot wind of 60° C. to 300° C. (i.e., a sheathed heater consisting of a blower fan and a nichrome wire or the like or a heater consisting of a blower fan and a heater such as an infrared heater, a storage heater, or a heat pump), a hot wind heater having a steam indirect heater or the like, and a hot air heating device such as an overheated vapor heater. Other example heating devices are a hot water shower heating device which supplies hot water of 60° C. to 100° C. and causes it to shower (be sprayed) over a target in the form of a free flow (used water is collected, heated again, and supplied (circulation)) and a water bath heating device which utilizes vapor produced by re-vaporization from hot water that is put in a water bath or the like. Some of the above-mentioned heating devices may be used in combination.

Nozzles for jetting out vapor, hot water, or a hot wind may be of any of a fixed type, movable type, or a rotary type. Furthermore, each heating device may be of a hot water tank heating type which uses a hot water tank where a hot water (60° C. to 100° C.) is always stored. The filter cloth belts 13 and 17 and the conveyors 15 and 19 are immersed in the hot water.

Where heating devices of a vapor blowing type, a hot water spray type, or a hot wind blowing type are used, the filter cloth belts 13 and 17 and the conveyors 15 and 19 can be installed so as to have flat circulation routes that are not bent. Thus, the number of components can be made smaller than in the case of the hot water tank heating type and the amount of used water or condensing water can be made as small as possible. Furthermore, the risk that dirt in the hot water tanks is mixed into products in the form of foreign substances.

The above-mentioned heating devices are equipped with a device for controlling a temperature adjusting function, a temperature recording function, etc., a measuring/recording device, etc. and controlled to a desired temperature.

A device for having a quantity of heat held by high-temperature curdled soymilk transferred to and stored in the conveyors 15 and 19 is one heating device. For example, if the temperature of curdled soymilk is approximately equal to 70° C. to 95° C., the heat insulation/heat-retaining function and the heat-storing function of the Caterpillar plates of the conveyors can suppress escape of a quantity of heat held by the curdled soymilk itself, that is, release of heat, without the need for using the heating devices. Even in this case, binding of bean curds is made faster than in conventional cases, whereby it is increased in flexibility and improved in quality. The heating devices may be used in an auxiliary manner only in an initial stage, that is, only until immediately before acceptance of curdled soymilk by the conveyance passage of the shaping machine 100A. Conversely, if the temperature of curdled soymilk is in a range of 60° C. to 70° C., it is preferable to use the heating devices in an auxiliary manner because the temperature of the curdled soymilk may become lower than 60° C. due to cooling by heat release in the later processes.

As described above, the conveyors 15 and 19 and the filter cloth belts 13 and 17 are cleaned and sterilized during manufacture of bean curds. While bean curds are not being manufactured, for example, during cleaning after manufacture or during passage of bean curds through warm water (warming-up) before manufacture, they can be cleaned and sterilized also using the above-described heating devices. In this case, the nozzles, the pipes, etc. of the heating devices may be used as cleaning nozzles and cleaning pipes for spraying a cleaning liquid.

A visual check and inspection of nooks of the machine are facilitated by exposing portions, other than portions in regions where the heating devices are installed, of the conveyors 15 and 19 instead of covering those portions with covers.

Example Configuration 3

Figure 10:
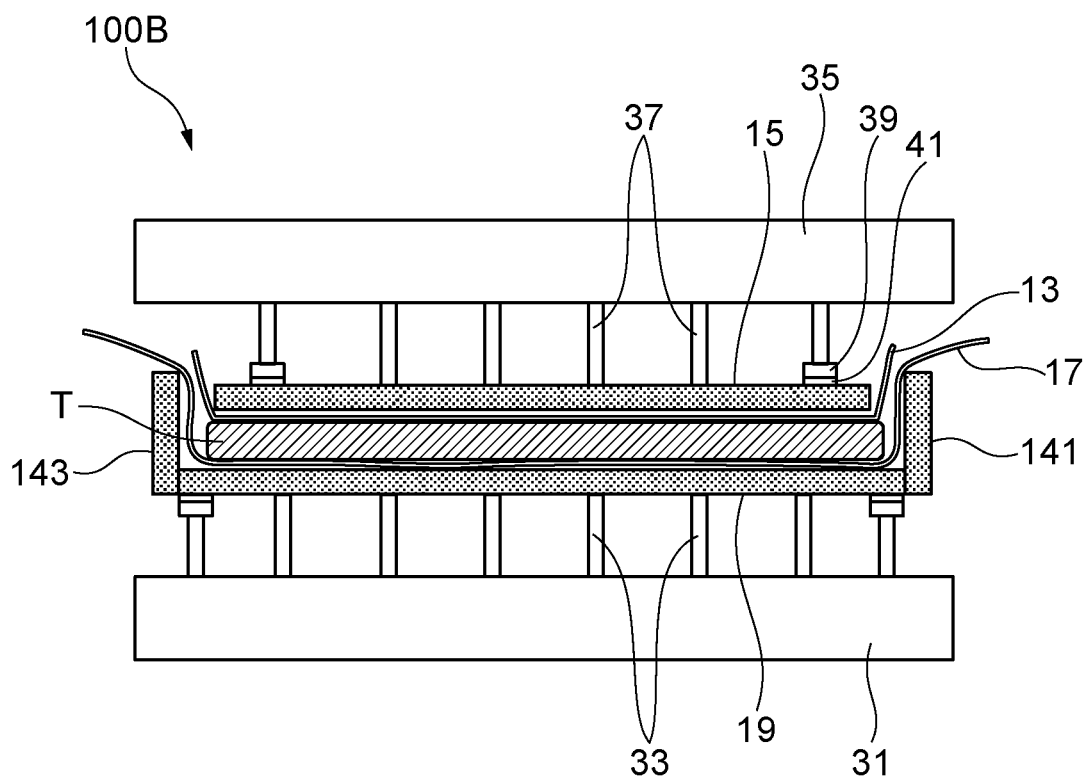
FIG. 10 is a partially sectional view, taken by a plane that is perpendicular to the conveying direction, of a shaping machine having a third example configuration.

FIG. 10 is a partially sectional view, taken by a plane that is perpendicular to the conveying direction, of a shaping machine having a third example configuration. The shaping machine 100B having this configuration is equipped with auxiliary conveyors 141 and 143 in addition to the conveyors 15 and 19 that are employed in the above-described second example configuration, and the filter cloth belt 17 is made wider. The other part of the configuration is the same as in the shaping machine 100A having the second example configuration.

In this configuration, the auxiliary conveyors 141 and 143 are disposed on the two respective sides of the pair of conveyors 15 and 19 in the direction perpendicular to the circulation direction of the conveyors 15 and 19 and are driven independently of each other in synchronism with the respective conveyors 15 and 19. The filter cloth belt 17 is formed so as to have such a concave cross section that its two end portions reach top portions of the auxiliary conveyors 141 and 143, respectively.

In the shaping machine 100B having this configuration, since curdled soymilk T is enclosed from the four directions, that is, from above, below, the left side, and the right side, natural cooling by heat release in each of these directions is suppressed and the ability to maintain the temperature of the curdled soymilk T is enhanced. As a result, the flexibility of tofu is increased through acceleration of binding of accelerated and the "sticking-to-cloth" phenomenon that bean curds stick to the filter cloth belts 13 and 17 can be suppressed.

The shaping machine 100B having this configuration can convey even thick curdled soymilk T stably and manufacture high-quality bean curds. For example, a relatively thick bean curds to become as high as 10 to 150 mm after shaping can be compression-shaped stably without losing shape because it is supported from the sides by the auxiliary conveyors 141 and 143.

Example Configuration 4

Figure 11:
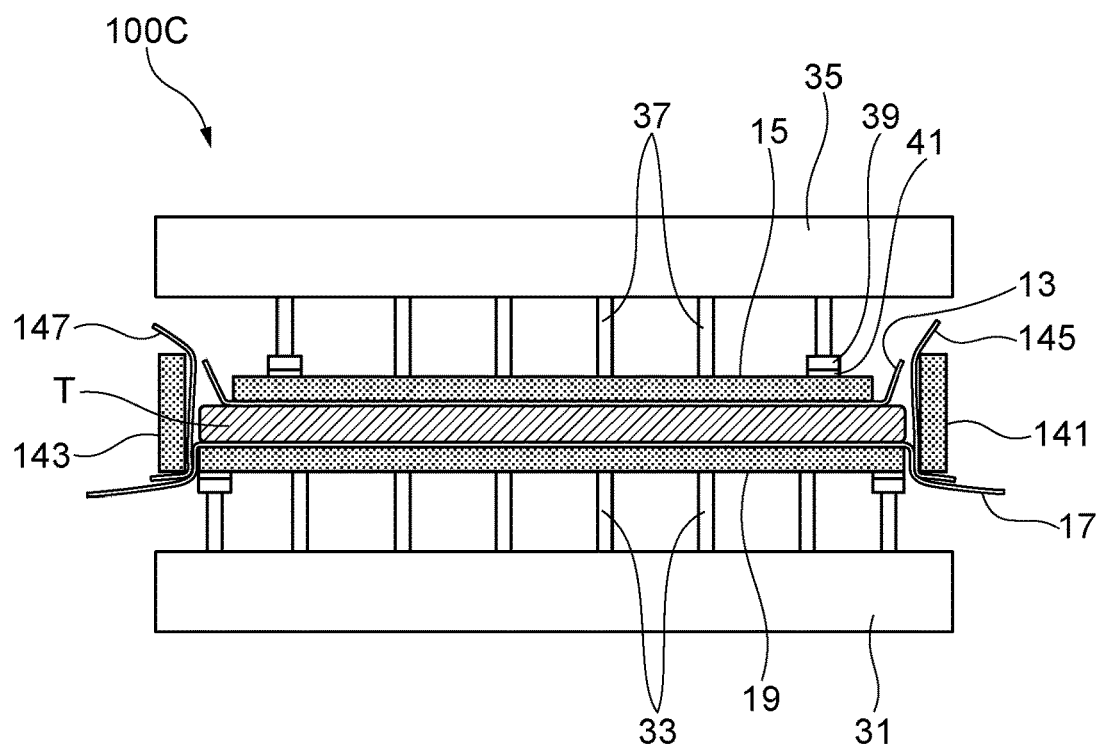
FIG. 11 is a partially sectional view, taken by a plane that is perpendicular to the conveying direction, of a shaping machine having a fourth example configuration.

FIG. 11 is a partially sectional view, taken by a plane that is perpendicular to the conveying direction, of a shaping machine having a fourth example configuration. The shaping machine 100C having this configuration is equipped with filter cloth belts 145 and 147 which correspond to the respective auxiliary conveyors 141 and 143 employed in the above-described third example configuration. The circulation route of the filter cloth belt 145 is located outside (on one side of) the auxiliary conveyor 141 and the circulation route of the filter cloth belt 147 is located outside (on one side of) the auxiliary conveyor 143. Two end portions of the filter cloth belt 17 which is disposed parallel with the conveyor 19 are located under the auxiliary conveyors 141 and 143 and the filter cloth belts 145 and 147. The other part of the configuration is the same as in the shaping machine 100B having the third example configuration.

In the shaping machine 100C having this configuration, curdled soymilk T is surrounded from the four directions by the conveyors 15 and 19 and the auxiliary conveyors 141 and 143 via the respective filter cloth belts. Thus, as in the above-described example configuration, natural cooling by heat release is suppressed, the heat-retainability is enhanced, and heating can be performed efficiently. Furthermore, even thick curdled soymilk T can be conveyed stably, the flexibility of tofu can be increased by accelerating its binding, and the "sticking-to-cloth" phenomenon can be suppressed.

Example Configuration 5

Figure 12:
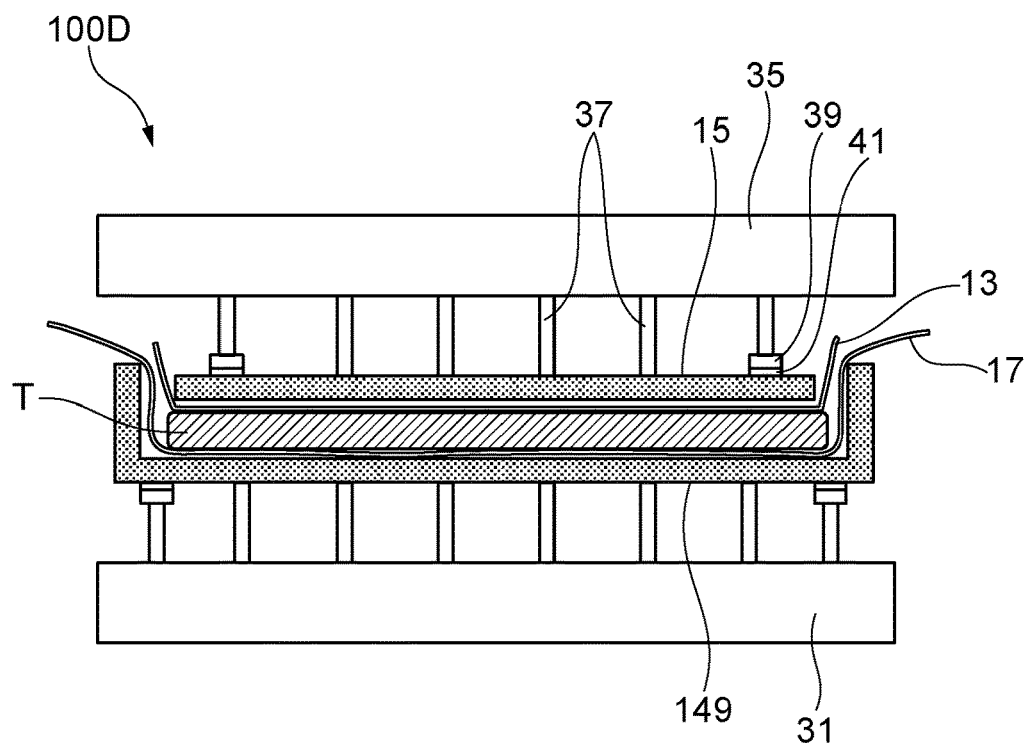
FIG. 12 is a partially sectional view, taken by a plane that is perpendicular to the conveying direction, of a shaping machine having a fifth example configuration.

FIG. 12 is a partially sectional view, taken by a plane that is perpendicular to the conveying direction, of a shaping machine having a fifth example configuration. The shaping machine 100D having this configuration is not equipped with filter cloth belts 145 and 147 of the shaping machine 100C having the above-described fourth configuration, and the auxiliary conveyors 141 and 143 are unitized with the conveyor 19. That is, in this configuration, two end portions of a lower conveyor 149 are bent into vertical side walls and the lower conveyor 149 and is thus approximately U-shaped in cross section. The lower filter cloth belt 17 has a concave cross section, and its two end portions reach the top ends of the side walls of the conveyor 149, respectively. The other part of the configuration is the same as in the shaping machine 100C having the fourth example configuration.

In the shaping machine 100D having this configuration, two end portions of each Caterpillar plate of the lower conveyor 149 are erected vertically as side walls, whereby the lower conveyor 149 assumes a convex shape in the feed process. With this configuration, the shaping machine 100D is equipped with only the pair of (i.e., upper and lower) conveyors 15 and 149, that is, does not require independent, side (left and right) auxiliary conveyors, as a result of which the machine cost can be reduced.

Since curdled soymilk T is surrounded from the four directions by the two conveyors 15 and 149, as in the above-described example configurations, natural cooling by heat release is suppressed, the heat-retaining ability is enhanced, and heating can be performed efficiently though the configuration is simple. Furthermore, even thick curdled soymilk T can be conveyed stably, the flexibility of tofu can be increased by accelerating its binding, and the "sticking-to-cloth" phenomenon can be suppressed.

Example Configuration 6

Next, a sixth example configuration will be described in which partial covers for covering heating devices that are opposed to the conveyors 15 and 19 are disposed outside the heating devices.

FIG. 13 is a partially sectional view, taken by a plane that is parallel with the conveying direction, of a shaping machine having a sixth example configuration. In the shaping machine 100E having this configuration, a partial cover E is disposed on the side opposite to the conveyance passage 11 for curdled soymilk T in the feed process involving the conveyor 15 so as to be spaced from the conveyor 15. One or plural heating devices G is disposed between the partial cover E and the conveyor 15. That is, the partial cover E is disposed so as to cover a prescribed portion of the conveyor 15 so that thermal energy produced by the heating device(s) disposed inside the partial cover E is transmitted to the conveyor 15 efficiently.

One or plural heating devices G and a partial cover E are disposed also for the conveyor 19. Each Caterpillar plate of each of the conveyors 15 and 19 may be either the flat-plate-like Caterpillar plate 38 which is employed in the first example configuration shown in FIG. 2 or the hollow Caterpillar plate 38A having the hollow space which is employed in the second example configuration shown in FIG. 5. Each of the heating devices having the above-described configurations can be used as each heating device G.

In the shaping machine 100E having this configuration, the partial covers E are disposed so as to cover the circulation routes of the conveyors 15 and 19 and are heated by the heating devices G of a vapor/hot wind blowing type, a hot water splay type, or the like. As a result, thermal energy produced by the heating devices G is not dissipated uselessly and efficient heating can be performed in the ranges where the heating devices G are provided. With this configuration, the core temperature or the surface temperature of bean curds or the temperatures of the conveyors 15 and 19 and their neighborhoods inside the partial covers E can be kept in a range of 60° C. to 105° C., whereby the properties of bean curds can be improved and sterilization can be performed while secondary contamination by and proliferation of germs are prevented. The partial covers E are disposed so as to surround minimum necessary ranges of the circulation routes of the conveyors 15 and 19 or their neighborhoods. This makes it possible to perform necessary heating while minimizing the quantity of heat to be supplied from the heating devices G.

Partial covers E and heating devices G are disposed at desired positions in the feed process, the return process, the direction change processes, or the like involving the conveyors 15 and 19, and may be disposed at plural positions in each region as appropriate. Where only portions of the conveyors 15 and 19 are covered with the partial covers E, an accurate temperature control can be performed quickly on the regions covered and heating can be performed with a minimum quantity of heat and high response speed. Instead of the partial covers E which cover portions of the conveyors 15 and 19, covers that cover the conveyors 15 and 19 entirely may be provided.

Furthermore, the shaping machine 100E may also be equipped with a draining device or an exhaust device for draining or discharging a heat medium (vapor-condensed water, water vapor, hot air, or the like) to outside the partial covers E. This makes it possible to operate the conveyors 15 and 19 smoothly and continuously for a long time. Another configuration is possible that has an auxiliary heating unit for heating ambient air outside the partial covers E as an auxiliary measure. This measure makes it possible to attain a desired heating target temperature earlier.

From the viewpoints of using the heating devices G efficiently and suppressing heat release to the external air and loss due to escape of a heating medium, it is preferable that the partial covers E be covers that are formed with a stainless steel plate or a resin plate (e.g., a transparent plate member made of an acrylic resin (PMMA), a polyethylene terephthalate resin (PET), a vinyl chloride resin (PVC), a polypropylene resin (PP), or the like) or covers having a heat insulation member.

The partial covers E may be disposed in a partial region or most of the region of at least one of the feed process, the return process, and the direction change processes which are arranged along the circulation routes of the conveyors 15 and 19 and their neighborhoods. It is preferable that the partial covers E are in such a form as to surround a prescribed range of the conveyors 15 and 19 like a tunnel does. In particular, in the feed process of the conveyors 15 and 19, it is appropriate to dispose the partial covers E locally in such a manner that they surround as short a range as possible of the conveyors 15 and 19 and curdled soymilk T being conveyed.

Automatic cleaning nozzles that jet out a cleaning liquid or the like may be disposed inside the respective partial covers E. In this case, spray ranges of a cleaning liquid are restricted to minimum necessary ranges by the partial covers E, whereby cleaning of the conveyors 15 and 19 can be performed efficiently. Furthermore, a lower-cost configuration is possible if the automatic cleaning nozzles also serve as nozzles for jetting out vapor, hot water, or a hot wind to clean the conveyors 15 and 19.

Each partial cover E may have a partial window or the like that can be opened and closed. In this case, a visual check and inspection of nooks of the machine to be performed after cleaning are facilitated. Such partial covers E may be equipped with, as appropriate, sealing members (curtains or resin or rubber members that enable tight sealing), water seal type sealing means, or the like for preventing leakage of a heating medium at the entrance and exit, openings, gaps, etc. of the conveyance passage 11 of the conveyors 15 and 19.

As described above, it suffices that the partial covers E be covers that cover minimum necessary ranges of the circulation passages of the conveyors 15 and 19, curdled soymilk T to be conveyed, and their neighborhoods. Where the inside of each partial cover E is heated or cleaned by a heating device(s) G or a cleaning device, the heating energy (running cost) can be reduced and the probability of occurrence of insufficient temperature increase or temperature unevenness can be lowered by making the capacity of each partial cover E small. With this measure, a minimum necessary region or only a portion that is in the vicinity of or close to curdled soymilk T or bean curds can be managed in a concentrated manner. Furthermore, a portion to be cleaned in a concentrated manner can be restricted to a small region, which is preferable in terms of sanitary management. A cover that is disposed under the conveyance passage 11 may also serve as a receiving saucer or a storage tank.

Incidentally, it is known that in shaping machines the "sticking-to-cloth" problem mainly occurs in the lower filter cloth belt 17, and that in shaping machines for fried tofu the "sticking-to-cloth" problem mainly occurs in the upper filter cloth belt 13. In shaping machines for firm tofu or the like, the "sticking-to-cloth" problem is prone to occur in the lower filter cloth belt 17. Thus, to solve the "sticking-to-cloth" problem more reliably, it is appropriate to install a partial cover E at least for one of the upper and lower conveyors as well as a heating device(s) G for heating it. It is also effective to provide each Caterpillar plate with the heat insulation/heat-retaining member H and/or the heat storage member F.

Example Configuration 7

FIG. 14 is a partially sectional view, taken by a plane that is perpendicular to the conveying direction, of a shaping machine having a seventh example configuration. The shaping machine 100F having this configuration is configured in such a manner that a partial cover E and heating devices G are added to the shaping machine 100C shown in FIG. 11. The other part of the configuration is the same as in the shaping machine 100C.

The shaping machine 100F having this configuration is equipped with the partial cover E which surrounds conveyors 15A and 19A and filter cloth belts 13A and 17A of the feed process and auxiliary conveyors 141A and 143A and filter cloth belts 145A and 147A of the feed process. Conveyors 15B and 19B and the filter cloth belts 13B and 17B of the return process and auxiliary conveyors 141B and 143B and filter cloth belts 145B and 147B of the return process are disposed outside the partial cover E.

The plural heating devices G are installed inside the partial cover E. The heating devices G are disposed between the partial cover E and the conveyors 15A and 19A and between the partial cover E and the auxiliary conveyors 141A and 143A. The conveyors 15 and 19 and the auxiliary conveyors 141 and 143 are driven by respective chains 39 and convey curdled soymilk T.

Since the partial cover E surrounds prescribed ranges of the ones, corresponding to the feed process, of the conveyors 15 and 19, the auxiliary conveyors 141 and 143, and the filter cloth belts 13, 17, 145, and 147, the inside of the partial cover E can be heated efficiently and it is made easier to control the temperature of the atmosphere inside the partial cover E to a constant temperature. As a result, curdled soymilk T can be conveyed while the heat insulation/heat-retaining members and/or the heat storage members contained in the conveyors 15 and 19 and the auxiliary conveyors 141 and 143 are heated. And the temperature of the curdled soymilk T can be set in a prescribed temperature range. A high-quality bean curds that are delicious and provide a good mouthfeel can therefore be manufactured in good sanitary conditions.

Example Configuration 8

FIG. 15A is a schematic side view of part of a shaping machine having an eighth example configuration. The shaping machine 100G having this configuration is equipped with partial covers E which covers regions, corresponding to the feed process, of the conveyors 15 and 19, respectively, and heating devices G of a vapor jetting type, a hot wind blowing type, a hot water spray type, or the like which are disposed inside the partial covers E. Although the circulation routes of the conveyors 15 and 19 shown in the drawing do not pass through the vapor sterilization tanks 51 and 53, the alkali cleaning tanks 43 and 45, the acid cleaning tanks 47 and 49, or the water cleaning units 55, 57, 59, and 61 shown in FIG. 1, a configuration is possible in which a partial cover E and a heating device G are disposed in a conveyance region corresponding to each of the cleaning/sterilization tanks and units shown in FIG. 1.

In this configuration, a partial cover E and heating units G are disposed adjacent to the circulation route of each of the conveyors 15 and 19. Each partial cover E is disposed on the opposite side of the heating devices G to the conveyance passage 11. The conveyors 15 and 19 are disposed so that the pressing force produced by pressing means (springs, air cylinders, or the like; not shown) increases toward the downstream side in the conveying direction of curdled soymilk T and that the distance between them decreases according to the consolidation of the curdled soymilk T. In the illustrated example, the conveyor 15 is inclined with respect to the conveyor 19. But the configuration is not limited to this case; the conveyor 19 is inclined with respect to the conveyor 15. In the shaping machine 100G having this configuration, as curdled soymilk T (not shown) is conveyed downstream in the conveying direction by the conveyors 15 and 19, the curdled soymilk T comes to be compressed more strongly in its thickness direction, whereby whey etc. is discharged more surely. As a result, the curdled soymilk T can be shaped into bean curds being thicker in taste.

Each of the partial covers E assumes a tunnel-like shape in a side view and covers a prescribed range of the corresponding conveyor 15 or 19. Thus, a quantity of heat generated by the heating devices G is transmitted to the prescribed range of the corresponding conveyor 15 or 19 with high efficiency. The heating portion of the conveyor 15 or 19 is not limited to its portion corresponding to the feed step.

FIG. 15B is a schematic side view of part of a shaping machine according to a first modification. In this shaping machine 100H, partial covers Ea and Eb are disposed on the front side and the back side of the portion, corresponding to the return process, of each of the conveyors 15 and 19. Heating devices G are disposed in each of the partial covers Ea and Eb. Since the sets of partial covers Ea and Eb and heating devices G are installed in the return process, necessary and sufficient heating can be performed until the conveyors 15 and 19 return to the feed process even in a case that each Caterpillar plate 38A is provided with a heat storage member F having a large heat capacity.

Figure 15C:
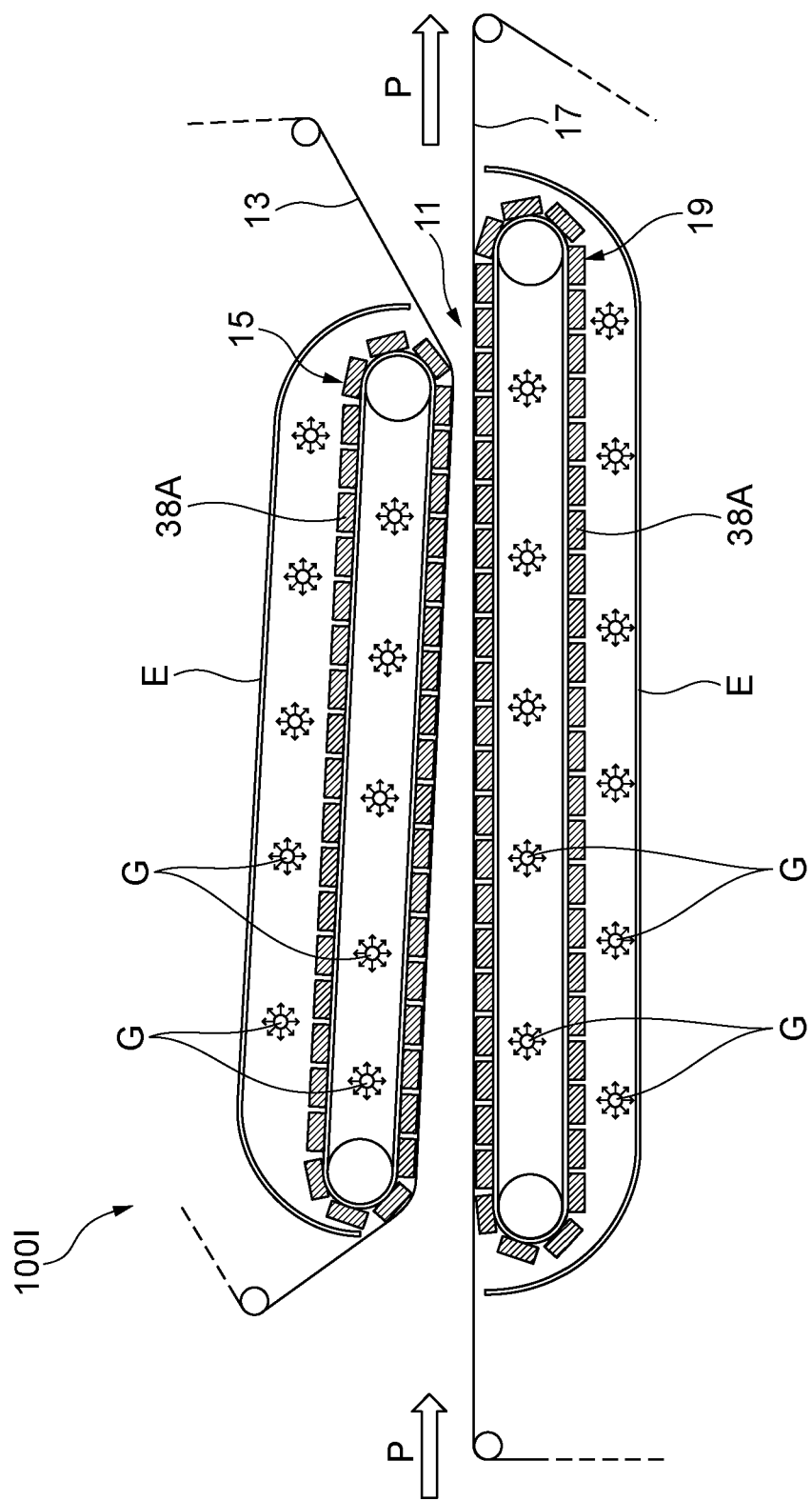
FIG. 15C is a schematic sectional view of part of a shaping machine according to a second modification.

FIG. 15C is a schematic side view of part of a shaping machine according to a second modification. In this shaping machine 100I, the portion, corresponding to the return process, of each of the conveyors 15 and 19 is entirely covered with a partial cover E. Heating devices G are disposed inside the circulation route of each of the conveyors 15 and 19 and between the portion, corresponding to the return process, of the conveyor 15 or 19 and the corresponding partial cover E. Since the portion, corresponding to the return process, of each of the conveyors 15 and 19 is entirely covered with the partial cover E, each of the conveyors 15 and 19 can be heated efficiently. As a result, the temperature control of the conveyors 15 and 19 can be performed uniformly and hence heating unevenness is not prone to occur.

FIG. 15D is a schematic side view of part of a shaping machine according to a third modification. In this shaping machine 100J, a downstream portion, corresponding to the return process, of each of the conveyors 15 and 19 and its portion corresponding to the direction change process are covered with a partial cover E. Heating devices G are disposed between each partial cover E and the associated one of the conveyors 15 and 19. That is, in this configuration, the partial cover E and the heating devices G are disposed adjacent to the portion, corresponding to the return process and located immediately before the feed process, of each of the conveyors 15 and 19. As a result, the Caterpillar plates 38A can be heated immediately before reaching the feed process, whereby loss of heating energy due to heat release during movement of the Caterpillar plates 38A along the circulation routes. Thus, heating can be performed with minimum necessary heating energy.

FIG. 15E is a schematic side view of part of a shaping machine according to a fourth modification. In this shaping machine 100K, partial covers Ea and Eb and heating devices G are disposed adjacent to a downstream portion, corresponding to the return process and located before the feed process, of each of the conveyors 15 and 19. The partial covers Ea and Eb and the heating devices G are disposed so as to be opposed to the front surface and the back surface of each of the conveyors 15 and 19, whereby the front surface and the back surface of the same portion of the conveyor 15 or 19 are heated at the same time. As a result, heating can be performed in a concentrated manner in the downstream region of the return process and hence the space for heating can be made compact.

Example Configuration 9

FIG. 16A is a schematic side view of part of a shaping machine according to a ninth example configuration. In the shaping machine 100L of this configuration, almost all of each of the conveyors 15 and 19 corresponding to the feed process, the return process, and the direction change processes is covered with partial covers Ea, Eb, and Ec. The partial cover Ea covers almost all of the portion, corresponding to the return process and the direction change processes, of each of the conveyors 15 and 19 and is disposed on the side opposite to the conveyance passage 11. The partial covers Eb and Ec are disposed inside the circulation route of each of the conveyors 15 and 19. The partial cover Eb is disposed so as to cover the portion, corresponding to the return process, of each of the conveyors 15 and 19, and the partial cover Ec is disposed so as to cover the portion, corresponding to the feed process, of each of the conveyors 15 and 19

Heating devices G are disposed between the portion, corresponding to the return process, of each of the conveyors 15 and 19 and the corresponding partial cover Ea and between the portion, corresponding to the feed process, of the conveyors 15 or 19 and the corresponding partial cover Ec. An overall cover Ez is further installed which cover the entire shaping machine 100L.

The shaping machine 100L having this configuration is given a double (multiple) cover structure by means of the partial covers Ea, Eb, and Ec and the overall cover Ez which is disposed outside them. In particular, from the viewpoint of management such as inspection, it is preferable that the overall cover Ez be an overall cover that is highly transparent approximately in its entirety. To this end, it is preferable that the overall cover Ez be made of a transparent resin plate material that need not be resistant to heat (e.g., polyethylene terephthalate resin, vinyl chloride resin, or polycarbonate resin).

By providing the overall cover Ez with exhaust equipment, air intake equipment, draining equipment, etc., a phenomenon can be suppressed that a hot wind, vapor, hot water, etc. are diffused from the heating devices to the operation environment in the shaping machine 100L and the operation environment is made high in temperature and humidity. Furthermore, by using the overall cover Ez together with the partial covers Ea, Eb, and Ec, quality reduction of bean curds due to a drop of water droplets, contamination by foreign substances, etc. can be prevented more reliably. Still further, the manufacturing process of bean curds is not affected by the environment temperature and is less affected by an initial temperature of the machine; influences of various factors on the temperature of bean curds are made small.

In general, where such components as position sensors and air cylinders are disposed inside the partial covers Ea, Eb, and Ec which are heated, they are required to satisfy high heat resistance and waterproofness, resulting in increase of the machine cost. In contrast, in this configuration, if such components are disposed inside the overall cover Ez, they are not required to satisfy high heat resistance and waterproofness and may be conventional, standard components or relatively inexpensive components. Thus, according to this configuration, increase of the machine cost can be suppressed even if various components are installed additionally in the machine.

FIG. 16B is a schematic side view of part of a shaping machine according to a modification. This shaping machine 100M is equipped with an overall cover Ez which covers the entire shaping machine 100M and heating devices G installed in the overall cover Ez. In this configuration, no partial covers are provided. The other part of the configuration is the same as in the shaping machine 100L shown in FIG. 16A.

According to this configuration, since the conveyors 15 and 19 are covered with the overall cover Ez, heat release from bean curds can be suppressed though no partial covers are provided. Furthermore, where each Caterpillar plate 38A has a heat insulation/heat-retaining function and/or a heat-storing function, the heat release suppressing effect is enhanced through a synergy effect and the heat-retaining effect can thereby be enhanced. Still further, heating energy produced by the heating devices G is stored so easily in the overall cover Ez that the energy that is consumed by the heating devices G can be lowered.

As seen from the above description, the invention is not limited to the above-described embodiments. It is within expectations of the invention that the configurations of some of the embodiments are combined together or those skilled in the art will make modifications or conceive applications on the basis of the disclosure of the specification and the known techniques, and the scope of protection should encompass such modifications and applications.

Examples

Pieces of processing equivalent to the cleaning and the sterilization that are performed on the filter cloth belts by the above-described shaping machine 100 were tested using an elements test machine. The details and results of the tests will be described below.

As for the cleaning and sterilization conditions of the tests, to make the shaping machine so high in sanitation as to be able to assure a best-before period of 65 days at 4.4° C., inoculation, cleaning, and sterilization tests were conducted using kinds of spore-forming bacteria that are higher than or equal to ones that are highest in heat resistance ($D_{100°\ C.}$=4.57 min) among spore-forming bacteria that were separated from tofu products in the past and *Bacillus cereus* is even higher in heat resistance. The above D value is a numerical value indicating heat resistance of germs and represents a time (min) it takes to reduce the number of germs to 1/10 at a prescribed temperature.

<What were Prepared>

Sample cloth of filter cloth belts of a shaping machine
Material: polypropylene filter cloth
Size: 10 cm×10 cm
Boiling-sterilized firm tofu on the market
Alkali cleaning tank
Alkaline liquid: sodium hydroxide solution of 2% in concentration, pH13.2, and 90° C. in temperature
Acid cleaning tank Acidic liquid: citric acid solution of 1% in concentration, pH2.4, and 90° C. in temperature
High-pressure cleaning device
Water pressure: 1 MPa
Jetting conditions: Water is jetted as a nozzle is reciprocated at such a speed as to cover a range of 70 cm in width in 4 sec.
Vapor sterilization device (batch caldron)
Vapor sterilization temperature: 100° C.

<Bacteria Inoculated>

Mixture of spore-forming bacteria: kinds of bacteria that are higher in heat resistance than 20 min or longer at 100° C.

Bacteria concentration: $1.0×10^7$ (/g) or more
Amount of bacteria liquid: 20.8 (g)

*Bacillus cereus* (*B. cereus* spores) that is higher in heat resistance than 30 min or longer at 100° C.

Bacteria concentration: $1.0×10^7$ (/g) or more
Amount of bacteria liquid: 18.3 (g)

<Test Method>

The following steps 1 to 6 were executed, and the numbers of viable bacteria were counted under respective sets of cleaning conditions and sterilization conditions.

(Step 1)

A frozen bacteria liquid is defrosted at room temperature. The mixture of spore-forming bacteria is boiled for 10 min at 100° C. to kill vegetative hyphae and activate spores. The *Bacillus cereus* is used as it is because it is already in a state of only spores.

(Step 2)

Firm tofu of 300 g on the market and a liquid mixture of spore-forming bacteria of 20.8 g (test group 1) are measured out and stirred with a mixer into a paste form (a worst curdled state is assumed). Firm tofu of 300 g on the market and a *Bacillus cereus* liquid of 18.3 g (test group 2) are measured out and stirred with a mixer into a paste form (a worst curdled state is assumed).

(Step 3)

Each paste obtained at step 2 is applied to a sample cloth of a filter cloth belt (about 3 g per 10 cm×10 cm) by a spatula and left as it is for 20 min.

(Step 4)

Each sample not subjected to cleaning is stored in an aseptic bag in an environment of an atmosphere temperature 4° C.

(Step 5)

Each sample to be subjected to cleaning is subjected to cleaning and sterilization in order of St. 1 to St. 6 under conditions 1-1 to conditions 3-2 shown in the following Table 1, and stored in an aseptic bag in an environment of an atmosphere temperature 4° C. In each of the alkali cleaning and the acid cleaning, a sample cloth is immersed for a prescribed time in a tank that can be heated by vapor injection. A cooker for heating raw ground macerated soybean is used as a vapor sterilization tank, and a sample cloth is set in the cooker while vapor is injected into the cooker. Subsequently, the cooker is covered with a lid and sterilization is performed with the inside of the cooker sealed tightly.

TABLE 1

<Cleaning conditions>

| Test No. | St. 1 High-pressure cleaning | St. 2 Alkali (NaOH) Temp: 90° C. Concen.: 2% pH: 13.2 Passage time | St. 3 High-pressure cleaning | St. 4 Acid (citric acid) Temp: 90° C. Concen.: 1% pH: 2.4 Passage time | St. 5 High-pressure cleaning | St. 6 Vapor sterilization Temp: 100° C. Passage time |
|---|---|---|---|---|---|---|
| Cond. 1-1 | Done | 111 s | Done | 111 s | Done | Not done |
| Cond. 1-2 | Done | 111 s | Done | 111 s | Done | 10 s |
| Cond. 1-3 | Done | 111 s | Done | 111 s | Done | 70 s |
| Cond. 1-4 | Done | 111 s | Done | 111 s | Done | 120 s |
| Cond. 2-1 | Done | 312 s | Done | 111 s | Done | Not done |
| Cond. 2-2 | Done | 312 s | Done | 111 s | Done | 70 s |
| Cond. 3-1 | Done | 381 s | Done | 111 s | Done | Not done |
| Cond. 3-2 | Done | 381 s | Done | 111 s | Done | 10 s |

(Step 6)

The stored samples not subjected to cleaning and samples subjected to cleaning are unsealed, and their numbers of general viable bacteria are counted. The number of general viable bacteria is counted by extracting bacteria by adding a sterilized phosphoric acid buffer solution of 100 g to a sample cloth and the number of extracted bacteria is counted.

<Results>

The following Tables 2 and 3 show results of execution of the above steps.

TABLE 2

<Test group 1: mixture of spore-forming bacteria>

| Test No. | St. 1 High-pressure cleaning | St. 2 Alkali Temp: 90° C. Concen.: 2% | St. 3 High-pressure cleaning | St. 4 Acid Temp: 90° C. Concen.: 1% | St. 5 High-pressure cleaning | St. 6 Vapor sterilization Temp: 100° C. | Viable bacteria count (/g) |
|---|---|---|---|---|---|---|---|
| Exp. ex. 1 (not cleaned) | Not done | Not done | Not done | Not done | Not done | Not done | $3.2 \times 10^6$ |
| Exp. ex. 2 (cond. 1-1) | Done | 111 s pH: 13.2 | Done | 111 s pH: 2.4 | Done | Not done | 2.0 |
| Exp. ex. 3 (cond. 1-2) | Done | 111 s pH: 13.2 | Done | 111 s pH: 2.4 | Done | 10 s | Negative |
| Exp. ex. 4 (cond. 1-3) | Done | 111 s pH: 13.2 | Done | 111 s pH: 2.4 | Done | 70 s | Negative |
| Exp. ex. 5 (cond. 1-4) | Done | 111 s pH: 13.2 | Done | 111 s pH: 2.4 | Done | 120 s | Negative |
| Exp. ex. 6 (cond. 2-1) | Done | 312 s pH: 13.2 | Done | 111 s pH: 2.5 | Done | Not done | 2.0 |
| Exp. ex. 7 (cond. 2-2) | Done | 312 s pH: 13.2 | Done | 111 s pH: 2.5 | Done | 70 s | Negative |
| Exp. ex. 8 (cond. 3-1) | Done | 381 s pH: 13.2 | Done | 111 s pH: 2.5 | Done | Not done | 3.5 |
| Exp. ex. 9 (cond. 3-2) | Done | 381 s pH: 13.2 | Done | 111 s pH: 2.5 | Done | 10 s | Negative |

TABLE 3

<Test group 2: Bacillus cereus>

| Test No. | St. 1 High-pressure cleaning | St. 2 Alkali Temp: 90° C. Concen.: 2% | St. 3 High-pressure cleaning | St. 4 Acid Temp: 90° C. Concen.: 1% | St. 5 High-pressure cleaning | St. 6 Vapor sterilization Temp: 100° C. | Viable bacteria count (/g) |
|---|---|---|---|---|---|---|---|
| Exp. ex. 10 (not cleaned) | Not done | Not done | Not done | Not done | Not done | Not done | $1.9 \times 10^2$ |
| Exp. ex. 11 (cond. 1-1) | Done | 111 s pH: 13.2 | Done | 111 s pH: 2.5 | Done | Not done | Negative |
| Exp. ex. 12 (cond. 1-2) | Done | 111 s pH: 13.2 | Done | 111 s pH: 2.5 | Done | 10 s | Negative |
| Exp. ex. 13 (cond. 1-3) | Done | 111 s pH: 13.2 | Done | 111 s pH: 2.5 | Done | 70 s | Negative |
| Exp. ex. 14 (cond. 1-4) | Done | 111 s pH: 13.2 | Done | 111 s pH: 2.5 | Done | 120 s | Negative |

TABLE 3-continued

<Test group 2: Bacillus cereus>

| Test No. | St. 1<br>High-pressure<br>cleaning | St. 2<br>Alkali Temp:<br>90° C.<br>Concen.: 2% | St. 3<br>High-pressure<br>cleaning | St. 4<br>Acid<br>Temp: 90° C.<br>Concen.: 1% | St. 5<br>High-pressure<br>cleaning | St. 6<br>Vapor sterilization<br>Temp: 100° C. | Viable bacteria<br>count (/g) |
|---|---|---|---|---|---|---|---|
| Exp. ex. 15<br>(cond. 2-1) | Done | 312 s<br>pH: 13.2 | Done | 111 s<br>pH: 2.5 | Done | Not done | Negative |
| Exp. ex. 16<br>(cond. 2-2) | Done | 312 s<br>pH: 13.2 | Done | 111 s<br>pH: 2.5 | Done | 70 s | Negative |
| Exp. ex. 17<br>(cond. 3-1) | Done | 381 s<br>pH: 13.2 | Done | 111 s<br>pH: 2.5 | Done | Not done | Negative |
| Exp. ex. 18<br>(cond. 3-2) | Done | 381 s<br>pH: 13.2 | Done | 111 s<br>pH: 2.5 | Done | 10 s | Negative |

As for the number of general viable bacteria, large numbers of general viable bacteria were found in each of experiment examples 1 and 10. On the other hand, the number of general viable bacteria was negative in each of experiment examples 3-5, 7, and 9 of test group 1 (mixture of spore-forming bacteria) in which all of the alkali cleaning, the acid cleaning, and the vapor sterilization were performed. The number of general viable bacteria was negative in all of experiment examples 11-18 (*Bacillus cereus*).

The results of the tests conducted this time show that a "negative" judgment can be obtained by combining high-pressure cleaning, alkali cleaning, acid cleaning, and vapor sterilization even in a case that a sample cloth is contaminated by kinds of spore-forming bacteria that are higher than or equal to ones that are highest in heat resistance ($D_{100° C.}$=4.57 min) among spore-forming bacteria that were separated from tofu products in the past. It is noted that from the viewpoint of keeping the running cost of the shaping machine, an alkali cleaning time of 111 sec is considered sufficient.

DESCRIPTION OF SYMBOLS

13, 17: Filter cloth belt
15, 19: Conveyor
38, 38A: Caterpillar plate
43, 45: Alkali cleaning tank
47, 49: Acid cleaning tank
51, 53: Vapor sterilization tank
55, 57, 59, 61, 63, 65: Water cleaning unit
100, 100A, 100B, 100C, 100D, 100E, 100F, 100G, 100H, 100I, 100J, 100K, 100L, 100M: Shaping machine (continuous shaping machine for bean curds)
149: Conveyor
H: Heat insulation/heat-retaining member
F: Heat storage member
G: Heating device
T: Curdled soymilk

The invention claimed is:

1. A continuous shaping machine for bean curds, comprising:
a pair of endless filter cloth belts that are an upper filter cloth belt and a lower filter cloth belt each cloth belt being configured to circulate along a respective circulation route, each circulation route including a feed path and a return path;
a pair of endless conveyors that are an upper conveyor and a lower conveyor configured to circulate inside of the upper filter cloth belt and the lower filter cloth belt, respectively, the upper conveyor and the lower conveyor each being configured to circulate along a respective circulation route, each circulation route including a feed path and a return path,
wherein the feed paths of the upper filter cloth belt and conveyor oppose the feed paths of the lower filter cloth belt and conveyor so as to define a conveyance passage therebetween, the pair of endless filter cloth belts and the pair of endless conveyors being configured to compression-shape curdled soymilk by conveying the curdled soymilk along the conveyance passage while sandwiching the curdled soymilk between the upper filter cloth belt and conveyor and the lower filter cloth belt and conveyor; and
heaters configured to perform heating sterilization, the heaters being arranged in prescribed ranges along the return paths of the upper and lower filter cloth belts, respectively, each return path of the upper and lower filter cloth belts extending from a termination portion of the conveyance passage to a start portion of the conveyance passage.

2. A continuous shaping machine for bean curds, comprising:
a pair of endless filter cloth belts that are an upper filter cloth belt and a lower filter cloth belt each cloth belt being configured to circulate along a respective circulation route, each circulation route including a feed path and a return path;
a pair of endless conveyors that are an upper conveyor and a lower conveyor configured to circulate inside of the upper filter cloth belt and the lower filter cloth belt, respectively, the upper conveyor and the lower conveyor each being configured to circulate along a respective circulation route, each circulation route including a feed path and a return path,
wherein the feed paths of the upper filter cloth belt and conveyor oppose the feed paths of the lower filter cloth belt and conveyor so as to define a conveyance passage therebetween, the pair of endless filter cloth belts and the pair of endless conveyors being configured to compression-shape curdled soymilk by conveying the curdled soymilk along the conveyance passage while sandwiching the curdled soymilk between the upper filter cloth belt and conveyor and the lower filter cloth belt and conveyor; and
heaters configured to perform heating sterilization, the heaters being arranged in prescribed ranges along at least one of
the return path of one of the upper filter cloth belt and conveyor and the return path of one of the lower filter cloth belt and conveyor, respectively, each return path extending from a termination portion of the conveyance passage to a start portion of the conveyance passage, and the feed path of one of the upper filter cloth belt and conveyor and the feed path of one of the lower filter cloth belt and conveyor, respectively, each feed path extending from the start portion of the conveyance passage to the termination portion of the conveyance passage.

3. The continuous shaping machine for bean curds according to claim 1, wherein each of the heaters comprises vapor nozzles which jet out heated vapor.

4. The continuous shaping machine for bean curds according to claim 1, wherein the heaters are configured to heat an atmosphere in the prescribed ranges to a temperature that is higher than or equal to 60° C. and lower than or equal to 105° C.

5. The continuous shaping machine for bean curds according to claim 4, wherein the filter cloth belts and the conveyors are configured to be driven at such a circulation speed so as to pass the prescribed ranges once in a time period that is longer than or equal to 1 sec and shorter than or equal to 3,600 sec.

6. The continuous shaping machine for bean curds according to claim 1, further comprising:
an alkali cleaning unit configured to clean a corresponding one of the filter cloth belts by an alkaline liquid, and
an acid cleaning unit configured to clean the corresponding one of the filter cloth belts by an acidic liquid, wherein the alkali cleaning unit, the acid cleaning unit and one of the heaters are arranged in this order downstream in a circulation direction along the return path of the corresponding one of the filter cloth belts.

7. The continuous shaping machine for bean curds according to claim 1, further comprising:
an alkali cleaning unit configured to clean a corresponding one of the conveyors by an alkaline liquid; and
an acid cleaning unit configured to clean the corresponding one of the conveyors by an acidic liquid, wherein the alkali cleaning unit, the acid cleaning unit and one of the heaters are arranged in this order downstream in a circulation direction along the return path of the corresponding one of the conveyors.

8. The continuous shaping machine for bean curds according to claim 6, further comprising a water cleaning unit configured to spray cleaning water to the corresponding one of the filter cloth belts, the water cleaning unit being disposed in at least one of a position upstream of the alkali cleaning unit in the circulation direction, a position between the alkali cleaning unit and the acid cleaning unit, and a position between the acid cleaning unit and one of the heaters.

9. The continuous shaping machine for bean curds according to claim 6, wherein:
the alkaline liquid has a concentration that is higher than or equal to 0.5% and lower than or equal to 10%; and
the acidic liquid has a concentration that is higher than or equal to 0.1% and lower than or equal to 10%.

10. The continuous shaping machine for bean curds according to claim 1, wherein each of the conveyors is an endless plate conveyor that is a connection of a number of plate members which are formed with at least one of a flat steel, a shaped steel, and a steel pipe.

11. The continuous shaping machine for bean curds according to claim 10, wherein each of the plate members has a hollow structure having a hollow space, and at least one of a heat insulation/heat-retaining member or a heat storage member is provided in the hollow space, or the hollow space includes a heat insulation region that is sealed so as to be in a low-pressure state.

12. The continuous shaping machine for bean curds according to claim 2, wherein each of the heaters comprises vapor nozzles which jet out heated vapor.

13. The continuous shaping machine for bean curds according to claim 2, wherein the heaters are configured to heat an atmosphere in the prescribed ranges to a temperature that is higher than or equal to 60° C. and lower than or equal to 105° C.

14. The continuous shaping machine for bean curds according to claim 13, wherein the filter cloth belts and the conveyors are configured to be driven at such a circulation speed so as to pass the prescribed ranges once in a time period that is longer than or equal to 1 sec and shorter than or equal to 3,600 sec.

15. The continuous shaping machine for bean curds according to claim 2, further comprising:
an alkali cleaning unit configured to clean a corresponding one of the filter cloth belts by an alkaline liquid, and
an acid cleaning unit configured to clean the corresponding one of the filter cloth belts by an acidic liquid, wherein the alkali cleaning unit, the acid cleaning unit and one of the heaters are arranged in this order downstream in a circulation direction along the return path of the corresponding one of the filter cloth belts.

16. The continuous shaping machine for bean curds according to claim 2, further comprising:
an alkali cleaning unit configured to clean a corresponding one of the conveyors by an alkaline liquid, and
an acid cleaning unit configured to clean the corresponding one of the conveyors by an acidic liquid, wherein the alkali cleaning unit, the acid cleaning unit and one of the heaters are arranged in this order downstream in a circulation direction along the return path of the corresponding one of the conveyors.

17. The continuous shaping machine for bean curds according to claim 15, further comprising a water cleaning unit configured to spray cleaning water to the corresponding one of the filter cloth belts, the water cleaning unit being disposed in at least one of a position upstream of the alkali cleaning unit in the circulation direction, a position between the alkali cleaning unit and the acid cleaning unit, and a position between the acid cleaning unit and one of the heaters.

18. The continuous shaping machine for bean curds according to claim 15, wherein:
the alkaline liquid has a concentration that is higher than or equal to 0.5% and lower than or equal to 10%; and
the acidic liquid has a concentration that is higher than or equal to 0.1% and lower than or equal to 10%.

19. The continuous shaping machine for bean curds according to claim 2, wherein each of the conveyors is an endless plate conveyor that is a connection of a number of plate members which are formed with at least one of a flat steel, a shaped steel, and a steel pipe.

20. The continuous shaping machine for bean curds according to claim 19, wherein each of the plate members has a hollow structure having a hollow space, and at least one of a heat insulation/heat-retaining member or a heat storage member is provided in the hollow space, or the hollow space includes a heat insulation region that is sealed so as to be in a low-pressure state.

* * * * *